United States Patent
Liu et al.

(10) Patent No.: US 7,418,718 B2
(45) Date of Patent: *Aug. 26, 2008

(54) RUNTIME HOSTING INTERFACES

(75) Inventors: Weiwen Liu, Redmond, WA (US);
Steven J. Pratschner, Issaquah, WA (US); Ian H. Carmichael, Sammamish, WA (US); Peter A. Carlin, Seattle, WA (US); Christopher W. Brumme, Mercer Island, WA (US); Mason K. Bendixen, Kirkland, WA (US); Beysim Sezgin, Redmond, WA (US); Sean E. Trowbridge, Sammamish, WA (US); Christopher James Brown, Issaquah, WA (US); Mei-Chin Tsai, Bellevue, WA (US); Mahesh Prakriya, Redmond, WA (US); Raja Krishnaswamy, Redmond, WA (US); Alan C. Shi, Redmond, WA (US); Suzanne Maurine Cook, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

This patent is subject to a terminal disclaimer.

(21) Appl. No.: 10/771,837

(22) Filed: Feb. 3, 2004

(65) Prior Publication Data
US 2004/0237064 A1 Nov. 25, 2004

Related U.S. Application Data

(63) Continuation-in-part of application No. 10/405,560, filed on Apr. 2, 2003.

(51) Int. Cl.
*G06F 3/00* (2006.01)
*G06F 9/46* (2006.01)
*G06F 9/455* (2006.01)

(52) U.S. Cl. .......................................... 719/328; 718/1
(58) Field of Classification Search ................. 707/206; 711/170–173; 717/120–121; 718/1, 100, 718/104, 106; 719/318–332
See application file for complete search history.

(56) References Cited

U.S. PATENT DOCUMENTS

| 5,909,580 | A  | * | 6/1999  | Crelier et al. | 717/141 |
| 6,457,142 | B1 | * | 9/2002  | Klemm et al.   | 714/38  |
| 6,816,956 | B1 | * | 11/2004 | Benayon et al. | 711/170 |
| 6,915,457 | B1 | * | 7/2005  | Miller         | 714/43  |

(Continued)

OTHER PUBLICATIONS

Engler, Dawson R. et al., "Exokernal: An Operating System Architecture for Application-Level Resource Management", Operating Systems Review, ACM USA, vol. 29, No. 5, Dec. 1995, pp. 251-266.

(Continued)

*Primary Examiner*—Meng-Ai An
*Assistant Examiner*—Charles E Anya
(74) *Attorney, Agent, or Firm*—Lee & Hayes, PLLC

(57) ABSTRACT

Systems and methods for enhanced runtime hosting are described. In one aspect the runtime hosting interface includes a host abstraction interface. The HAI allowing the runtime to configure host execution environment parameters and/or notify the host of a runtime event. In particular, the host abstraction interface (HAI) corresponds to execution environment abstractions supported by a host application. Responsive to an action or event, the runtime invokes an identified HAI or an associated object during execution of runtime managed code.

49 Claims, 8 Drawing Sheets

U.S. PATENT DOCUMENTS

| | | | |
|---|---|---|---|
| 6,941,437 B2* | 9/2005 | Cook et al. | 711/173 |
| 7,007,269 B2* | 2/2006 | Sluiman et al. | 717/130 |
| 7,086,064 B1 | 8/2006 | Stevens | |
| 2002/0087618 A1 | 7/2002 | Bohm et al. | |
| 2003/0033443 A1* | 2/2003 | Igotti | 709/328 |
| 2003/0093433 A1* | 5/2003 | Seaman et al. | 707/102 |
| 2003/0167421 A1* | 9/2003 | Klemm | 714/37 |
| 2004/0158589 A1* | 8/2004 | Liang et al. | 707/206 |

OTHER PUBLICATIONS

Haines, Matthew "On Designing Lightweight Threads for Substrate Software", Proceedings of the Usenix 1997 Annual Technical Conference Usexix Assoc Berkeley, CA, USA, 1997, pp. 243-255.

Harris, Timothy L. "An Extensible Virtual Machine Architecture", retrieved from the internet on Jun. 25, 2007 at <<http://citeseer.ist.psu.edu/263243.html>>, Oct. 3, 1999, pp. 1-5.

Harris, Timothy L. "Extensible Virtual Machines", retrieved from the internet on Jun. 27, 2007 at <<http://citeseer.ist.psu.edu/harris01extensible.html>>, Dec. 2001, pp. 1-204.

Kaashoek, M. Frans et al., "Application Performance and Flexibility on Exokernal Systems", Operating Systems Review ACM USA, vol. 31, No. 5, Dec. 1997, pp. 52-65.

Manadhata, Pratyusa et al., "Extensible Operating Systems", retrieved from the internet on Jun. 22, 2007 at <<http://citeseer.comp.nus.edu.sg/porwal01extensible.html>>, Apr. 16, 2001, pp. 1-26.

\* cited by examiner

RUNTIME HOSTING INTERFACES

RELATED APPLICATIONS

This application is a continuation-in-part of U.S. patent application Ser. No. 10/405,560, titled "Enhanced Runtime Hosting", filed on Apr. 2, 2003, commonly assigned hereto, and hereby incorporated by reference.

TECHNICAL FIELD

The invention pertains to integrated computer software application and hosted runtime service execution environments.

BACKGROUND

In today's complex computer-program and networking environments, code sharing, scalability, and integration with other cross-platform frameworks are generally desired. Use of a runtime by a hosting application (i.e., hereinafter often referred to as a "host") generally allows application developers to write managed code with cross-platform compatibility, increased scalability, a common type system, multiple-language support, automatic memory management, and so on. Runtimes include, for example a Common Language Runtime (CLR), a Java Virtual Machine (VM), and/or the like.

Most hosts consist of both managed code and unmanaged code. Managed code is code that executes under the control of a runtime. Conversely, unmanaged code is code that runs outside of the runtime. Common object model (COM) components, ActiveX® interfaces, and WIN32® API functions are examples of unmanaged code. Unmanaged hosting code is used by a process to configure a runtime, load it into the process, and transition the process into managed code.

Once the process, which includes the host and the runtime, is executing, integration between the host and the runtime in the execution environment is very limited and basic. Other than the described interactions of configuring, loading, and transitioning the runtime by the host, the host will typically only direct the runtime to perform a specific task, and/or receive an event/message from the runtime that a particular runtime task has completed. Thus, the host and the runtime are essentially separate, non-integrated entities of the process. This means that a hosting application has little or no control over many of the services provided by the runtime.

Relying on hosted runtime service(s) when the host expects use of its own service implementation can be problematic, and may even break the host application's expected performance, results, and/or the like. For instance, the host may have tuned specific threading, memory, synchronization, and/or security implementations over time, for example, for improved scalability and performance. Thus, although the host may desire the benefits of a runtime (e.g., cross-platform compatibility, reduced coding efforts, etc.), the host's specially tuned implementation may be incompatible with corresponding runtime services. In such a situation, the host may only load a runtime that relies on host-supplied services, or may completely bypass runtime services altogether by directly accessing underlying OS services. Such workaround(s) do not allow application designers to leverage the benefits that runtimes were designed to provide, resulting in less integrated and portable products.

Accordingly, systems and methods to increase execution environment control between a host and a runtime are greatly desired.

SUMMARY

Systems and methods for enhanced runtime hosting are described. In one aspect the runtime hosting interface includes a host abstraction interface. The HAI allowing the runtime to configure host execution environment parameters and/or notify the host of a runtime event. In particular, the host abstraction interface (HAI) corresponds to execution environment abstractions supported by a host application. Responsive to an action or event, the runtime invokes an identified HAI or an associated object during execution of runtime managed code.

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

Overview

Figure 1:
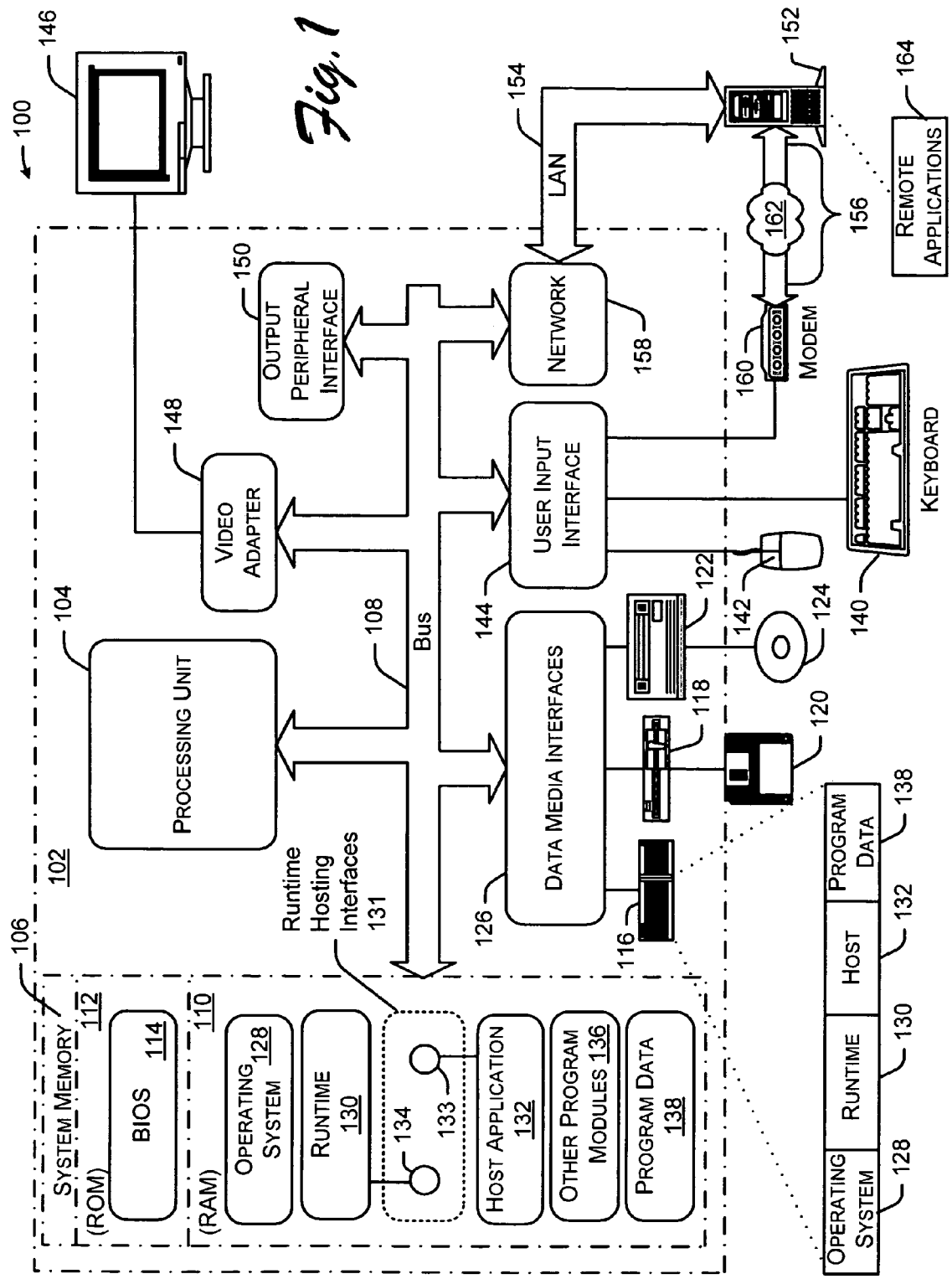
FIG. 1 is a block diagram of an exemplary computing environment within which systems and methods for enhanced runtime hosting may be implemented.

Systems and methods for enhanced runtime hosting are described. As discussed above, conventional integration between a runtime hosting application and the runtime is substantially limited in that the hosting application has very little if any control over a considerable portion of its execution environment. The invention addresses this lack of integration by providing substantially increased integration between the host and the runtime in the execution environment, allowing host application to direct host-specific execution environment scenarios. In particular, this increased integration is implemented with multiple levels of abstracted interfaces that allow a host application to implement and exercise control and customize execution environment functionality, event notification, and runtime operation. Such abstractions include, for example, memory management, synchronization and threading, assembly loading, security context and impersonation, input/output (I/O) completion, event notification (e.g., when threads enter and leave the runtime), and runtime configuration.

Additionally, runtime interfaces provide the runtime with substantial control over specific host application implementation aspects, including event notification. Functionality of the runtime is completely independent on whether a particular hosting application has decided to implement hosting portions of the enhanced runtime interfaces.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 100 on which the subsequently described systems, apparatuses and methods for enhanced runtime hosting may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices. The invention may also be practiced in distributed computing environments where tasks are performed by remote processing devices that are linked through a communications network. In a distributed computing environment, program modules may be located in both local and remote memory storage devices.

As shown in FIG. 1, computing environment 100 includes a general-purpose computing device in the form of a computer 102. The components of computer 102 can include, by are not limited to, one or more processors or processing units 104, a system memory 106, and a bus 108 that couples various system components including system memory 106 to processor 104.

The system bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 102 typically includes a variety of computer readable media. Such media may be any available media that is accessible by computer 102, and it includes both volatile and non-volatile media, removable and non-removable media. In FIG. 1, system memory 106 includes computer readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during startup, is stored in ROM 112. RAM 110 typically contains data and/or program modules that are immediately accessible to and/or presently being operated on by processor 104.

Computer 102 may further include other removable/non-removable, volatile/non-volatile computer storage media. For example, FIG. 1 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM/R/RW, DVD-ROM/R/RW/+R/RAM or other optical media. Hard disk drive 116, magnetic disk drive 118 and optical disk drive 122 are each connected to bus 108 by one or more interfaces 126.

The drives and associated computer-readable media provide nonvolatile storage of computer readable instructions, data structures, program modules, and other data for computer 102. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A user may provide commands and information into computer 102 through input devices such as keyboard 140 and pointing device 142 (such as a "mouse"). Other input devices (not shown) may include a microphone, joystick, game pad, satellite dish, serial port, scanner, camera, etc. These and other input devices are connected to the processing unit 104 through a user input interface 144 that is coupled to bus 108, but may be connected by other interface and bus structures, such as a parallel port, game port, or a universal serial bus (USB). A monitor 146 or other type of display device is also connected to bus 108 via an interface, such as a video adapter 148. In addition to monitor 146, personal computers typically include other peripheral output devices (not shown), such as speakers and printers, which may be connected through output peripheral interface 150.

Computer 102 may operate in a networked environment using logical connections to one or more remote computers, such as a remote computer 152. Remote computer 152 may include many or all of the elements and features described herein relative to computer 102. Logical connections shown in FIG. 1 are a local area network (LAN) 154 and a general wide area network (WAN) 156. Such networking environments are commonplace in offices, enterprise-wide computer networks, intranets, and the Internet.

When used in a LAN networking environment, computer 102 is connected to LAN 154 via a network interface or adapter 158. When used in a WAN networking environment, the computer typically includes a modem 160 or other means for establishing communications over WAN 156. Modem 160, which may be internal or external, may be connected to system bus 108 via the user input interface 144 or other appropriate mechanism. Depicted in FIG. 1, is a specific implementation of a WAN via the Internet. Here, computer 102 employs modem 160 to establish communications with at least one remote computer 152 via the Internet 162.

In a networked environment, program modules depicted relative to computer 102, or portions thereof, may be stored in a remote memory storage device. Thus, e.g., as depicted in FIG. 1, remote application programs 164 may reside on a memory device of remote computer 152. It will be appreciated that the network connections shown and described are exemplary and other means of establishing a communications link between the computers may be used.

Exemplary Program Modules and Data for an Enhanced Runtime Interface

A number of program modules may be stored on the hard disk, magnetic disk 120, optical disk 124, ROM 112, or RAM 110, including, e.g., an operating system (OS) 128, a runtime 130, a host application 132 (hereinafter often referred to as "host" 132), other program modules 136, and program data 138. The OS provides functions, such as file management, event handling, processes and threads, memory management, user interfaces (e.g., windowing, menus, dialogs, etc.), security, authentication, verification, and/or the like.

The runtime 130 and the host application 132 expose runtime hosting interfaces 131 (RHIs) for application developers to abstract, customize, and tightly integrate process execution between the hosting application and the runtime. Exemplary such RHIs are presented in the Appendix beginning at page 26 of this document, wherein host interfaces 133 are prefaced with "IHost" and Runtime interfaces 134 are prefaced with "IRuntime." The RHIs substantially extend the functionality of conventional interfaces between runtimes and hosts by allowing host application(s) to customize and control many more aspects of the runtime 130 than possible in existing implementations. This provides substantially tighter execution environment integration between the runtime 130 and host 132 execution models as compared to conventional host/runtime execution environment integration.

For purposes of this discussion, an "abstraction" is a function/method that is optionally implemented by the application developer in the host application. The host-implemented function is abstract, because it will essentially replace a thread of execution that the runtime would have followed had the host not implemented the function. In line with this, APIs exposed by the host 132 (i.e., host abstraction interfaces 133) for the runtime to redirect services to host-implemented functionality and/or exposed by the runtime 130 (i.e., runtime interfaces 134) for the host to notify the runtime of host action are called "abstracted" or "abstraction interfaces."

Host abstraction interfaces (HAIs) 133 are implemented by host application 132 and are mapped to any combination of memory, threading, I/O completion, synchronization, assembly loading, security context and impersonation, and/or other service functionalities provided by the host. Cooperative exchange between the runtime 130 and the host application 132 of information corresponding to the HAIs 133 allow the respective entities to negotiate which functions are to be performed by the host, and which functions are to be abstracted such that they are carried out by the runtime. As such the host application can customize its execution environment. Exposed HAIs further allow the runtime to configure certain host execution environment parameters, and notify the host (e.g., via supplied callbacks) of particular runtime events (e.g., resource allocation failures, thread state, etc.).

Runtime interfaces (RIs) 134 for use by the host application 132 to configure runtime operations, notify the runtime of certain events, to obtain additional information during process execution, and so on. During process execution, host application calls to the RI are: redirected back to the host application via one or more HAIs 133 for host specific implementation of a specific service, handed to the operating system 128 for execution, handled locally by the runtime, and/or communicated to object model services (i.e., "other program modules" 136).

Memory Abstraction Interfaces

A memory management portion of the runtime hosting interfaces (RHIs) 131:

Allow the host 132 to provide an interface (i.e., one of the exposed host application interfaces (HAIs) 133) through which the runtime 130 will request all memory allocations. In one implementation, the host interface 133 provides methods that replace both OS memory API's and standard C runtime allocation routines.

Provide a mechanism for the host 132 to abstract the low memory notification the runtime 130 currently gets from the OS. This provides the host with a mechanism to ask the runtime 130 to make additional memory available, for example, via garbage collection services.

Allow the runtime 130 to inform the host 132 of the consequences of failing a particular allocation, and further allow the host to customize the action the runtime should take if an allocation must be failed. For example, should the runtime unload an application domain or let it run in a "crippled" state.

The following scenario provides an exemplary use of the memory portion of the RHI 131. Suppose host 132 operates within a configurable amount of memory 110 (e.g., some or nearly all of the physical memory on the computing device 102). To maximize performance, the host tracks all memory allocations and insures that paging never occurs (the host of this example would rather fail a memory allocation than page to disk 116). To accurately track all allocations, the host directs the runtime 130 to call an exposed host abstraction interface (HAI) 133 to allocate memory. This gives to the host the ability to fail the runtime's memory allocations before paging occurs.

Threading Abstraction Interfaces

This section details the thread management portion of the RHI 131. These thread management hosting API's abstract the notion of an OS thread and essentially let the unit of scheduling and execution be defined by the host 132. This supports hosts that implement their own fiber-based scheduling mechanism. The term "task" is often used to define this abstraction and used to decouple the word "thread" from a particular host application's unit of execution and scheduling. In view of this, the thread management APIs:

Allow the host 132 to provide an interface 133 that the runtime 130 will use to create and start new tasks (threads).

Provide the host 132 with a mechanism to "reuse" or pool, a runtime-implemented portion of a task. This allows for performance optimization that can be used by a host application to minimize host-implemented task creation and setup operations.

Implement a callback to notify the runtime 130 when a task has been moved to or from a runnable state. When a call is moved from a runnable state, the host API 133 allows the runtime 130 to specify that the task should be rescheduled by the host 132 as soon as possible.

Provide a way for the runtime 130 to notify the host 132 that a given task cannot be moved to a different physical OS thread and cannot have its execution blocked during a specified window of time. Allow the host 132 to provide an implementation of the thread pool, providing the runtime 130 with the ability to queue work items, set and query the size of the thread pool, and so on.

Provide notifications on both the host 132 and runtime 130 side that the "locale" has been changed on a given task. A locale is related to localization of software. The runtime 130 includes a notion of current locale, and most hosts applications 132 do as well. These notification interfaces allow the runtime 130 and the host 132 to tell each other if the locale has been programmatically changed on either side—so both sides are kept in sync. For example, if the locale is changed on the runtime side, that may affect sorting order in a database implemented by the host 132.

Allow the runtime 130 to delay host 132 abort of a given task.

Provides means for the runtime 130 (and user code) to adjust the priority of a task.

The following scenario provides an exemplary use of the thread management portion of the RHI 131. Suppose that a particular host application 132 implements "fiber mode" execution. In fiber mode, a particular host (e.g., a scalable server side application in an SQL server) may create some number of threads based on the number of processors 104 on the computing device 102, or based on other host-specific criteria. The host then creates fibers on those threads on which to run user code (a portion of "other program modules" 136). The host schedules these fibers in a cooperative fashion (called non-preemptive in host terminology)—when a fiber blocks for some operation, it gets "switched out" and the thread runs another fiber. Later the fiber will get rescheduled and run—not necessarily on the same thread. When the runtime 130 creates a "task" through the hosting API 134, it ends up as a fiber in the host 132 and is natively understood by the host's scheduler.

I/O Completion Abstraction Interfaces

This section details the I/O completion management portion of the RHI 131, wherein:

The host 132 provides an HAI 133 for the runtime 130 to bind a handle to an I/O completion port.

The host 132 provides an HAI 133 for the runtime 130 to supply a callback. The callback, for example, to be invoked by the host 132 when an asynchronous I/O operation completes.

The runtime 130 provides an RI 134 for the host 132 to insert custom data at the end of the OVERLAPPED structure passed to runtime service I/O routines. An OVERLAPPED structure provides data-like file pointer position.

Synchronization

If the runtime 130 creates one or more tasks through HAIs 133 (i.e., via direction of the host application 132), the runtime will also create the synchronization objects for those task(s) through corresponding HAIs as well. This ensures that locks are not taken on an OS thread without the host's knowledge. This allows runtime 130 tasks to further integrate with the hosts thread scheduling mechanism and to allow the host to perform deadlock detection. To this end, the synchronization management portion of the RHI 131 allows the runtime 130 to create the following synchronization ("sync") primitives through the HAIs 133: critical sections, events (manual and auto-reset), semaphores, reader/writer locks, and monitors.

Abstraction Interfaces for Entering and Leaving the Runtime

Threads running managed code can leave the runtime 130 to run unmanaged code. Locks taken on threads that leave the runtime 130 to run unmanaged code won't go through the RHI 131 so they can't be integrated with the threading and synchronization models of the host application 132. As such, the runtime notifies the host application via a host-implemented callback (the callback being provided by the host to the runtime through a corresponding RI 134) when a thread is entering or leaving the runtime 130 respectively to/from unmanaged code. In view if this, the runtime:

Notifies the host 132 when a thread transitions into and out of the runtime 130. Such notifications are implemented by hooking calls out-of and into the runtime regardless of whether code has been compiled in a Just-In-Time (JIT) compiling scenario or in a native image compilation scenario (e.g., ngen). In one implementation, the notification includes the address of the routine being called.

Allows the host 132 to specify that a particular function call to unmanaged code and corresponding runtime re-entry is not to be hooked by the runtime 130 for such notification. Such host specification allows the runtime to implement the particular call in an optimized manner (e.g., implementing the call inline). Hosts can use this interface to bypass the hook for calls they "know about" (i.e., calls that are either a part of the implementation of the host itself or of tightly integrated functionality).

For example, such a host-implemented callback allows the runtime 130 to send the host 132 a "notification" (a call to the hook) that tells the host that a particular thread's behavior can no longer be predicted since it has exited the runtime 130 into user code. Responsive to such a notification, the host 132 may take proactive steps to ensure that the particular thread is not scheduled by the host 132 to participate in any non-preemptive scheduling activity particular to the host's specific implementation, until the thread returns to the runtime.

In one implementation, such a hook can be used by the host 132 to adjust the floating point state of a processor 104. The host 132 may also utilize the RI 134 to indicate that one or more particular function calls are not to be hooked by the runtime 130, for example, to avoid runtime notifications when the host calls a data access API.

Abstraction Interfaces for Assembly Loading

The assembly loading abstraction, an exemplary implementation of which is described in the Appendix, section 1.10, comprises interfaces that allow hosts to customize the assembly loading process. Specifically, hosts can supply a list of assemblies that should be loaded domain-neutral and customize the way assemblies are located and loaded. In this implementation, interfaces in the Assembly Loading Abstraction include:

IHostAssemblyManager. The runtime 130 asks for this top level interface through IHostControl::GetHostManager when the runtime 130 is initialized. If an implementation of this interface is provided, it is assumed that the host 132 wishes to control some aspect of the assembly binding process. IHostAssemblyManager contains methods for the host 132 to provide the list of assemblies that should be loaded domain-neutral, the list of assemblies to which runtime 130 should bind, and to supply an implementation of IHostAssemblyStore through which the host 132 can implement their own custom assembly resolution process.

IHostAssemblyStore. To load an assembly from somewhere other than the file system, a host 132 typically catches an AssemblyResolve event on System.AppDomain and provides a byte array containing the assembly's bits. An implementation of IHostAssemblyStore provides additional host-specific stores from which it can bind. If an IHostAssemblyStore is provided, runtime 130 will call back to the host 132 through this interface when binding to an assembly. The host 132 is free to load the assembly from anywhere it chooses and with whatever rules it deems appropriate. In essence, hosts can use IHostAssemblyStore to completely "bypass" Runtime 130 if so desired. A instance of the AssemblyBindInfo structure is passed to define the assembly each time a binding request occurs to the custom assembly store. This structure describes the identity of the assembly being requested along with information about whether there is any version policy present on the machine that might affect the bind.

IRuntimeAssemblyReferenceList. Host 132 communicates information about assemblies, such as the list to load domain-neutral or the list loaded by the runtime 130 (not from the host 132 store) by creating a list of these assembly references, accessed by an instance of IRuntimeAssemblyReferenceList. This instance is created via IRuntimeAssemblyIdentityManager::GetRuntimeAssemblyReferenceList.

Each of these assembly loading abstraction interfaces are described in greater detail below in the Appendix, section 1.10

Abstraction Interfaces for Security

Hosts 132 may choose to control all framework and user code access to thread tokens and to ensure complete security context information is passed across async points or points of restricted context execution. The actual context information unique to the host 132 is encapsulated in an instance of an interface IHostSecurityContext. This is opaque to the runtime 130 and will be captured and moved across threadpool worker item dispatch, finalizer execution, and both module and class constructor execution. Aspects of an exemplary security abstraction interface are described in greater detail below in the Appendix, section 1.11

Abstraction Interfaces for Host Protection (1.12.4)

The .Net Framework class library provides an extensive set of built in functionality to hosted user code. In addition, third party class libraries exist to provide everything from statistical and math libraries to libraries of new UI controls. Yet, the full extent of functionality provided by a set of class libraries may not be appropriate in particular hosting scenarios. For example, displaying user interface in server programs or services is not useful, or allowing user code to exit the process cannot be allowed in hosts 132 that require long process lifetimes.

A host's designation of which categories of functionality to restrict can be thought of as falling into three general buckets:

Categories of functionality that may cause the hosted user code to be instable, but do not affect the overall host 132 stability. These categories may not be callable by partially-trusted code, but are ok to be called from fully-trusted code.

Categories of functionality that do cause host 132 instability (i.e process exit). In this implementation, members in these categories are not be called in the host 132 process, regardless of the amount of trust the code has been granted.

Categories of API's currently covered by Code Access permissions that a host 132 chooses to deny even in full-trust context. Hosts 132 restrict use of these API's via the RefusedSet property of the AppDomainManager class, which effectively injects a CAS deny at the tip of the thread's security evaluation.

To address this need to selectively configure certain hosting scenarios, IRuntimeHostProtectionManager provides the host 132 with a means to block classes, methods, properties and fields that offer a particular category of functionality from being loaded in the process. A host 132 may choose to prevent the loading of a class or the calling of a method for a number of reasons including reliability and scalability concerns, or because the functionality doesn't make sense in that host's environment as in the examples described above.

These and other aspects of an exemplary host protection abstraction interface are described in greater detail below in the Appendix, section 1.12.4.

Abstraction Interfaces for Debugging (1.12.2)

For debugging purposes, hosts 132 may want to group tasks by some host-specific logical construct like a connection, session or request. In this way, a developer who is debugging a particular session (for example) only sees the tasks involved in processing that session—it does not see every task running in the process. This interface provides methods that allow hosts 132 to associate a list of runtime tasks with a given id and friendly name. In this implementation, the id, the name, and the list of associated tasks have meaning independent of the runtime 130 (for purposes of this call). That is, the runtime 130 blindly passes the parameters on to the debugger.

Get and SetDacl methods allow the host 132 to either set or retrieve the Access Control Lists (ACLs) on events and shared memory used by the debugger. If the events or shared memory are already in use, setting new ACL's will fail. Likewise, upon creation, restrictive ACL's can be set which disallow debugging (access-denied ACE's in the ACL). If A caller wants to preserve the semantic of the default ACL values when calling SetDacl, the Administrators group and the current process owner may be added to the ACL, in addition to other required users. If GetDacl is called before SetDacl, the returned ACL is the default ACL placed on the debug memory block by the runtime 130.

These and other aspects of an exemplary debugging abstraction interface are described in greater detail below in the Appendix, section 1.12.2.

Abstraction Interfaces for Shutting Down the Runtime

During process shutdown, an operating system (OS) may terminate threads at unpredictable points, possibly while they still hold locks taken through a host's critical section implementation. In traditional implementations, those locks are orphaned and future threads which attempt to acquire them will block. If the remaining live thread, executing under the OS loader lock, attempts to acquire one of these orphaned locks, the process will deadlock.

To avoid this, the systems and methods for enhanced runtime hosting described herein allow the host application 132 (FIG. 1) to imitate the OS's process shutdown behavior. When a process is shutting down, the OS will allow locks orphaned by other threads to be entered by the current thread holding the OS loader lock. This effectively makes locks irrelevant during shutdown because any lock can be successfully taken.

In one implementation, there are several ways the host 132 can be aware of process shutdown. These implementations describe APIs that are discussed in greater detail below. The first is that the host calls ExitProcess. Here the host has an opportunity to notify its locks, for example by setting a flag globally available to all locks, that they should feel free to let threads enter and leave freely. The host can also use the IActionOnCLREvent notification. The host will receive notification of the CLR becoming disabled and at this point a host can again inform its locks that they should let threads enter/leave freely.

Additionally, the host 132 may use another tactic. The host can prohibit managed code from calling ExitProcess by denying the code access permission required. To exit, the host can then call TerminateProcess and DllMain will not to run at all. This ensures that no deadlocks occur.

An Exemplary Procedure for Enhanced Runtime Hosting

Figure 2:
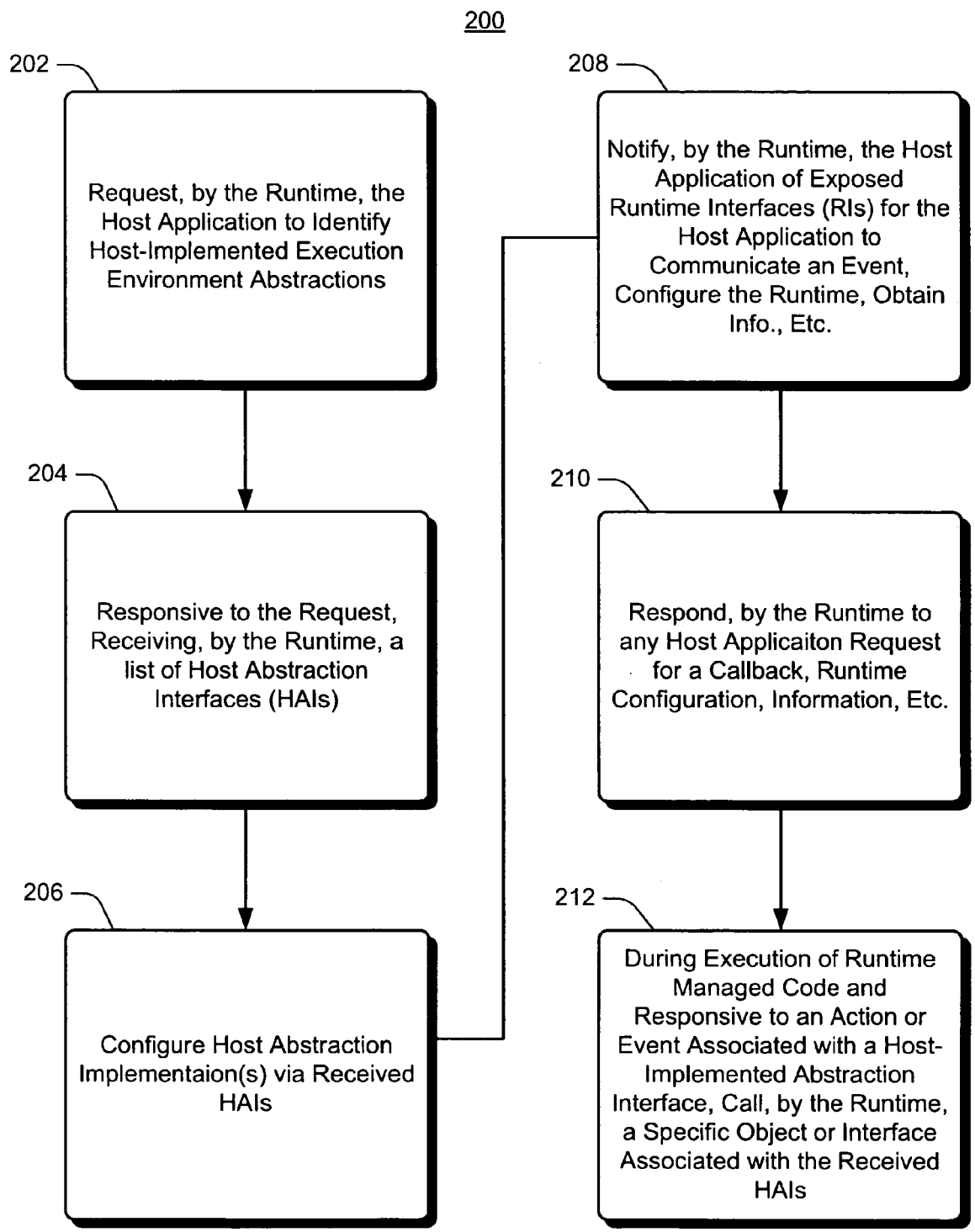
FIG. 2 shows an exemplary procedure to provide enhanced runtime hosting.

FIG. 2 shows an exemplary procedure for enhanced runtime hosting. For purposes of discussion, the operations of FIG. 2 are discussed in reference to features of FIG. 1. Although FIG. 2 shows operations 204-212 in a particular numerical order, these respective operations could logically occur in any order as a function of host application 132 and runtime 130 interaction, characteristics of the execution environment, and so on.

At block 202, after the host application 132 (FIG. 1) has loaded the runtime 130 (FIG. 1) into a process (i.e., startup time), the runtime 130 determines any host-implemented execution environment abstractions (i.e., host supported abstractions). For purposes of discussion, the process is represented by the respective host 132 and runtime 130 components in RAM 110 (FIG. 1). (Whether or not a particular abstraction is supported by the host is not central to how the runtime executes). In one implementation, this operation is accomplished with a request/call by the runtime to an exposed HAI 133 with a list indicating execution environment abstractions of interest. Such a request is represented as a portion of "program data" 138 of FIG. 1. Responsive to this request/call, the host provides the runtime 130 with one or more abstraction-specific interfaces (respective APIs in the HAIs 133) through which to access host-implemented execution environment abstractions (e.g., memory, thread, synchronization, I/O completion, policy, and/or other implemented abstractions).

At block 204, responsive to the runtime request for information regarding which, if any, execution environment abstractions are implemented/supported by the host application 132, the runtime 130 receives a list of HAIs 133 that correspond to abstracted functionality. Such HAIs may reference objects and/or interfaces. At block 206, the runtime may configure abstracted functionality implementation(s) via one or more of the received HAIs.

At block 208, the runtime 130 notifies the host application 132 of one or more runtime interfaces 134 (RIs) exposed by the runtime. In this implementation, such a notification is responsive to a request sent to the runtime 130 by the host application 132. Such a notification and request are represented as respective portions of "program data" 138 of FIG. 1. Such RIs allow the host to notify the runtime of certain events and/or to obtain additional information during process execution. In one implementation, the RI is a callback utilized by the host to notify the runtime of certain events or to obtain additional information during process execution. At block 210, the runtime responds to any host application configuration requests, request for a callback, runtime data, and/or the like.

At block 212, during execution of managed code and responsive to one or more actions or events associated with host-application abstracted functionality, the runtime calls at least one specific interface or object corresponding to a specific one of the returned HAIs. Such actions and events correspond, for example, to management services for memory, threads/tasks, I/O completion, synchronization, event notification(s), garbage collection (GC), and/or the like.

Exemplary Architectural Between Runtime and Host Memory Abstraction

Figure 3:
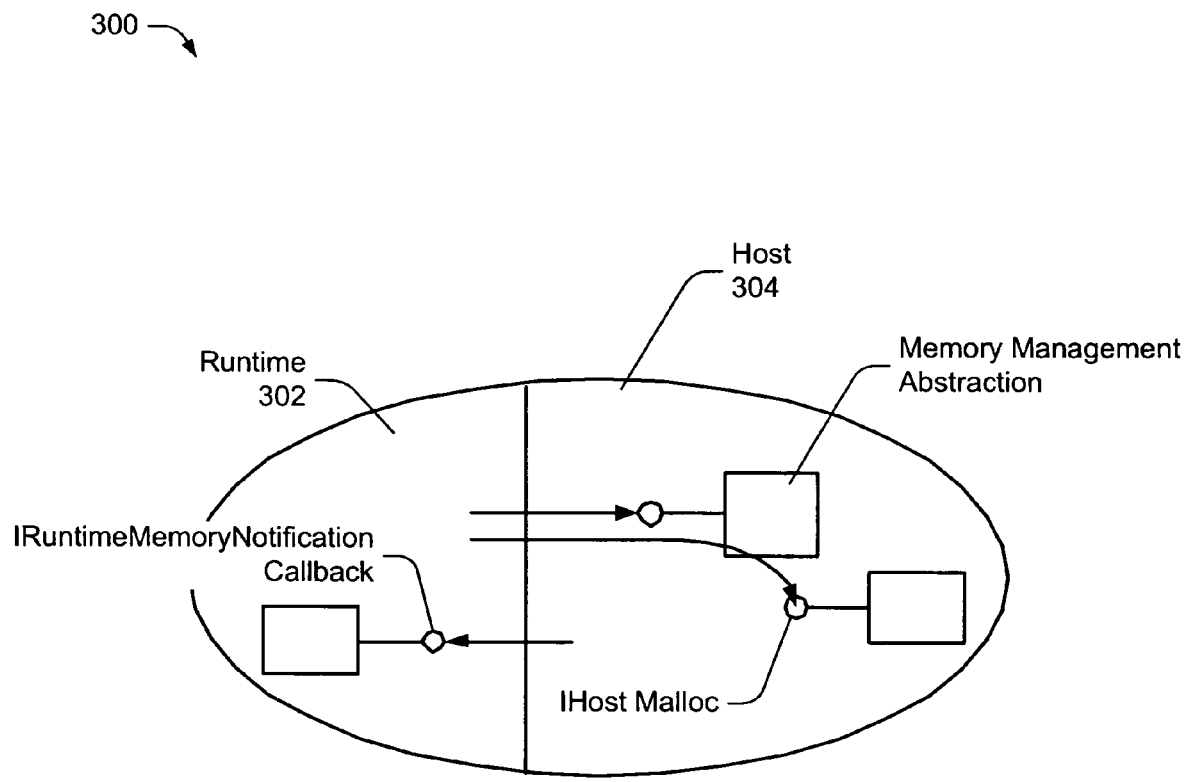
FIG. 3 shows an exemplary architectural relationship between runtime and hosting application memory abstraction interfaces. For purposes of this discussion, an "abstraction" is a function/method that is optionally implemented by the application developer in the host application. The host-implemented function is abstract, because it will essentially replace a thread of execution that the runtime would have followed had the host not implemented the function. In line with this, an application program interface used to access the host-implemented function is called an "abstracted" or "abstraction interface".

FIG. 3 shows an exemplary architectural relationship between runtime and hosting application memory abstraction interfaces. A memory management abstraction of the runtime hosting interfaces allow the host 304 to provide an interface (i.e., one of the exposed host application interfaces (HAIs) 133) through which the runtime 302 will request all memory allocations. In one implementation, the host interface 133 provides methods that replace both operating system memory API's and standard C runtime allocation routines.

The memory management abstraction of the runtime hosting interfaces may provide a mechanism for the host 304 to abstract the low memory notification the runtime 302 currently gets from the operating system. This provides the host 304 with a mechanism to ask the runtime 302 to make additional memory available, for example, via garbage collection services.

The memory management abstraction of the runtime hosting interfaces allow the runtime 302 to inform the host 304 of the consequences of failing a particular allocation, and further allow the host 304 to customize the action the runtime 302 should take if an allocation must be failed. For example, should the runtime 302 unload an application domain or let it run in a "crippled" state.

Exemplary Architectural Relationship Between Runtime and Host Interfaces

Figure 4:
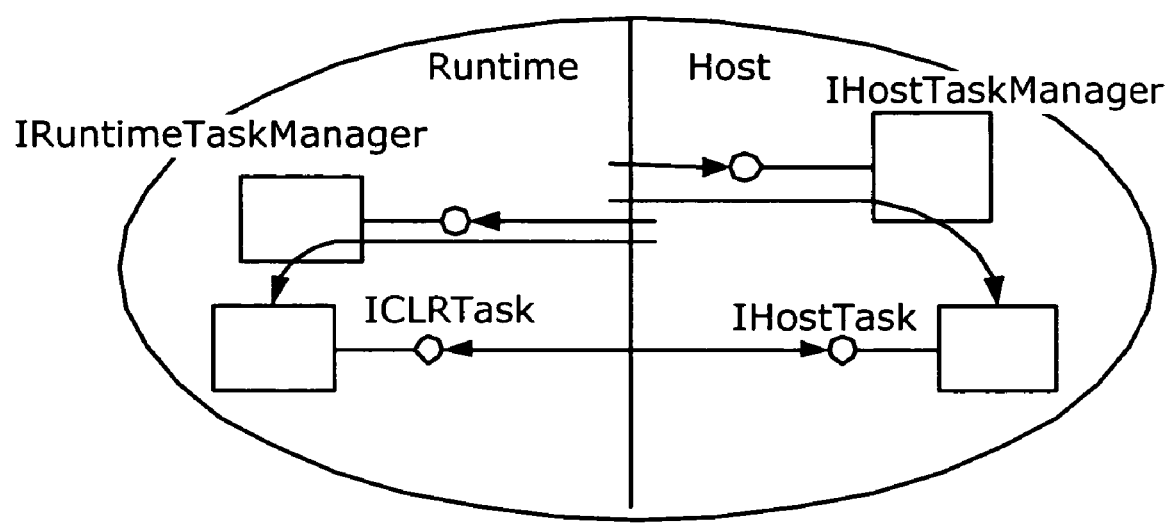
FIG. 4 shows an exemplary architectural relationship between runtime and hosting application thread abstraction interfaces.

FIG. 4 shows an exemplary architectural relationship between runtime and host application thread abstraction interfaces. The four interfaces shown are IRuntime Task Manager, IHost Task Manager, ICLR (Common Language Runtime) Task, and IHost Task. The thread management APIs may allow the host to provide an interface 133 that the runtime may use to create and start new tasks (threads) and may provide the IHost Task Manager with a mechanism to "reuse" or pool, a runtime implemented portion of a task. This allows for performance optimization that may be used by a host application to minimize host-implemented task creation and setup operations.

The thread management APIs may implement a callback to notify the IRuntime Task Manager, when a task has been moved to or from a runnable state. When a call is moved from a runnable state, the host API allows the runtime to specify that the task should be rescheduled by the host as soon as possible. Furthermore, the thread management API may provide a way for the IRuntime Task Manager to notify the host that a given task cannot be moved to a different physical operating system thread and cannot have its execution blocked during a specified window of time.

As shown in FIG. 4, the four interfaces comprise the threading abstraction of this implementation:

IHostTaskManager. Implemented by the host 132 and discovered by the runtime 130 via IHostControl::GetHostManager. Allows the runtime 130 to work with tasks through the host 132 instead of using standard OS threading or fiber API's. This interface provides methods for the runtime 130 to create and manage tasks, to notify the host 132 that the locale has been changed through the BCL, to provide hooks for the host 132 to take action when control is transferring in/out of the runtime 130 to run unmanaged code.

IRuntimeTaskManager. Hosts can use IRuntimeTaskManager to create runtime tasks explicitly and to get the currently running runtime task.

IHostTask. The runtime 130 creates tasks using IHostTaskManager. Every task created through IHostTaskManager has a representation on the host 132 side and on the runtime 130 side. IHostTask is the task's representation on the host 132 side while IRuntimeTask below for the corresponding interface on the runtime 130 side. Once the task has been created, IHostTask allows the runtime 130 to perform various actions on the task including staffing it, setting its priority, alerting it, and other similar functions.

IRuntimeTask. The runtime's representation of the task. There is always a corresponding instance of an IHostTask on the host 132 side. The host 132 calls IRuntimeTask to notify the runtime 130 about the state of the task, including when the task is moving to or from the runnable state, or when it is being aborted.

As described above, each task running in a hosted environment has a representation on the host 132 side (an instance of IHostTask) and a representation on the runtime 130 side (an instance of IRuntimeTask). The host 132 task and runtime task objects should be associated with each other in order for the host 132 and the runtime 130 to properly communicate about the underlying task. The two task objects should be created and associated before any managed code can run on the OS thread.

The process of creating a new task and its associated task objects can be initiated either by the host 132 or by the runtime 130. The runtime 130 will begin the process of creating new tasks when it is first setting up a thread to run managed code. This occurs during the runtime's initialization process, when a user explicitly creates a thread using the classes in System.Threading or when the size of the thread pool grows.

In these scenarios, the steps taken to setup the new task include, for example, the following:

The runtime 130 will create a runtime task and the corresponding IRuntimeTask internally. Note: runtime tasks can also be "recycled"—instead of creating a new runtime task from scratch, the runtime 130 may choose to grab a task from its cache of recycled tasks. See IRuntimeTask::Reset for details.

The runtime 130 will then call IHostTaskManager::CreateTask to create a host 132 task to associate with the new runtime task.

The association is made when the runtime calls SetRuntimeTask on the new IHostTask.

Abstraction Interfaces for Entering and Leaving the Runtime

Figure 5:
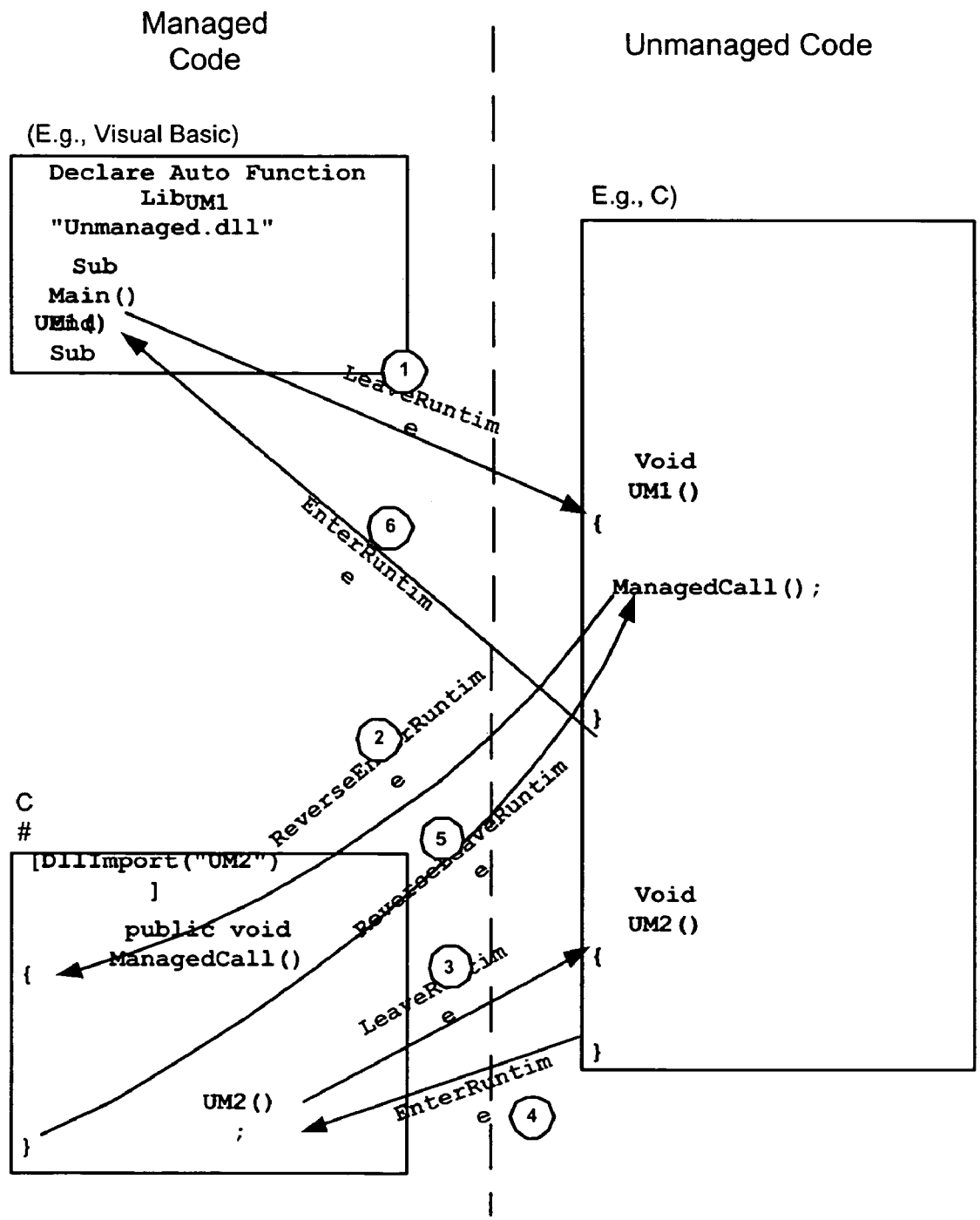
FIG. 5 shows exemplary managed/unmanaged code call sequences for exiting/reverse-exiting and entering/reverse-entering managed code from/to unmanaged code to/from unmanaged code.

FIG. 5 shows exemplary managed/unmanaged code call sequences for exiting (leaving)/reverse-exiting and entering/reverse-entering managed code from/to unmanaged code to/from unmanaged code. Threads running managed code may leave the runtime 130 to run unmanaged code. Locks taken on threads that leave the runtime 130 to run unmanaged code will not go through the RHI 131 so they may not be integrated with the threading and synchronization models of the host application 132. As such, the runtime notifies the host application via a host-implemented callback (the callback being provided by the host to the runtime through a corresponding RI 134) when a thread is entering or leaving the runtime 130 respectively to/from unmanaged code. In view of this, the runtime:

Notifies the host 132 when a thread transitions into and out of the runtime 130. Such notifications are implemented by hooking calls out-of and into the runtime regardless of whether code has been compiled in a Just-In-Time (JIT) compiling scenario or in a native image compilation scenario (e.g., ngen). In one implementation, the notification includes the address of the routine being called.

Allows the host 132 to specify that a particular function call to unmanaged code and corresponding runtime re-entry is not to be hooked by the runtime 130 for such notification. Such host specification allows the runtime to implement the particular call in an optimized manner (e.g., implementing the call inline). Hosts can use this interface to bypass the hook for calls they "know about" (i.e., calls that are either a part of the implementation of the host itself or of tightly integrated functionality).

For example, such a host-implemented callback allows the runtime 130 to send the host 132 a "notification" (a call to the hook) that tells the host that a particular thread's behavior can no longer be predicted since it has exited the runtime 130 into user code. Responsive to such a notification, the host 132 may take proactive steps to ensure that the particular thread is not scheduled by the host 132 to participate in any non-preemptive scheduling activity particular to the host's specific implementation, until the thread returns to the runtime.

In one implementation, such a hook may be used by the host 132 to adjust the floating point state of a processor 104. The host 132 may also utilize the RI 134 to indicate that one or more particular function calls are not to be hooked by the runtime 130, for example, to avoid runtime notifications when the host calls a data access API.

Runtime Tasks Treated as Fibers

Figure 6:
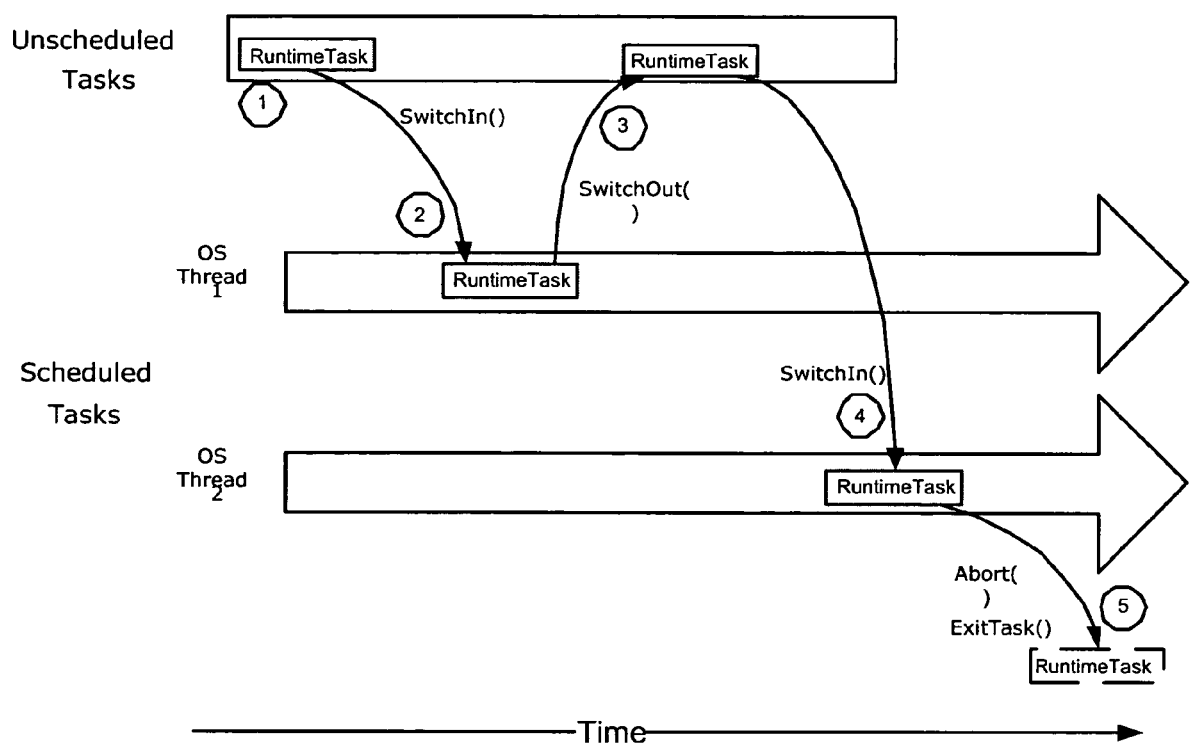
FIG. 6 is a block diagram showing exemplary task scheduling of runtime tasks that are treated as fibers scheduled on OS threads by a host application.

FIG. 6 is a block diagram showing exemplary task scheduling of runtime tasks that are treated as fibers scheduled on operating system threads by a host application. The term "task" is often used to define this abstraction and used to decouple the word "thread"from a particular host application's unit of execution and scheduling.

A thread management API may allow the host to provide an interface that the runtime may use to create and start new tasks, such as an OS Thread 1 and an OS Thread 2. The thread management API may provide the host with a mechanism to "reuse" or pool, a runtime implemented portion of a task. This allows for performance optimization that may be used by a host application to minimize host-implemented task creation and setup operations.

By way of illustration, a host application implements a "fiber mode" execution. In fiber mode, a particular host (e.g., an SQL server) may create some number of threads based on the number of processors on the computing device, or based on other host-specific criteria. The host then creates fibers on those threads on which to run user code (a portion of "other program modules"). The host schedules these fibers in a cooperative fashion (called non-preemptive in host terminology) - when a fiber blocks for some operation, it gets "switched out" and the thread runs another fiber. Later the fiber will get rescheduled and Run—not necessarily on the same thread. When the runtime creates a "task" through the hosting API, it ends up as a fiber in the host and is natively understood by the host's scheduler.

For example, FIG. 6 shows how the fibers may operate as "SwitchIn" and how the fibers may block for some operation, shown as "SwitchOut". In these instances, the OS Thread1 or OS Thread2 may run another fiber once the fiber becomes blocked, shown as SwitchOut.

This SwitchIn notifies the runtime 130 that the task is now in the runnable state. A handle to the OS thread that the task has been scheduled on is passed as a parameter. If impersonation has been done on this thread, it should be reverted (RevertToSelf) before switching in the runtime task. SwitchIn cannot be called twice without a corresponding SwitchOut. A thread handle is a handle to the physical thread this task is running on. SwitchOut notifies the runtime 130 that the task has been removed from the runnable state.

The thread management APIs may allow the host to provide an implementation of the thread pool, providing the runtime with the ability to queue work items, set and query the size of the thread pool, or other types of queuing. In addition, the thread management APIs may provide notifications to the runtime and to the host that a "locale" has been changed on a given task. The locale is related to localization of software. The runtime includes a notion of current locale, and most hosts applications do as well. These notification interfaces allow the runtime and the host to tell each other if the locale has been programmatically changed on either—side so both sides are kept in sync.

For example, if the locale is changed on the runtime side, that may affect sorting order in a database implemented by the host. In addition, the thread management APIs may allow the runtime to delay host abort of a given task and may provide means for the runtime (and user code) to adjust the priority of a task.

Enter/Leave Methods

Figure 7:
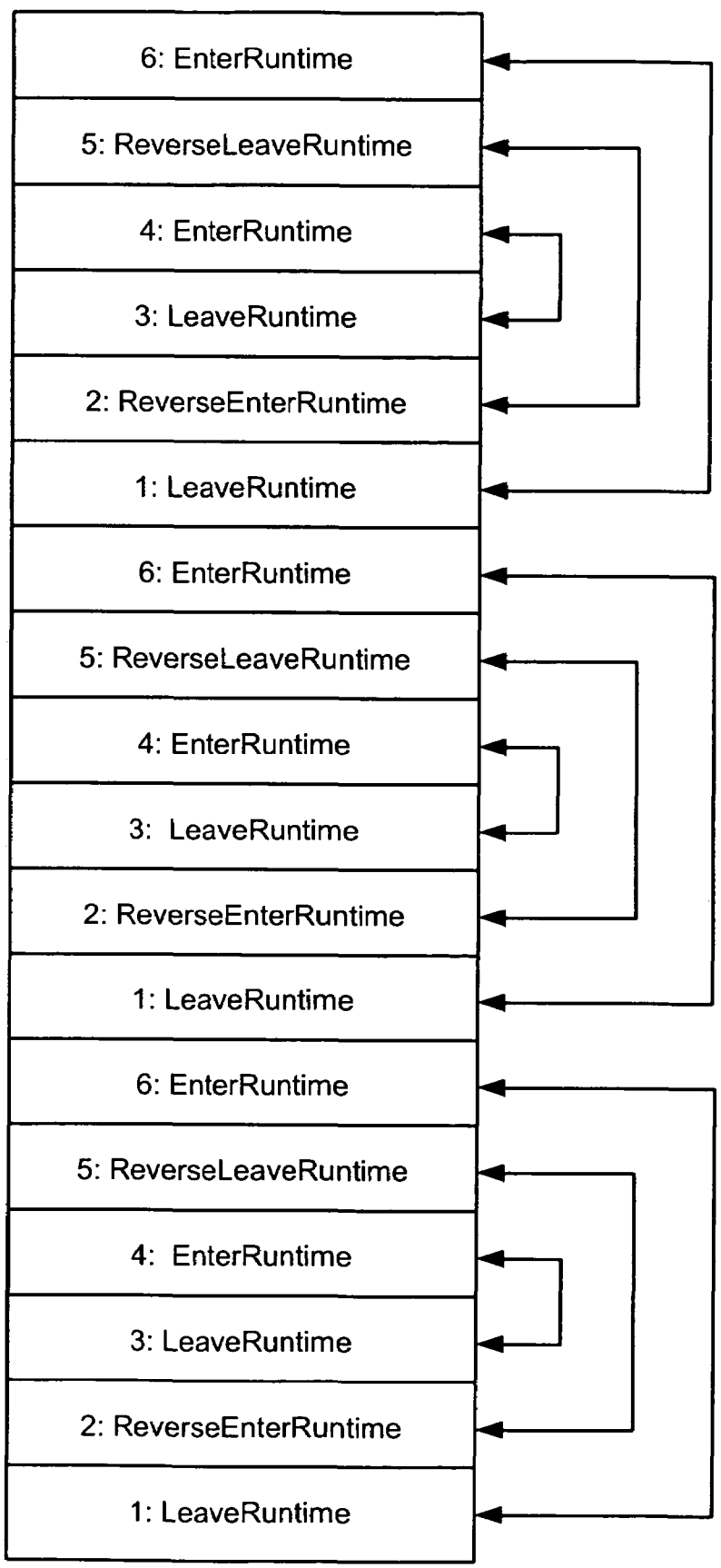
FIG. 7 shows an exemplary full stack of calls that were pushed and later popped between runtime and hosting application thread abstraction interfacing operations.

FIG. 7 shows the host 132 interface has two sets of enter/leave methods to differentiate nested calls from their "outer level" calls: Leave/EnterRuntime and ReverseLeave/ReverseEnterRuntime. The series of calls to LeaveRuntime, EnterRuntime, ReverseLeaveRuntime and ReverseEnterRuntime in these scenarios form a "stack" that lets the host 132 identify the nesting layers. By way of illustration, shown is an exemplary full stack of calls that were pushed and later popped between runtime and hosting application thread abstraction interfacing operations. As shown, LeaveRuntime is called when an "outer level" call is about to leave the runtime 130 and enter unmanaged code, shown in FIG. 5.

Assembly Loading Abstraction

Figure 8:
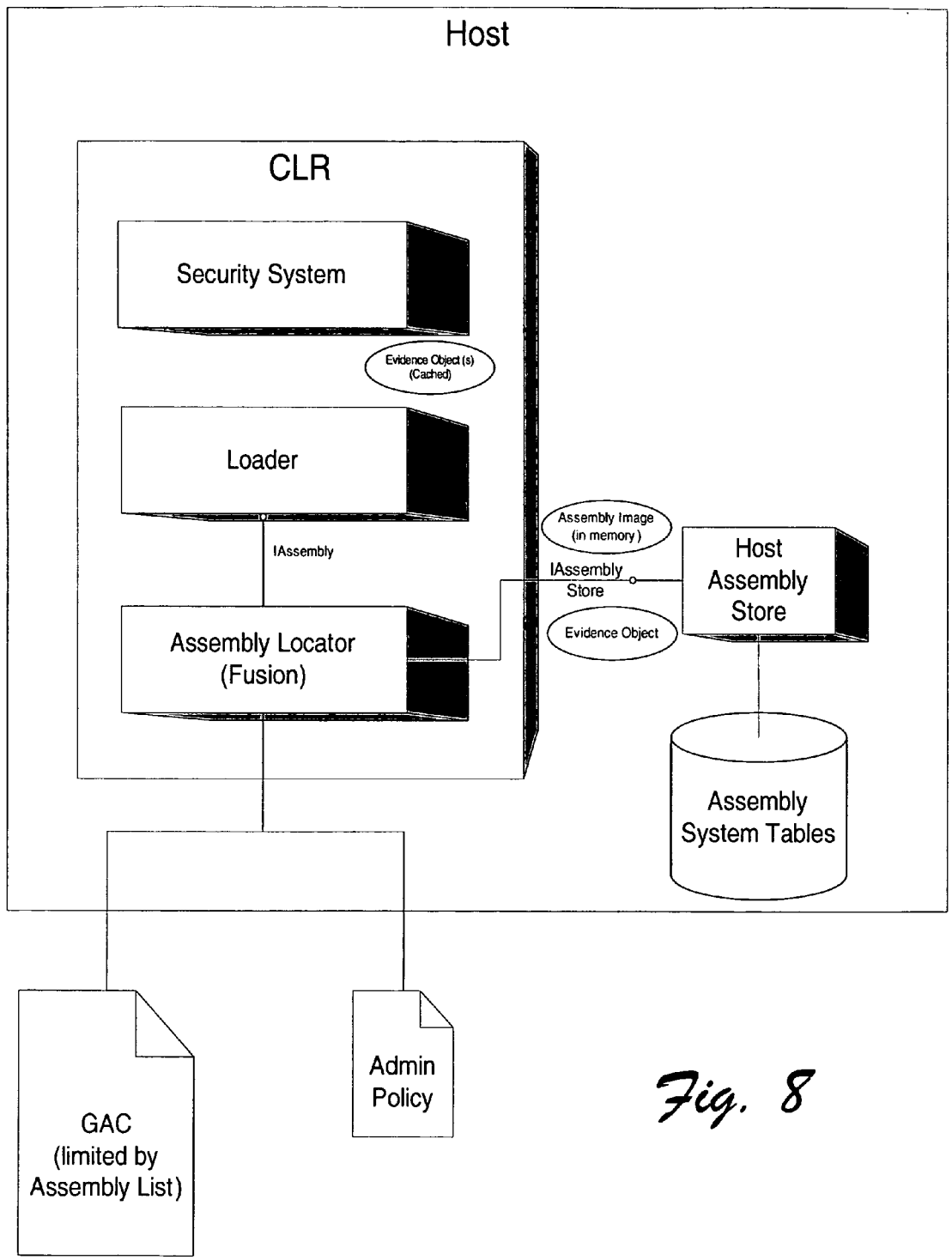
FIG. 8 shows how an exemplary implementation of the IHostAssemblyStore component fits into the assembly loading architecture of FIG. 1.

FIG. 8 shows the assembly loading abstraction consists of interfaces that allow hosts to customize the assembly loading process. Specifically, hosts can supply a list of assemblies that should be loaded domain-neutral and customize the way assemblies are located and loaded. The interfaces in the Assembly Loading Abstraction are:

IHostAssemblyManager. The runtime 130 asks for this top level interface through IHostControl::GetHostManager when the runtime 130 is initialized. If an implementation of this interface is provided, it is assumed that the host 132 wishes to control some aspect of the assembly binding process. IHostAssemblyManager contains methods for the host 132 to provide the list of assemblies that should be loaded domain-neutral, the list of assemblies to which runtime 130 should bind, and to supply an implementation of IHostAssemblyStore through which the host 132 can implement their own custom assembly resolution process.

IHostAssemblyStore. To load an assembly from somewhere other than the file system, a host 132 typically catches an AssemblyResolve event on System.AppDomain and provides a byte array containing the assembly's bits. An implementation of IHostAssemblyStore provides additional host-specific stores from which it can bind. If an IHostAssemblyStore is provided, runtime 130 will call back to the host 132 through this interface when binding to an assembly. The host 132 is free to load the assembly from anywhere it chooses and with whatever rules it deems appropriate. In essence, hosts can use IHostAssemblyStore to completely "bypass" Runtime 130 if so desired.

Conclusion

The described systems and methods provide enhanced runtime hosting. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

APPENDIX

Exemplary Runtime Hosting Interfaces

This APPENDIX to the detailed description is described with reference to the accompanying figures. In the figures, the left-most digit of a reference number identifies the particular figure in which the component first appears.

Contents

1. Functional Design 33
1.1. Naming Conventions 34
1.2. Common HRESULTs 34
1.3. Deferred Runtime Startup 35
1.4. Top-Level Interfaces 36
1.4.1. IRuntimeRuntimeHost 36
1.4.2. IHostControl 41
1.5. Memory Abstraction Interfaces 44
1.5.1. IHostMemoryManager 45
1.5.2. IHostMalloc 53
1.5.3. IRuntimeMemoryNotificationCallback 55
1.6. Threading Abstraction Interfaces 56
1.6.1. Threads Not Under Host Control 57
1.6.2. Creating Tasks 59
1.6.3. IHostTaskManager 62
1.6.4. IRuntimeTaskManager 75
1.6.5. IHostTask 78
1.6.6. IRuntimeTask 82
1.6.7. IHostGCManager 90

APPENDIX

Exemplary Runtime Hosting Interfaces 1.6.8. IHostPolicyManager 91
1.7. ThreadPool Abstraction Interfaces 93
1.7.1. IHostThreadpoolManager 93
1.8. I/O Completion Abstraction Interfaces 96
1.8.1. IHostIoCompletionManager 96
1.8.2. IRuntimeIoCompletionManager 104
1.9. Synchronization Abstraction Interfaces 106
1.9.1. IHostSyncManager 106
1.9.2. IHostCrst 114
1.9.3. IHostAutoEvent 116
1.9.4. IHostManualEvent 118
1.9.5. IHostSemaphore 119
1.9.6. IRuntimeSyncManager 121
1.10. Assembly Loading Abstraction 125
1.10.1. IHostAssemblyManager 126
1.10.2. IHostAssemblyStore 131
1.10.3. IRuntimeAssemblyReferenceList 137
1.10.4. IRuntimeHostBindingPolicyManager 138
1.10.5. IRuntimeAssemblyIdentityManager 141
1.10.6. IRuntimeProbingAssemblyEnum 147
1.10.7. IRuntimeReferenceAssemblyEnum 149
1.11. Security Context and Impersonation 150
1.11.1. IHostSecurityContext 151
1.11.2. IHostSecurityManager 151

APPENDIX

Exemplary Runtime Hosting Interfaces 1.11.3. Impersonation 151
1.11.4. Security Context Flow 154
1.11.5. Enum: EContextType 154
1.11.6. Execution of Finalizers, Class, and Module Constructors 156
1.11.7. Worker Thread Async Point 158
1.12. Runtime Configuration Interfaces 161
1.12.1. IRuntimeControl 162
1.12.2. IRuntimeDebugManager 163
1.12.3. IRuntimePolicyManager 170
1.12.4. IRuntimeHostProtectionManager 186
1.12.5. IRuntimeOnEventManager 192
1.12.6. IActionOnRuntimeEvent 193
1.12.7. IRuntimeGCManager 194

APPENDIX

Exemplary Runtime Hosting Interfaces

1. Functional Design

Several new interfaces are provided to support the abstractions described above. A host 132 implements a given abstraction by providing the runtime 130 with an abstraction-specific interface through which to call. For example, all memory allocations made by the runtime 130 will go through the host 132 if the host 132 provides an implementation of the IHostMemoryManager interface.

At startup time, the runtime 130 determines which abstractions the host 132 implements using the IRuntimeRuntimeHost and IHostControl interfaces. An IRuntimeRuntimeHost interface pointer is obtained by calling a method used to initialize the runtime 130. IRuntimeRuntimeHost provides the same methods as ICorRuntimeHost did in V1 (minus the obsolete ones), plus one additional SetHostControl. The host 132 calls SetHostControl and provides a pointer to its implementation of IHostControl.

The runtime 130 then calls the GetHostManager method on IHostControl with IID's corresponding to the abstraction-specific objects and interfaces to see which abstractions the host 132 supports. For example, to determine if the host 132 supports the memory abstraction, the runtime 130 will call IHostControl::GetHostManager with the IID for IHostMemoryManager and host 132 memory manager. If an interface is returned, the runtime 130 will call through that interface for all memory allocations made during the lifetime of the process.

APPENDIX

Exemplary Runtime Hosting Interfaces

In some cases, the abstraction-specific interfaces also contain callbacks that allow the host 132 to notify the runtime 130 of certain events or to obtain additional information at runtime.

1.1. Naming Conventions

The names of the interfaces implemented by the host 132 start with "IHost" while the names of the callbacks implemented by the runtime 130 start with "IRuntime".

1.2. Common HRESULTs

The following HRESULTs may be returned from any of the API's described in this document:

S_OK. Success.

HOST_E_RuntimeNOTAVAILABLE. The runtime 130 has not been loaded into a process or is in a state in which it cannot run managed code or successfully process the call.

E_FAIL. A method will only return E_FAIL when an unknown, catastrophic failure has occurred. After any method returns E_FAIL, the runtime 130 is no longer usable within the process. Subsequent calls to any Hosting API will return HOST_E_RUNTIMENOTAVAILABLE If a given method returns other HRESULTs, those other results will be listed in the documentation for that method.

APPENDIX

Exemplary Runtime Hosting Interfaces 1.3. Deferred Runtime Startup

Hosts 132 may wish to determine the version of the runtime which will be used within the process before explicitly initializing the runtime. An API is provided for this purpose.

```
typedef HRESULT (__stdcall *FLockClrVersionCallback) ( );
STDAPI LockClrVersion(FLockClrVersionCallback hostCallback,
    FLockClrVersionCallback *pBeginHostSetup,
    FLockClrVersionCallback *pEndHostSetup).
```

LockClrVersion is called by the host 132 prior to runtime initialization. When the runtime is first initialized, either through a call to one of the CorBindToRuntime* functions, or by COM object activation, the following occurs:

hostCallback is called by the runtime

From within the callback, the host 132 calls:

*pBeginHostSetup

CorBindToRuntime*

IRuntimeRuntimeHost::SetHostControl

IRuntimeRuntimeHost::Start
*pEndHostSetup.

Everything from *pBeginHostSetup until *pEndHostSetup happens on one thread/fiber with the same logical stack, which may be different from the thread from which hostCallback is called.

APPENDIX

Exemplary Runtime Hosting Interfaces 1.4. Top-Level Interfaces 1.4.1. IRuntimeRuntimeHost This interface provides the functionality of the ICorRuntimeHost interface implemented in V1, plus the additional method to set the host 132 control interface. Hosts 132 get a pointer to an IRuntimeRuntimeHost by calling one of the APIs used to bind or initialize the runtime 103. All hosts 132 that wish to provide implementations of one of more of the host 132 ing abstractions may use this interface instead of ICorRuntimeHost.

```
interface IRuntimeRuntimeHost : IUnknown
{
    HRESULT Start( );
    HRESULT Stop( );
    HRESULT CreateDomain([in] LPCWSTR pwzFriendlyName,
        [in] IUnknown* pIdentity Array, // Optional
        [out] IUnknown** pAppDomain);
    HRESULT GetDefaultDomain([out] IUnknown** pAppDomain);
    HRESULT EnumDomains([out] HDOMAINENUM *hEnum);
    HRESULT NextDomain([in] HDOMAINENUM hEnum,
        [out] IUnknown** ppppDomain);
    HRESULT CloseEnum([in] HDOMAINENUM hEnum);
    HRESULT CreateDomainEx([in] LPCWSTR pwzFriendlyName,
    // Optional
        [in] IUnknown* pSetup,       // Optional
        [in] IUnknown* pEvidence,    // Optional
        [out] IUnknown** pAppDomain);
    HRESULT CreateDomainSetup([out] IUnknown**
    pAppDomainSetup);
    HRESULT CurrentDomain([out] IUnknown** pAppDomain);
    HRESULT SetHostControl([in] IHostControl* pHostControl);
    HRESULT GetRuntimeControl([out] IRuntimeControl**
    pRuntimeControl);
    HRESULT UnloadAppDomain([in] DWORD dwAppDomainId);
};
```

APPENDIX

Exemplary Runtime Hosting Interfaces 1.4.1.1. Start

Initializes the runtime 130 into the process. After this call, the runtime 130 is ready to run managed code. Note in many scenarios it is not necessary to call Start explicitly as the runtime 130 will initialize itself on the first request to run managed code. However, calling Start is convenient for hosts that want to control exactly when the runtime 130 initializes.
HResults
See Common HResults 1.4.1.2. UnloadDomain Unloads the specified AppDomain from the process. Thread.Abort is called on each thread running in the domain. When all threads have terminated the domain is unloaded.

| Parameter | Description |
| --- | --- |
| pAppDomain | [in] A pointer of type __AppDomain to the domain you want to unload. |

APPENDIX

Exemplary Runtime Hosting Interfaces

HResults
See Common HResults
COR_E_CANNOTUNLOADAPPDOMAIN. The specified AppDomain could not be aborted. The most common cause of this error is a thread running in the domain could not be terminated. Other reasons include an attempt to unload the default domain or an attempt to unload a domain that has already been unloaded.

1.4.1.3. CurrentDomain

Returns an interface pointer to the AppDomain that is running on the calling thread.

| Parameter | Description |
| --- | --- |
| pAppDomain | [out] A pointer of type __AppDomain representing the calling thread's domain. |

HResults
See Common HResults 1.4.1.4. SetHostControl

SetHostControl takes an interface pointer to the host 132's implementation of IHostControl. This method is be called before the runtime has been initialized,

APPENDIX

Exemplary Runtime Hosting Interfaces i.e before calling IRuntimeRuntimeHost::Start or before any metadata interfaces are used. It is recommended that this method be called immediately after the return from CorBindToRuntime*.

| Parameter | Description |
| --- | --- |
| pHostControl | [in] The host 132's implementation of IHostControl. |

HResults
See Common HResults
E_RUNTIME_ALREADY_STARTED. The runtime 130 has already been initialized. The call to SetHostControl did not have any affect.

1.4.1.5. GetRuntimeControl

GetRuntimeControl returns an interface pointer of type IRuntimeControl that hosts can use to those runtime 130 "managers" that have no corresponding interface on the host 132 side. These managers are used to customize additional aspects of the runtime. See Runtime Configuration Interfaces for details.

| Parameter | Description |
| --- | --- |
| pRuntimeControl | [out] An interface pointer that hosts can use to set additional configuration parameters for the runtime 130. |

APPENDIX

Exemplary Runtime Hosting Interfaces

HResults
See Common HResults 1.4.1.6. UnloadAppDomain

Unmanaged analog to the AppDomain.Unload method. Allows unmanaged hosts to unload a specific domain by its numeric ID.

| Parameter | Description |
| --- | --- |
| dwAppDomainId | [in] numeric ID of Application Domain to unload. |

1.4.1.7. ExecuteInDomain

Allows the host 132 to control which appdomain will execute selected managed code.

HRESULT ExecuteInDomain([in] DWORD AppDomainId, [in] FExecuteInDomainCallback pCallback, [in] void* cookie);

| Parameter | Description |
| --- | --- |
| dwAppDomainId | [in] index of AppDomain in which to execute |
| FExecuteInDomainCallback | [in] function pointer to execute in selected appdomain |
| cookie | [in] pointer to opaque caller-allocated memory. This parameter is passed by the runtime 130 to the domain callback. It is unaltered by the runtime 130 and both allocation and lifetime of this memory are controlled by the caller. This is not runtime 130 managed heap memory. |

APPENDIX

Exemplary Runtime Hosting Interfaces 1.4.2. IHostControl

This is the interface the runtime 130 uses to determine which abstractions the host 132 supports.

```
interface IHostControl : IUnknown
{
    HRESULT GetHostManager(
        [in] REFIID riid,
        [out, iid_is(riid)] IUnknown** ppObject);
```

-continued

```
    HRESULT GetAppDomainManagerType(
        [in, out] DWORD *pcchAssemblyName,
        [out, size_is(*pcchAssemblyName)] wchar_t
        *pchAssemblyName,
        [in, out] DWORD *pcchTypeName,
        [out, size_is(*pcchTypeName)] wchar_t
        *pchTypeName);
    HRESULT SetAppDomainManager(
        [in] DWORD dwAppDomainID,
        [in] IUnknown* pUnkAppDomainManager);
}
```

APPENDIX

Exemplary Runtime Hosting Interfaces 1.4.2.1. GetHostManager

GetHostManager is called by the runtime 130 to determine if the host 132 supports a given abstraction interface. The specific interfaces a host 132 will be asked for are:
IID_IHostMemoryManager
IID_IHostTaskManager
IID_IHostThreadPoolManager
IID_IHostIoCompletionManager
IID_IHostSyncManager
IID_IHostAssemblyManager
IID_IHostCrossAssemblyCallManager
IID_IHostGCManager

| Parameter | Description |
| --- | --- |
| riid | [in] The IID of the abstraction interface the runtime 130 is asking for. i.e IID_IHostMemoryManager |
| ppObject | [out] A pointer to the host 132 implemented abstraction interface or NULL if the host 132 doesn't support the abstraction. |

APPENDIX

Exemplary Runtime Hosting Interfaces

HResults
See Common HResults
E_INVALID_ARG. The requested CLSID is not valid.
E_NOINTERFACE. The requested interface is not supported.

1.4.2.2. GetAppDomainManagerType

This method allows the host 132 to pass information for a managed type derived from AppDomainManager. The host 132 passes the name of the assembly implementing the type, and the type name. The runtime 130 loads the assembly and instantiates an object of this type. This object will be notified at creation of each AppDomain.

| Parameter | Description |
| --- | --- |
| Parameter | Description |
| pcchAssemblyName | [in, out] size in characters for the assembly name buffer (next parameter) |

-continued

| Parameter | Description |
|---|---|
| pchAssemblyName | [out] buffer which contains assembly name at return of call |
| pcchTypeName | [in, out] size in characters for the type name buffer (next parameter) |
| pchTypeName | [out] buffer which contains type name at return of call |

APPENDIX

Exemplary Runtime Hosting Interfaces

In this implementation, this call is made twice. First, to ascertain the sizes needed for the buffers, the runtime 130 passes NULL for pchAssemblyName and pchTypeName. Upon return, pcchAssemblyName and pcchTypeName should contain the necessary sizes for the buffers. On the second call, pcchAssemblyName and pcchTypeName will be set to these sizes with pchAsssemblyName and pchType-Name pointing at buffers allocated by the runtime 130. The host 132 should then fill in the buffers with appropriate information.

1.4.2.3. SetAppDomainManager

| Parameter | Description |
|---|---|
| Parameter dwAppDomainID | Description [in] numeric ID of the chosen AppDomain |
| pUnkAppDomainManager | [in] A pointer to the host 132 implemented AppDomainManager object (as IUnknown) |

1.5. Memory Abstraction Interfaces

There are three interfaces in the memory abstraction:

IHostMemoryManager. Implemented by the host 132 and discovered by the runtime 130 via IHostControl::GetHostManager. Allows the runtime 130 to make virtual memory requests through the host 132 instead of calling the standard Win32 virtual memory API's. In addition, this interface provides methods for the runtime 130 to obtain a pointer through which to make memory requests on the heap and to get back the host 132's reported level of memory pressure in the process.

IHostMalloc. Implemented by the host 132. Allows the runtime 130 to make fine grained allocations from the heap through the host 132.

IRuntimeMemoryNotificationCallback. Implemented by the runtime 130. The host 132 invokes this callback to request memory be freed.

FIG. 4 shows an exemplary architectural relationship between runtime and hosting application thread abstraction interfaces 1.5.1. IHostMemoryManager

```
typedef enum
{
    eMemoryAvailableLow = 1,
        eMemoryAvailableNeutral = 2,
        eMemoryAvailableHigh = 3
} EMemoryAvailable;
typedef enum
{
    eTaskCritical = 0,
        eAppDomainCritical = 1,
        eProcessCritical = 2
} EMemoryCriticalLevel;
interface IHostMemoryManager : IUnknown
{
    HRESULT CreateMalloc([in] BOOL fThreadSafe,
            [out] IHostMalloc **ppMalloc);
    HRESULT VirtualAlloc([in] void*        pAddress,
            [in] SIZE_T        dwSize,
            [in] DWORD          flAllocationType,
            [in] DWORD          flProtect,
            [in] EMemoryCriticalLevel dwCriticalLevel,
            [out] void**        ppMem);
    HRESULT VirtualFree([in] LPVOID         lpAddress,
            [in] SIZE_T         dwSize,
            [in] DWORD          dwFreeType);
    HRESULT VirtualQuery([in] void*         lpAddress,
            [out] void*         lpBuffer,
            [in] SIZE_T         dwLength,
            [out] SIZE_T* pResult);
    HRESULT VirtualProtect([in] void*       lpAddress,
            [in] SIZE_T         dwSize,
            [in] DWORD          flNewProtect,
            [out] DWORD*        pflOldProtect);
    HRESULT GetMemoryLoad([out] DWORD* pMemoryLoad,
            [out] SIZE_T *pAvailableBytes);
    HRESULT RegisterMemoryNotificationCallback([in]
    IRuntimeMemoryNotificationCallback
        * pCallback);
}
```

APPENDIX

Exemplary Runtime Hosting Interfaces 1.5.1.1. Enum: EMemoryAvailable

This enumeration contains values that indicate the amount of free physical memory on the machine. These values logically map to the events for high and low memory returned from Win32's CreateMemoryResourceNotification.

eMemoryAvailableLow: Available physical memory is running low.

APPENDIX

Exemplary Runtime Hosting Interfaces eMemoryAvailableNeutral: Available physical memory is neutral.

eMemoryAvailableHigh: Available physical memory is high.

This value is passed into the runtime 130 from the host 132 through the "memory notification" callback described below.

1.5.1.2. Enum: EMemoryCriticalLevel

The values in this enumeration indicate the impact of failing a particular memory allocation. The memory allocation routines in IHostMemoryManager and IHostMalloc take a parameter of this type. Based on the severity of failing the request, a host 132 can decide to fail the allocation request immediately or wait until it can be satisfied.

Exemplary values in the enumeration are:

TaskCritical: This allocation is critical to running the task from which the allocation is made. If memory cannot be allocated, the runtime 130 cannot guarantee that the task is in a consistent, runnable state. As such, the runtime 130 will raise a thread abort exception on the physical OS thread.

AppDomainCritical: This allocation is critical to continue executing managed code in the domain requesting the allocation. If memory cannot be allocated, the runtime 130 cannot guarantee that the domain is still usable. The decision about what action should be taken when the allocation cannot be satisfied is left to the host 132. The host 132 can tell the runtime 130 to automatically abort the AppDomain or allow it to keep running by calling methods on IRuntimePolicyManager.

APPENDIX

Exemplary Runtime Hosting Interfaces

ProcessCritical: This allocation is critical to continue executing managed code in the process. If memory cannot be allocated, the runtime 130 cannot function in the process. ProcessCritical is used during startup and when running finalizers. If allocation cannot be satisfied, the runtime 130 is essentially disabled—it cannot be used to run any managed code in the process. All subsequent calls into the runtime 130 will fail with HOST_E_RUNTIMENOTAVAILABLE.

1.5.1.3. CreateMalloc

Returns a pointer to an IHostMalloc used to make allocations from a host-created heap (see IMalloc below). In this implementation, true is passed for fThreadSafe as a function of performance numbers.

| Parameter | Description |
| --- | --- |
| fThreadSafe | [in] If true, the memory returned can me accessed by multiple threads without any synchronization. If false, calls on the object should be serialized. |
| ppMalloc | [out] A pointer to a host-implemented IHostMalloc. |

HResults
See Common HResults
E_OUTOFMEMORY. Memory not available to complete this request.

APPENDIX

Exemplary Runtime Hosting Interfaces 11.5.1.4. VirtualAlloc

This method logically wraps the Win32 function of the same name.

| Parameter | Description |
| --- | --- |
| pAddress | [in] As defined in Win32's VirtualAlloc. |
| dwSize | [in] As defined in Win32's VirtualAlloc. |
| flAllocationType | [in] As defined in Win32's VirtualAlloc. |
| flProtect | [in] As defined in Win32's VirtualAlloc. |

-continued

| Parameter | Description |
| --- | --- |
| dwCriticalLevel | [in] A value indicating the impact of failing the allocation. See description of EMemoryCriticalLevel above. |
| ppMem | [out] Pointer to the allocated memory or NULL if the request couldn't be satisfied. Note that Win32's VirtualAlloc returns this pointer as the return value from the function. |

HResults
See Common HResults

APPENDIX

Exemplary Runtime Hosting Interfaces

E_OUTOFMEMORY. Memory not available to complete this request.

1.5.1.5. VirtualFree

This method logically wraps the Win32 function of the same name.

| Parameter | Description |
| --- | --- |
| lpAddress | [in] As defined in Win32's VirtualFree. |
| dwSize | [in] As defined in Win32's VirtualFree. |
| dwFreeType | [in] As defined in Win32's VirtualFree. |

HResults
See Common HResults
HOST_E_INVALIDOPERATION. An attempt was made to free memory not allocated through the host 132.

1.5.1.6. VirtualQuery

This method wraps the Win32 function of the same name. Note that the return type is passed back through the pResult out parameter instead of as the function's return value as done in Win32. VirtualQuery, when implemented by the OS, does not incur deadlock and may run to completion with random threads suspended in user code. However, when implemented by a host, care should be

APPENDIX

Exemplary Runtime Hosting Interfaces taken not to take locks in the implementation of this method to avoid deadlock between threads executing in user space to best approximate OS behavior.

HResults
See Common HResults 1.5.1.7. VirtualProtect

This method wraps the Win32 function of the same name. All parameters have the same semantics as the corresponding Win32 function.

HResults
See Common HResults

1.5.1.8. GetMemoryLoad

This method is called by the runtime 130 to get the amount of physical memory that is in use (i.e not free) as reported by the host 132. The runtime 130 uses this value as a heuristic to the GC. For example, if the host 132 reports that the majority of memory is in use the GC may elect to collect from multiple generations to increase the amount of memory that may potentially become available.

This method wraps Win32's GlobalMemoryStatus. The value returned from GetMemoryLoad in pMemoryLoad is the equivalent of the dwMemoryLoad

APPENDIX

Exemplary Runtime Hosting Interfaces field in the MEMORYSTATUS structure returned from GlobalMemoryStatus. pAvailableBytes returns the number of bytes available to the runtime.

| Parameter | Description |
| --- | --- |
| pMemoryLoad | [out] The approximate percentage of total physical memory that is currently in use. |
| pAvailableBytes | [out] The number of bytes available to the runtime. |

HResults
See Common HResults

1.5.1.9. RegisterMemoryNotificationCallback

The "memory notification callback" is passed into the host 132 by the runtime 130. The host 132 invokes this callback to notify the runtime 130 of the current memory load on the machine. See complete description of IRuntimeMemoryNotificationCallback below.

| Parameter | Description |
| --- | --- |
| pCallback | [in] An interface pointer to a runtime 130-provided implementation of IRuntimeMemoryNotificationCallback. |

APPENDIX

Exemplary Runtime Hosting Interfaces

HResults
See Common HResults

1.5.2. IHostMalloc

This interface allows the runtime 130 to make fine grained allocations from the heap through the host 132.

```
interface IHostMalloc : IUnknown
{
    HRESULT Alloc([in] SIZE_T cbSize,
        [in] EMemoryCriticalLevel dwCriticalLevel,
        [out] void** ppMem);
    HRESULT DebugAlloc([in] SIZE_T      cbSize,
        [in] EMemoryCriticalLevel dwCriticalLevel,
        [in] char*         pszFileName,
        [in] int           iLineNo,
        [out] void**           ppMem);
    HRESULT Free([in] void* pMem);
}
```

1.5.2.1. Alloc

Allocates the requested amount of memory from the heap.

| Parameter | Description |
| --- | --- |
| cbSize | [in] The amount of memory being requested in bytes. |
| dwCriticalLevel | [in] A value indicating the impact of failing the allocation. See description of EMemoryCriticalLevel above. |
| ppMem | [out] Pointer to the allocated memory or NULL if the request could not be satisfied. |

APPENDIX

Exemplary Runtime Hosting Interfaces

HResults
See Common HResults
E_OUTOFMEMORY. Memory not available to complete this request.

1.5.2.2. DebugAlloc

The debug version of Alloc. DebugAlloc tracks where the memory was allocated.

| Parameter | Description |
| --- | --- |
| cbSize | [in] The amount of memory being requested in bytes. |
| dwCriticalLevel | [in] A value indicating the impact of failing the allocation. See description of EMemoryCriticalLevel above. |
| pszFileName | [in] file name |
| iLineNo | [in] The line number within pszFileName where the allocation occurred. |
| ppMem | [out] Pointer to the allocated memory or NULL if the request could not be satisfied. |

APPENDIX

Exemplary Runtime Hosting Interfaces

HResults
See Common HResults
E_OUTOFMEMORY. Memory not available to complete this request.

1.5.2.3. Free

Frees memory allocated with Alloc.

| Parameter | Description |
| --- | --- |
| pMem | [in] A pointer to the memory to be freed. |

HResults
See Common HResults
HOST_E_INVALIDOPERATION. An attempt was made to free memory not allocated through the host 132.

1.5.3. IRuntimeMemoryNotificationCallback

The runtime 130 passes this callback to the host 132 through IHostMemoryManager:RegisterRuntimeMemoryNotificationCallback. The purpose of this interface is to allow the host 132 to report memory pressure conditions similar to the Win32 API CreateMemoryResourceNotification.

APPENDIX

Exemplary Runtime Hosting Interfaces

```
interface IRuntimeMemoryNotificationCallback : IUnknown
{
    HRESULT OnMemoryNotification([in] EMemoryAvailable
eMemoryAvailable);
}
```

1.5.3.1. OnMemoryNotification

OnMemoryNotification notifies the runtime 130 of the memory load on the machine. The runtime 130 will use this information to free up additional memory when the host 132 reports that the amount of available physical memory is low. Calls to OnMemoryNotifcation always return immediately—non-blocking.

| Parameter | Description |
| --- | --- |
| eMemoryAvailable | [in] A value from EMemoryAvailable indicating whether the amount of free physical memory on the machine is low or high. |

HResults

See Common HResults

1.6. Threading Abstraction Interfaces

As described, hosting API's use the term "task" to abstract the notion of what would typically be thought of as a thread. This is done to decouple the term

APPENDIX

Exemplary Runtime Hosting Interfaces

"thread" from a given hosts unit of execution and scheduling. An example of why this separation is used to support ha host with "fiber mode" execution model. In fiber mode, tasks become fibers that run on the physical OS threads. SQL Server manually decides when to schedule these fibers (tasks) and on which OS thread they should run. SQL also supports a "thread mode" in which a task is an actual OS thread. In this mode, scheduling is largely done by the OS, although SQL does use sync primitives to influence when code gets run.

There are a few places in this section where the behavior of a task relative to a physical OS thread is specified. In those cases, the term "OS thread" is used on purpose.

The threading abstraction and the synchronization abstraction are closely related. That is, if a host 132 implements the threading abstraction they should also implement the synchronization abstraction.

1.6.1. Threads Not Under Host Control

The threading abstraction allows the runtime 130 to create and manage tasks through the host 132. However, the runtime 130 creates a few OS threads in the process without going through the host 132 ing API's. These threads are:

GC Threads. The number of these threads varies based on which collector is running, the number of processors, etc.

A debug helper thread.

Internal wait pool threads. For example, the runtime 130 maintains a thread for timers and a registered wait thread.

APPENDIX

Exemplary Runtime Hosting Interfaces

Thread pool 'gate' thread.

In addition, unmanaged code entered from managed code may then create OS threads and re-enter the runtime through managed code. Those OS threads are also outside host control.

In this implementation, hosts do not take scheduling control of threads it does not create or own. Hosts 132 should keep a map of threads with associated tasks (hence under host control), and threads which are not under host control. One exception may be the primary thread of execution started with the process. This thread may not have a task associated, but it is under host control and can be scheduled.

The following four interfaces comprise the threading abstraction of this implementation:

IHostTaskManager. Implemented by the host 132 and discovered by the runtime 130 via IHostControl::GetHostManager. Allows the runtime 130 to work with tasks through the host 132 instead of using standard OS threading or fiber API's. This interface provides methods for the runtime 130 to create and manage tasks, to notify the host 132 that the locale has been changed through the BCL, to provide hooks for the host 132 to take action when control is transferring in/out of the runtime 130 to run unmanaged code and so on.

IRuntimeTaskManager. Hosts can use IRuntimeTaskManager to create runtime tasks explicitly and to get the currently running runtime task.

APPENDIX

Exemplary Runtime Hosting Interfaces

IHostTask. The runtime 130 creates tasks using IHostTaskManager. Every task created through IHostTaskManager has a representation on the host 132 side and on the runtime 130 side. IHostTask is the task's representation on the host 132 side while IRuntimeTask below for the corresponding interface on the runtime 130 side. Once the task has been created, IHostTask allows the runtime 130 to perform various actions on the task including starting it, setting its priority, alerting it, and so on.

IRuntimeTask. The runtime's representation of the task. There is always a corresponding instance of an IHostTask on the host 132 side. The host 132 calls IRuntimeTask to notify the runtime 130 about the state of the task, including when the task is moving to or from the runnable state, or when it is being aborted.

FIG. 4 shows an exemplary architectural relationship between runtime and hosting application thread abstraction interfaces them:

1.6.2. Creating Tasks

As described above, each task running in a hosted environment has a representation on the host 132 side (an instance of IHostTask) and a representation on the runtime 130 side (an instance of IRuntimeTask). The host 132 task and runtime task objects should be associated with each other in order for the host 132 and the runtime 130 to properly communicate about the underlying task. The two task objects should be created and associated before any managed code can run on the OS thread.

APPENDIX

Exemplary Runtime Hosting Interfaces

The process of creating a new task and its associated task objects can be initiated either by the host 132 or by the runtime 130.

Runtime-Initiated Task Creation

The runtime 130 will begin the process of creating new tasks when it is first setting up a thread to run managed code. This occurs during the runtime's initialization process, when a user explicitly creates a thread using the classes in System.Threading or when the size of the thread pool grows.

In these scenarios, the steps taken to setup the new task include, for example, the following:

The runtime 130 will create a runtime task and the corresponding IRuntimeTask internally. Note: runtime tasks can also be "recycled"—instead of creating a new runtime task from scratch, the runtime 130 may choose to grab a task from its cache of recycled tasks. See IRuntimeTask::Reset for details.

The runtime 130 will then call IHostTaskManager::CreateTask to create a host 132 task to associate with the new runtime task.

The association is made when the runtime calls SetRuntimeTask on the new IHostTask.

There is another scenario in which the runtime 130 will initiate task creation. Threads that have not been initialized to run managed code may enter the runtime 130 in scenarios such as COM interop and reverse PInvoke. In these scenarios, the runtime 130 will ask the host 132 for the current host task as part of initializing the thread. At this point the host 132 can refuse to return a task in

APPENDIX

Exemplary Runtime Hosting Interfaces which case the runtime 130 will prevent thread from running managed code. The steps, for example, are:

A new thread wanders into the runtime.

The runtime 130 calls IHostTaskManager::GetCurrentTask to get the current host task.

If a task is returned in step 2, the runtime 130 will create a runtime task object (or use a recycled one) and an IRuntimeTask and call IHostTask::SetRuntimeTask on the returned task.

If no task is returned in step 2, the runtime 130 will abort the thread.

Host-Initiated Task Creation

Hosts may find it convenient at times to pre-create runtime tasks and their associated IHostTasks before they are needed. This may be useful for hosts to pre-initialize data structures for example.

Exemplary steps taken to setup a new task in this scenario are:

The host 132 creates a host 132 task and the corresponding IHostTask internally.

The host 132 calls IRuntimeTaskManager::CreateTask to create a runtime task to associate with the new host task.

The runtime 130 calls IHostTaskManager:GetCurrentTask to get the currently running host task.

The runtime 130 then associates the runtime task with the host 132 task by passing the new instance of IRuntimeTask to the SetRuntimeTask method on the IHostTask returned in step 3.

APPENDIX

Exemplary Runtime Hosting Interfaces 1.6.3. IHostTaskManager

```
typedef enum {
        WAIT_MSGPUMP = 0x1,
        WAIT_ALERTABLE = 0x2,
        WAIT_NOTINDEADLOCK = 0x4,
}WAIT_OPTION;
interface IHostTaskManager : IUnknown
{
        HRESULT GetCurrentTask ([out] IHostTask **pTask);
        HRESULT CreateTask ([in] DWORD stacksize,
                            [in] LPTHREAD_START_ROUTINE
                            pStartAddress,
                            [in] PVOID pParameter,
                            [out] IHostTask **ppTask);
        HRESULT Sleep([in] DWORD dwMilliseconds,
                      [in] DWORD option);
        HRESULT SwitchToTask([in] DWORD option);
        HRESULT SetUILocale([in] LCID lcid);
    HRESULT SetLocale([in] LCID lcid);
        HRESULT GetUILocale([in] LCID lcid);
    HRESULT GetLocale([in] LCID lcid);
    HRESULT CallNeedsHostHook(
            [in] SIZE_T target,
            [out] BOOL * pbCallNeedsHostHook);
    HRESULT LeaveRuntime([in] SIZE_T target);
    HRESULT EnterRuntime( );
    HRESULT ReverseEnterRuntime( );
    HRESULT ReverseLeaveRuntime( )
    HRESULT BeginDelayAbort( );
    HRESULT EndDelayAbort( );
    HRESULT BeginThreadAffinity( );
    HRESULT EndThreadAffinity( );
    HRESULT SetRuntimeTaskManager([in] IRuntimeTaskManager
*pManager);
}
```

APPENDIX

Exemplary Runtime Hosting Interfaces 1.6.3.1. Enum: WAIT_OPTION

WAIT_ALERTABLE. Notifies the host 132 that the task should be awakened if the runtime 130 alerts the task through IHostTask::Alert (see later in the doc). This flag is often passed to API's that accept timeout values (like IHostTask::Join) in which case the host 132 is instructed to awake the task before the timeout value if the runtime 130 alerts.

WAIT_MSGPUMP. Notifies the host 132 that it should pump messages on the current OS thread if the thread becomes blocked. The runtime 130 will only specify this value on an STA thread.

WAIT_NOTINDEADLOCK. Notifies the host 132 that a given synchronization request won't be involved in a deadlock. The runtime 130 passes this on "leaf" sync requests—i.e those requests that don't request additional syncs.

1.6.3.2. GetCurrentTask

Returns the host 132 task currently running on the OS thread from which GetCurrentTask is called.

| Parameter | Description |
| --- | --- |
| pTask | [out] A pointer to the currently running task. If no task is currently running, NULL is returned. If NULL is returned when the runtime 130 is attempting to initialize a new thread, the runtime 130 will stop initialization and will prevent that thread from running managed code. See "Runtime-initiated Task Creation" above. |

HResults

APPENDIX

Exemplary Runtime Hosting Interfaces

See Common HResults
HOST_E_INVALIDOPERATION. GetCurrentTask was called on an OS thread the host 132 is not aware of.

1.6.3.3. Method:Create Task

Called by the runtime 130 to create a new host task. Newly created tasks are in the suspended state.

| Parameter | Description |
| --- | --- |
| pStartAddress | [in] A pointer to the function to be executed by the task. |
| pParameter | [in] A pointer to the user data to be passed to the function. May be NULL. |
| ppTask | [out] A pointer to the host 132-created task or NULL if the task couldn't be created. The returned task is suspended until started with IHostTask::Start. |

APPENDIX

Exemplary Runtime Hosting Interfaces

HResults
See Common HResults
E_OUTOFMEMORY. Not enough resources were available to create the task.

1.6.3.4. Sleep

The runtime 130 calls this method to notify the host 132 that the current task is going to sleep. This is called, for example, when Thread.Sleep is called from user code.

| Parameter | Description |
| --- | --- |
| dwMilliseconds | [in] The number of milliseconds the thread will sleep. |
| Option | [in] Values from WAIT_OPTIONS indicating actions the host 132 should take if this operation blocks. See description for WAIT_OPTIONS above. |

APPENDIX

Exemplary Runtime Hosting Interfaces

HResults
See Common HResults

1.6.3.5. SwitchToTask

SwitchToTask notifies the host 132 that it should switch out the current task. The host 132 is free to switch in another task if desired.

| Parameter | Description |
| --- | --- |
| Option | [in] Values from WAIT_OPTIONS indicating actions the host 132 should take if this operation blocks. See description for WAIT_OPTIONS above.thread or block its execution. |

HResults
See Common HResults

APPENDIX

Exemplary Runtime Hosting Interfaces

1.6.3.6. SetUILocale

SetUILocale notifies the host 132 that the runtime 130 UI locale (UI Culture in NLS+ terms) has been changed on the current task. This method is called when the Thread.CurrentUICulture property is changed by user code. This method exists to allow a host 132 to synchronize any mechanisms they have for changing UI locale with a change made to the current UI locale done from managed code.

If a host 132 does not allow the UI culture to be changed from managed code, E_NOTIMPL should be returned from this method.

| Parameter | Description |
| --- | --- |
| Lcid | [in] The lcid that maps to the current task's new UI culture. |

HResults
See Common HResults
E_NOTIMPL. The host 132 does not allow the UI culture to be changed from managed code.

1.6.3.7. SetLocale

SetLocale notifies the host 132 that the runtime 130 locale (Culture in NLS+ terms) has been changed on the current task. This method is called when the Thread.CurrentCulture property is changed by user code. This method exists

APPENDIX

Exemplary Runtime Hosting Interfaces to allow a host 132 to synchronize any mechanisms they have for changing locale with a change made to the current locale done from managed code.

If a host 132 does not allow the culture to be changed from managed code, E_NOTIMPL should be returned from this method.

| Parameter | Description |
| --- | --- |
| lcid | [in] The lcid that maps to the current task's new culture. |

HResults
See Common HResults
E_NOTIMPL. The host 132 does not allow the culture to be changed from managed code.

1.6.3.8. CallNeedsHostHook

CallNeedsHostHook and the (Return)Enter/(Return)Leave routines that follow are the implementation of the requirement that host's be notified when calls leave and enter the runtime 130 (see Entering and Leaving the Runtime).

For performance reasons, this implementation of the runtime 130 does an analysis during JIT compilation of each PInvoke to determine if the call can be inlined. CallNeedsHostHook provides a way for the host 132 to participate in this decision making process. If the host 132 tells the runtime 130 that a given PInvoke needs to be hooked, the runtime 130 will not inline the call. Common

APPENDIX

Exemplary Runtime Hosting Interfaces reasons for requiring a hook are to adjust the floating point state or to receive notification that a call is entering a state in which any locks taken or memory requests made cannot be tracked by the host 132.

If a host 132 requests a call to be hooked the (Return)Enter/(Return)Leave routines will be called on transitions into and out of the runtime 130.

| Parameter | Description |
| --- | --- |
| target | [in] The address within the mapped PE file of the unmanaged function that is about to be called. If the function about to be called is "well known" to the host 132 (i.e won't affect the execution environment with locks, etc . . . ), the host 132 may elect to bypass the hook to improve performance. A common example of this is a call from a host-implemented managed library to an existing unmanaged routine that the host 132 either controls or fully understands. |

-continued

| Parameter | Description |
| --- | --- |
| pbCallNeedsHostHook | [out] A boolean value indicating whether the host 132 requires the call identified by target to be hooked. |

APPENDIX

Exemplary Runtime Hosting Interfaces

HResults
See Common HResults 1.6.3.9. LeaveRuntime

Call sequences out of and back into the runtime 130 can be nested. Consider the following call sequence:

Call1: A managed Visual Basic program PInvokes to a method in a dll written in C.

Call2: The C program then calls a method in a C# DLL, thus re-entering managed code.

Call3: The C# method turns around and does a PInvoke of its own back out to unmanaged code.

Call3: Ends—we're back in the managed C# method.

Call2: Ends—we're back in the unmanaged C method.

Call1: Ends—we're back in the managed Visual Basic method.

In this case the outer level PInvoke reenters the runtime during the call (and goes back out again). The host 132 ing api has two sets of enter/leave methods to differentiate nested calls from their "outer level" calls: Leave/EnterRuntime and ReverseLeave/ReverseEnterRuntime. The series of calls to LeaveRuntime, EnterRuntime, ReverseLeaveRuntime and ReverseEnterRuntime in these scenarios form a "stack" that lets the host 132 identify the nesting layers.

APPENDIX

Exemplary Runtime Hosting Interfaces

FIG. 5 shows exemplary managed/unmanaged code call sequences for exiting/reverse-exiting and entering/reverse-entering managed code from/to unmanaged code to/from unmanaged code. As shown in FIG. 5:

The first call that leaves the runtime 130 is an "outer level" call so the runtime 130 calls LeaveRuntime (assuming that the host 132 requested that the call be hooked using CallNeedsHostHook).

Because Call2 (from C to C#) is nested within the initial PInvoke, the runtime 130 calls ReverseEnterRuntime.

Call3 leaves the runtime 130 again. Because this is a new PInvoke LeaveRuntime is called.

Call3 now ends and EnterRuntime is called.

Call2 now ends. This is the ending of the call on which ReverseEnterRuntime was called so the corresponding ReverseLeaveRuntime is called.

The initial PInvoke now ends—EnterRuntime is called.

FIG. 7 shows an exemplary full stack of calls that were pushed and later popped between runtime and hosting application thread abstraction interfacing operations describe in the preceding example. As shown, LeaveRuntime is called when an "outer level" call is about to leave the runtime 130 and enter unmanaged code.

| Parameter | Description |
| --- | --- |
| target | [in] The address within the mapped PE file of the unmanaged function that is about to be called. Depending on the scenario the host 132 may use this address to take different actions depending on the function being called. |

APPENDIX

Exemplary Runtime Hosting Interfaces

HResults
See Common HResults
E_OUTOFMEMORY. The host 132 attempted to allocate a resource in the hook and failed. The runtime 130 will fail the call.

1.6.3.10. EnterRuntime

EnterRuntime is called when an outer level call is returning to the runtime 130. EnterRuntime is called once for every corresponding LeaveRuntime.
HResults
See Common HResults
E_OUTOFMEMORY. The host 132 attempted to allocate a resource in the hook and failed. The runtime 130 will fail the call.

1.6.3.11. ReverseLeaveRuntime

ReverseLeaveRuntime is called when control leaves the runtime 130 for unmanaged code while in the middle of an existing call (PInvoke).
HResults

APPENDIX

Exemplary Runtime Hosting Interfaces

See Common HResults
E_OUTOFMEMORY. The host 132 attempted to allocate a resource in the hook and failed. The runtime 130 will fail the call.

1.6.3.12. ReverseEnterRuntime

ReverseEnterRuntime is called when entering the runtime 130 from an unmanaged call. If the call sequence started in managed code, ReverseEnterRuntime will be called once for every ReverseLeaveRuntime. Note that calls can originate from unmanaged code and enter the runtime without being nested. In this case, no EnterRuntime, LeaveRuntime or ReverseLeaveRuntime was seen and the ReverseLeave/ReverseEnter count will not balance.
HResults
See Common HResults
E_OUTOFMEMORY. The host 132 attempted to allocate a resource in the hook and failed. The runtime 130 will fail the call.

1.6.3.13. BeginDelayAbort

Notifies the host 132 of the beginning of a period of time in which the current task cannot be aborted. The host 132 should not abort the task until a corresponding call to EndDelay Abort is received. Calls to BeginDelayAbort cannot be nested.
HResults

APPENDIX

Exemplary Runtime Hosting Interfaces

See Common HResults
E_UNEXPECTED. A call to BeginDelayAbort was nested—BeginDelayAbort had already been called and the corresponding EndDelayAbort has been received yet.

1.6.3.14. EndDelayAbort

Notifies the host 132 of the end of a period in which the current task cannot be aborted. A corresponding call to BeginDelayAbort should have been made on this task for EndDelayAbort to have any affect.
HResults
See Common HResults
E_UNEXPECTED. EndDelayAbort was called without a corresponding 14 call to BeginDelayAbort.

1.6.3.15. BeginThreadAffinity

Notifies the host 132 of the beginning of a period of time in which the current task cannot be moved to a different OS Thread. The task can be switched out, but when it is switched in, it should be back on the same OS thread. The task should not be rescheduled to a different thread until a corresponding EndThreadAffinity is received. Calls to BeginThreadAffinity can be nested because they apply to the current task.
HResults
See Common HResults

APPENDIX

Exemplary Runtime Hosting Interfaces 1.6.3.16. EndThreadAffinity

Notifies the host 132 of the end of a period in which the current task cannot be moved to a different OS thread. A corresponding call to BeginThreadAffinity should have been made on this task for EndThreadAffinity to have any affect.
HResults
See Common HResults
E_UNEXPECTED. EndThreadAffinity was called without a corresponding call to BeginThreadAffinity.

1.6.3.17. SetRuntimeTaskManager

The runtime 130 calls this method to set a pointer to the runtime-implemented task manager.

| Parameter | Description |
| --- | --- |
| pManager | [in] An interface pointer to the runtime-implemented task manager. This interface is of type IRuntimeTaskManager. |

HResults
See Common HResults

1.6.4. IRuntimeTaskManager

APPENDIX

Exemplary Runtime Hosting Interfaces

```
interface IRuntimeTaskManager : IUnknown
{
    HRESULT CreateTask ([out] IRuntimeTask **pTask);
    HRESULT GetCurrentTask ([out] IRuntimeTask **ppTask);
    HRESULT SetUILocale([in] LCID lcid);
    HRESULT SetLocale([in] LCID lcid);
}
```

1.6.4.1. CreateTask

This method can be called by a host 132 to explicitly create a runtime task. See Creating Tasks for scenarios in which CreateTask is used.

| Parameter | Description |
|---|---|
| ppTask | [out] A pointer to a new runtime task. NULL if the task couldn't be created. |

HResults
See Common HResults
E_OUTOFMEMORY. Not enough resources were available to create the task.

1.6.4.2. GetCurrentTask

Returns the runtime task currently running on this OS thread.

| Parameter | Description |
|---|---|
| ppTask | [out] A pointer to the runtime task currently running on this OS thread. NULL is returned if no task is currently running. |

APPENDIX

Exemplary Runtime Hosting Interfaces

HResults
See Common HResults

1.6.4.3. SetUILocale

SetUILocale notifies the runtime 130 that the host 132 has changed the current UI locale on the current task. This method exists to allow a host 132 to synchronize any mechanisms they have for changing UI locale with those provided through managed code (specifically the Thread.CurrentUICulture property). A call to SetUILocale changes the managed UI culture on the current task.

| Parameter | Description |
|---|---|
| Lcid | [in] The lcid that maps to the current task's new UI culture. |

HResults
See Common HResults

1.6.4.4. SetLocale

SetLocale notifies the runtime 130 that the host 132 has changed the current locale on the current task. This method exists to allow a host 132 to synchronize any mechanisms they have for changing locale with those provided through

APPENDIX

Exemplary Runtime Hosting Interfaces managed code (specifically the Thread.CurrentCulture property). A call to SetLocale changes the managed culture on the current task.

| Parameter | Description |
|---|---|
| Lcid | [in] The lcid that maps to the current task's new culture. |

HResults
See Common HResults

1.6.5. IHostTask

```
interface IHostTask : IUnknown
{
    HRESULT Start( );
    HRESULT Alert( );
    HRESULT Join([in] DWORD dwMilliseconds,
        [in] DWORD option);
    HRESULT SetPriority([in] int newPriority);
    HRESULT GetPriority([out] int *pPriority);
    HRESULT SetRuntimeTask([in] IRuntimeTask *pRuntimeTask);
}
```

APPENDIX

Exemplary Runtime Hosting Interfaces

1.6.5.1. Start

Moves the task from the suspended state into a runnable state. Start will always return S_OK (unless a fatal error is encountered).
HResults
See Common HResults

1.6.5.2. Alert

The runtime 130 calls Alert to wake the task so it can be aborted. The runtime 130 will call Alert when Thread.Abort is called from managed code, or as a result of an AppDomain shutdown. Calls to Alert are asynchronous—the host 132 should return immediately. If the task isn't immediately alertable, it should wake up the next time it enters an alertable state. Note that this method only has an affect on tasks where the runtime 130 has passed WAIT_ALERTABLE to methods such as IHostTask::Join.
HResults
See Common HResults

1.6.5.3. Join

Blocks the calling task until this task terminates, the specified time interval elapses or IHostTask::Alert is called (if the appropriate flag is passed).

| Parameter | Description |
| --- | --- |
| dwMilliseconds | [in] The number of milliseconds to wait until the task terminates. If this period elapses before the task terminates, the calling task will unblock. |
| Option | [in] A value from WAIT_OPTIONS. WAIT_OPTIONS::ALERTABLE directs the host 132 to wake the task if IHostTask::Alert is called before the timeout expires. |

APPENDIX

Exemplary Runtime Hosting Interfaces

HResults

See Common HResults 1.6.5.4. SetPriority

The runtime 130 calls SetPriority when a user set's a thread's priority using a managed API. Hosts are free to define the semantics of adjusting task priority. For example, one implementation ignores this call as it does not allow user code to adjust task priorities. SetPriority does not report whether the priority was adjusted or not—use IHostTask::GetPriority to determine the tasks priority.

| Parameter | Description |
| --- | --- |
| newPriority | [in] The requested new priority for the task. The priority values are those defined by Win32's SetThreadPriority API. |

APPENDIX

Exemplary Runtime Hosting Interfaces

HResults

See Common HResults 1.6.5.5. GetPriority

Returns the priority of the task.

| Parameter | Description |
| --- | --- |
| pPriority | [out] The task's priority. The priority values are those defined by Win32's SetThreadPriority API. |

HResults

See Common HResults 1.6.5.6. SetRuntimeTask

This method is called by the runtime 130 to associate a runtime task with a host 132 task created using IHostTaskManager::CreateTask. See Creating Tasks for scenarios in which SetRuntimeTask is called.

| Parameter | Description |
| --- | --- |
| pRuntimeTask | [in] An interface pointer to the runtime task to associate with this host task. |

APPENDIX

Exemplary Runtime Hosting Interfaces

See Common HResults 1.6.6. IRuntimeTask

```
interface IRuntimeTask: IUnknown
{
        HRESULT SwitchIn([in] HANDLE threadHandle);
        HRESULT SwitchOut( );
        HRESULT GetMemStats([out] COR_GC_THREAD_STATS
*pMemUsage);
     HRESULT Reset([in] BOOL fFull);
        HRESULT ExitTask( );
        HRESULT Abort( );
        HRESULT RudeAbort( );
     HRESULT NeedsPriorityScheduling([out] BOOL *
pbNeedsPriorityScheduling);
        HRESULT YieldTask( );
        HRESULT LocksHeld([out] SIZE_T *pLockCount);
        HRESULT SetTaskIdentifier([in] DWORD asked);
}
```

FIG. 6 is a block diagram showing exemplary task scheduling of runtime tasks that are treated as fibers scheduled on OS threads by a host application 132. At any point in time, a runtime task is always in one of two primary states: running or waiting to be run. For example:

Runtime tasks are in the unscheduled, or "not-running" state when they are first created.

Hosts call IRuntimeTask::SwitchIn to transition a task onto an OS thread. At this point, the task runs managed code.

At some later point in time, the host 132 may decide to "switch the task out", or remove it from the thread and place it back in a non-running state. Hosts may choose to do this if the running task blocks on synchronization primitives, waits for I/O to complete, and so on. Runtime tasks are moved to the unscheduled state when a host 132 calls IRuntimeHost::SwitchOut.

Later, a host 132 may elect to schedule the task again by calling SwitchIn again. In the general case, the host 132 may schedule the task on any OS thread.

However, there are scenarios in which the runtime 130 requires thread affinity for a given task. Periods of thread affinity are defined when the runtime 130 calls IHostTaskManager::BeginThreadAffinity and the corresponding EndThreadAffinity. In this particular diagram, the host 132 should schedule the task back on OS Thread 1 if the task requires thread affinity when time comes to reschedule it.

Eventually, a runtime task will end permanently. This generally happens when the code running on the task reaches it natural end. In this scenario, the host 132 calls IRuntimeTask::ExitTask to destroy the clr task. Runtime tasks can also be "recycled". Instead of calling ExitTask, a host 132 can call IRuntimeTask::Reset to restate a runtime task to a clean state. The runtime 130 will then reuse this task in the future instead of creating a new one.
See IRuntimeTask::Reset for details.

1.6.6.1. SwitchIn

This method notifies the runtime 130 that the task is now in the runnable state. A handle to the OS thread that the task has been scheduled on is passed as a

APPENDIX

Exemplary Runtime Hosting Interfaces parameter. If impersonation has been done on this thread, it should be reverted (RevertToSelf) before switching in the runtime task.

SwitchIn cannot be called twice without a corresponding SwitchOut.

| Parameter | Description |
|---|---|
| threadHandle | [in] A handle to the physical thread this task is running on. |

HResults
See Common HResults

1.6.6.2. SwitchOut

SwitchOut notifies the runtime 130 that the task has been removed from the runnable state.
See Common HResults

1.6.6.3. GetMemStats

Returns memory statistics for the task.

| Parameter | Description |
|---|---|
| pMemUsage | [out] A structure containing information about the memory usage of this task, including the number of bytes allocated. See gchost.idl for details. |

APPENDIX

Exemplary Runtime Hosting Interfaces

HResults
See Common HResults

1.6.6.4. Reset

The runtime 130 can reuse previously created tasks in order to avoid the overhead of repeatedly creating new tasks each time a fresh task is needed. Hosts enable this task reuse feature by calling Reset instead of ExitTask when finished with a runtime task.

For example, one of the scenarios described above in Creating Tasks works roughly as follows:

(1) A new thread wanders into the runtime 130
(2) The runtime 130 creates a new runtime task object and calls IHostTask::SetRuntimeTask on the current host task (obtained through IHostTaskManager::GetCurrentTask).
(3) The task executes normally.
(4) At some point, the task reaches its end so the host 132 destroys it with IRuntimeTask::ExitTask.

Using Reset can change the above scenario as follows: Instead of destroying the task in Step #4, the host 132 can call Reset to reset the runtime task to a clean state. The host 132 will then decouple the task from the associated host task (which the host 132 may choose to cache as well). Then in Step #2, instead

APPENDIX

Exemplary Runtime Hosting Interfaces of creating a new runtime task, the runtime 130 will grab a recycled task and call IHostTask::SetRuntimeTask on the current host task.

This approach works very well in scenarios where the host 132 has a pool of worker tasks they are reusing themselves. For purposes of discussion, a worker task, as is a task, refers to any executing portion of program module code in system memory 106 or logically coupled to system memory 106. When a host 132 is done with one of its worker task, it calls IRuntimeTask::ExitTask to destroy the runtime task as well.

| Parameter | Description |
|---|---|
| fFull | [in] A Boolean value indicating whether a full reset should be done. If false, the runtime 130 will reset all security and locale information on the task. If true, the runtime 130 will reset all thread-relative statics and all slots reserved through calls to Thread.Alloc(Named)DataSlot in addition to the security and locale information. |

HResults
See Common HResults

APPENDIX

Exemplary Runtime Hosting Interfaces

1.6.6.5. ExitTask

Called by the host 132 to notify the runtime 130 that the task is ending. ExitTask attempts a clean shutdown of the task—it is This is the equivalent to getting a Win32 thread detach on a dll.
HResults
See Common HResults

1.6.6.6. Abort

Called by the host 132 to abort the task. The runtime 130 raises a System.Threading.ThreadAbortException when this method is called. Abort returns after the exception processing is initiated—it does not wait for user code such as finalizers and exception code to finish. As such, calls to Abort return quickly.
HResults
See Common HResults

1.6.6.7. RudeAbort

Called by the host 132 to unconditionally abort a task. The runtime 130 aborts the task immediately. Finalizers and exception handling code are not guaranteed to be run.
HResults
See Common HResults

APPENDIX

Exemplary Runtime Hosting Interfaces 1.6.6.8. NeedsPriorityRescheduling

Hosts 132 call NeedsPriorityRescheduling when a task is being switched out. The return value from this method provides a hint to the host 132 as the priority with which to reschedule the task. The runtime 130 will return true (high priority reschedule) in situations where the task preparing for garbage collection. By quickly rescheduling the task, the host 132 minimizes the possibility that garbage collection will be delayed to the point where memory usage becomes an issue.

| Parameter | Description |
| --- | --- |
| pbNeedsPriorityScheduling | [out] A value of true indicates that the host 132 should make every attempt to reschedule this task as soon as possible. False indicates no special scheduling treatment for the task. |

HResults
See Common HResults 1.6.6.9. YieldTask

The runtime 130 will attempt to get the task to a state where it will yield. This method is intended to cause long running code to give up the CPU to other tasks. The runtime 130 does not guarantee that the task will eventually yield.
HResults

APPENDIX

Exemplary Runtime Hosting Interfaces

See Common HResults 1.6.6.10. LocksHeld

Returns the number of locks that are currently held on the task.

| Parameter | Description |
| --- | --- |
| pLockCount | [out] The number of locks currently being held on the task. |

HResults
See Common HResults 1.6.6.11. SetTaskIdentifier

SetTaskIdentifier is used by the host 132 to associate an opaque identifier with the task to achieve better host-clr integration in the debugger. This id allows the debugger to identify that a runtime 130 call stack and a host 132 call stack are associated and therefore can be merged to present a unified view to the user of the debugger.

| Parameter | Description |
| --- | --- |
| Asked | [in] The id to associate with the task. The value of this id has no semantics in the runtime 130 - it is simply passed through to debuggers. |

APPENDIX

Exemplary Runtime Hosting Interfaces

HResults
See Common HResults 1.6.7. IHostGCManager

```
interface IHostGCManager : IUnknown
{
    HRESULT ThreadIsBlockingForSuspension( );
    HRESULT SuspensionStarting( );
    HRESULT SuspensionEnding(DWORD Generation);
}
```

1.6.7.1. Method ThreadIsBlockingForSuspension

The runtime calls this method to notify the host 132 that the thread making the call is about to block, perhaps for a GC or other suspension. This gives the host 132 an opportunity to re-schedule the thread for unmanaged tasks.

1.6.7.2. Method SuspensionStarting

The runtime calls this method to notify the host 132 it is beginning a thread suspension for a GC or other suspension.

In this implementation, this thread is not rescheduled.

1.6.7.3. Method SuspensionEnding

The runtime 130 calls this method to notify the host 132 that it is resuming threads after a GC or other suspension. In this implementation, this thread is not rescheduled.

| Parameter | Description |
| --- | --- |
| generation | [in] The garbage collection generation just finishing, from which the thread is resuming. |

APPENDIX

Exemplary Runtime Hosting Interfaces 1.6.8. IHostPolicyManager

```
interface IHostPolicyManager: IUnknown
{
    HRESULT OnDefaultAction(
        [in] EClrOperation operation,
        [in] EPolicyAction action);
    HRESULT OnTimeout(
        [in] EClrOperation operation,
        [in] EPolicyAction action);
    HRESULT OnFailure(
        [in] EClrFailure failure,
        [in] EPolicyAction action);
}
```

1.6.8.1. OnDefaultAction

| Parameter | Description |
|---|---|
| Operation | [in] The operation the runtime 130 is performing for this action |
| Action | [in] The action the runtime 130 is performing |

Called by the runtime 130 on the host 132 when the default action, based on IRuntimePolicyManager::SetDefaultAction, is about to be taken in response to thread abort, appdomain unload, etc.

APPENDIX

Exemplary Runtime Hosting Interfaces

1.6.8.2. OnTimeout

| Parameter | Description |
|---|---|
| Operation | [in] The operation the runtime 130 is performing for this action |
| Action | [in] The action the runtime 130 is performing |

Called by the runtime 130 on the host 132 when an escalation action, based on IRuntimePolicyManager::SetActionOnTimeout, is about to be taken in response to thread abort, appdomain unload, etc.

1.6.8.3. OnFailure

| Parameter | Description |
|---|---|
| Failure | [in] The type of resource allocation or reclamation failure which occurred. |
| Action | [in] The action the runtime 130 is performing |

Called by the runtime 130 on the host 132 when a resource allocation or reclamation failure occurs, based on IRuntimePolicyManager::SetActionOnFailure.

APPENDIX

Exemplary Runtime Hosting Interfaces

1.7. ThreadPool Abstraction Interfaces

The thread pool abstraction consists of a single interface (IHostThreadPoolManager) implemented by the host 132. The runtime 130 uses this interface to configure the thread pool and queue work items to it.

1.7.1. IHostThreadpoolManager

```
interface IHostThreadpoolManager : IUnknown
{
    HRESULT QueueUserWorkItem(
        [in] LPTHREAD_START_ROUTINE Function,
        [in] PVOID Context,
        [in] ULONG Flags);
    HRESULT SetMaxThreads(
        [in] DWORD MaxThreads);
    HRESULT GetMaxThreads(
        [out] DWORD *pdwMaxThreads);
    HRESULT GetAvailableThreads(
        [out] DWORD *pdwAvailableWorkerThreads);
    HRESULT SetMinThreads(
        [in] DWORD MinThreads);
    HRESULT GetMinThreads(
        [out] DWORD *MinThreads);
}
```

1.7.1.1. QueueUserWorkItem

QueueUserWorkItem wraps the Win32 function of the same name. All parameters are identical.

HResults

See Common HResults

APPENDIX

Exemplary Runtime Hosting Interfaces

1.7.1.2. SetMaxThreads

SetMaxThreads allows the runtime 130 to set the maximum number of threads in the thread pool. Hosts 132 are not required to allow the size of the pool to be configured in this way—it's likely that some hosts will want exclusive control over the thread pool size for internal reasons including implementation, performance and scalability. In such a scenario, a host should return E_NOTIMPL.

| Parameter | Description |
|---|---|
| MaxThreads | [in] The maximum number of threads to create in the pool. |

HResults

See Common HResults

E_NOTIMPL. The host 132 doesn't provide an implementation of this method.

1.7.1.3. GetMaxThreads

This method returns the maximum number of threads that will be created in the thread pool.

| Parameter | Description |
|---|---|
| MaxThreads | [out] The maximum number that will be created in the pool. |

HResults

APPENDIX

Exemplary Runtime Hosting Interfaces

See Common HResults

E_NOTIMPL. The host 132 doesn't provide an implementation of this method.

1.7.1.4. GetAvailableThreads

This method returns the number of threads in the pool that are not currently servicing requests.

| Parameter | Description |
| --- | --- |
| AvailableThreads | [out] The number of threads that are currently available to service user requests. |

HResults

See Common HResults

E_NOTIMPL. The host 132 doesn't provide an implementation of this method.

1.7.1.5. SetMinThreads

This method allows the runtime to establish the minimum number of threads created in the pool.

| Parameter | Description |
| --- | --- |
| MinThreads | [in] The minimum number of threads to create in the pool |

APPENDIX

Exemplary Runtime Hosting Interfaces

1.7.1.6. GetMinThreads

This method allows the runtime to query the host 132 for the minimum number of threads available in the pool.

| Parameter | Description |
| --- | --- |
| MinThreads | [out] The minimum number of threads the host 132 provides in the pool. |

1.8. I/O Completion Abstraction Interfaces

The I/O Completion abstraction consists of two interfaces: A host-implemented manager (IHostIOCompletionManager) and a corresponding runtime 130-implemented manager (IRuntimeIOCompletionManager). The runtime 130 calls IHostIOCompletionManager to bind handles to a host-provided completion ports and the host 132 calls IRuntimeIOCompletionManager to notify the runtime 130 that a given I/O request has completed.

1.8.1. IHostIoCompletionManager

```
interface IHostIoCompletionManager : IUnknown
{
    HRESULT CreateIoCompletionPort(
        [out] HANDLE *phPort);
    HRESULT CloseIoCompletionPort(
        [in] HANDLE hPort);
    HRESULT SetMaxThreads(
        [in] DWORD dwMaxIOCompletionThreads);
    HRESULT GetMaxThreads(
        [out] DWORD *pdwMaxIOCompletionThreads);
```

-continued

```
    HRESULT GetAvailableThreads(
        [out] DWORD *pdwAvailableIOCompletionThreads);
    HRESULT GetHostOverlappedSize(
        [out] DWORD * pcbSize);
    HRESULT SetRuntimeIoCompletionManager(
        [in] IRuntimeIoCompletionManager * pManager);
    HRESULT InitializeHostOverlapped(
        [in] void * pvOverlapped);
    HRESULT Bind(
        [in] HANDLE hPort,
        [in] HANDLE hHandle);
    HRESULT SetMinThreads(
        [in] DWORD dwMinIOCompletionThreads);
    HRESULT GetMinThreads(
        [out] DWORD *dwMinIOCompletionThreads);
}
```

APPENDIX

Exemplary Runtime Hosting Interfaces

1.8.1.1. CreateIoCompletionPort

Creates a new IO Completion port through the host 132. I/O operations are bound to the new port using IHostIoCompletionManager::Bind. Status is reported back to the runtime 130 by calls to IRuntimeIoCompletionManager::OnComplete.

| Parameter | Description |
| --- | --- |
| phPort | [out] The newly created I/O Completion port, or 0 if no port could be created. |

HResults

APPENDIX

Exemplary Runtime Hosting Interfaces

See Common HResults

E_OUTOFMEMORY. Not enough resources were available to create the task.

1.8.1.2. CloseIoCompletionPort

Closes a port created with CreateIoCompletionPort.

| Parameter | Description |
| --- | --- |
| hPort | [out] The I/O completion port to close. The port should have been created with a previous call to CreateIoCompletionPort. |

HResults

See Common HResults

E_INVALIDARG. An invalid port was passed.

1.8.1.3. SetMaxThreads

SetMaxThreads allows the runtime 130 to set the maximum number of threads that will be made available to service requests on I/O Completion ports. Hosts are not required to allow the number of available threads to be configured in this way—it's likely that some hosts will want exclusive control over the number of threads size for internal reasons including implementation, performance and scalability. Hosts should return E_NOTIMPL in this case.

APPENDIX

Exemplary Runtime Hosting Interfaces

| Parameter | Description |
|---|---|
| dwMaxIOCompletionThreads | [in] The maximum number of threads to create in order to handle I/O completion requests. |

HResults

See Common HResults

E_NOTIMPL. The host 132 doesn't provide an implementation of this method.

1.8.1.4. GetMaxThreads

This method returns the maximum number of threads that will be created to handle I/O completion requests.

| Parameter | Description |
|---|---|
| pdwMaxIOCompletionThreads | [out] The maximum number of threads that will be created in the pool to handle I/O completion requests. |

HResults

See Common HResults

APPENDIX

Exemplary Runtime Hosting Interfaces

E_NOTIMPL. The host 132 doesn't provide an implementation of this method.

1.8.1.5. GetAvailableThreads

This method returns the number of I/O completion threads that are not currently servicing requests.

| Parameter | Description |
|---|---|
| pdwAvailableIOCompletionThreads | [out] The number of I/O completion threads currently available to service user requests. |

HResults

See Common HResults

E_NOTIMPL. The host 132 doesn't provide an implementation of this method.

1.8.1.6. GetHostOverlappedSize

All asynchronous I/O calls made to Win32 contain an OVERLAPPED structure that provides data like file pointer position. Often times, applications making async I/O calls append custom information to the end of the OVERLAPPED structure to maintain custom state about the request.

APPENDIX

Exemplary Runtime Hosting Interfaces

IHostIOCompletionManager allows the host 132 to append this custom data with calls to GetHostOverlappedSize and InitializeHostOverlapped. GetHostOverlappedSize is called by the runtime 130 to determine the size of any custom data a host 132 wants to attach to the OVERLAPPED structure. This method is only called once—the size of the host 132's custom data should be the same for every request.

| Parameter | Description |
|---|---|
| pcbSize | [out] The number of bytes the runtime 130 should allocate at the end of the OVERLAPPED structure for the host 132's custom data. DO NOT include the size of the OVERLAPPED structure itself in this value. |

HResults

See Common HResults 1.8.1.7. InitializeHostOverlapped

The runtime 130 calls InitializeHostOverlapped before every async I/O request to give the host 132 a chance to initialize any custom data appended to the OVERLAPPED structure.

| Parameter | Description |
|---|---|
| pvOverlapped | [in] A pointer to the beginning of the OVERLAPPED structure. Hosts should offset by sizeof(OVERLAPPED) to get to the start of custom data block. |

APPENDIX

Exemplary Runtime Hosting Interfaces

HResults

See Common HResults

E_OUTOFMEMORY. An out of memory error occurred while the host 132 was trying to allocate memory as part of initializing the data structure. The runtime 130 will return an error to the user and fail the call.

1.8.1.8. SetRuntimeIOCompletionManager

This method provides the host 132 with an interface pointer to the runtime 130's implementation of IRuntimeIOCompletionManager. The host 132 calls this interface to notify the runtime 130 when an I/O request has completed.

| Parameter | Description |
|---|---|
| pManager | [in] A pointer to the runtime 130's implementation of IRuntimeIOCompletionManager. |

HResults

See Common HResults

APPENDIX

Exemplary Runtime Hosting Interfaces 1.8.1.9. Bind

This method binds a handle to a completion port previous created with IHostIoCompletionManager::CreateIOCompletionPort. When the I/O request completes, the host 132 should call IRuntimeIOCompletionManager::OnComplete.

| Parameter | Description |
| --- | --- |
| hPort | [in] The port to bind to. If NULL is passed, the default IO completion port is bound. Ports are created by calling IHostIoCompletionManager::CreateIOCompletionPort. |
| hHandle | [in] The OS handle to bind to the completion port. |

HResults
See Common HResults 1.8.1.10. SetMinThreads

This method allows the runtime to establish the minimum number of IO completion threads created by the host 132.

| Parameter | Description |
| --- | --- |
| MinThreads | [in] The minimum number of threads to create in for IO completion requests. |

APPENDIX

Exemplary Runtime Hosting Interfaces 1.8.1.11. GetMinThreads

This method allows the runtime to query the host 132 for the minimum number of threads available for IO completion requests.

| Parameter | Description |
| --- | --- |
| MinThreads | [out] The minimum number of threads the host 132 provides to service IO completions. |

1.8.2. IRuntimeIoCompletionManager

```
interface IRuntimeIoCompletionManager : IUnknown
{
    HRESULT OnComplete(
        [in] DWORD dwErrorCode,
        [in] DWORD NumberOfBytesTransferred,
        [in] void * pvOverlapped);
}
```

1.8.2.1. OnComplete

OnComplete is the completion callback for I/O requests started with IHostIOCompletionManager::Bind. Hosts pass an HRESULT to OnComplete that describes the outcome of the bind operation. The runtime 130 is equipped to handle requests that have been terminated before completing successfully. Resource pressure in the host 132 may sometimes cause the host 132 to stop a

APPENDIX

Exemplary Runtime Hosting Interfaces thread that has a pending I/O request. In this scenario, the host 132 passes an HRESULT (HOST_E_INTERRUPTED) to OnComplete that indicates the request was terminated prematurely.

| Parameter | Description |
| --- | --- |
| dwErrorCode | [in] An HRESULT indicating why OnComplete was called. Calls that have completed successfully return S_OK. Calls that have failed for an unrecoverable, catastrophic reason return E_FAIL. Calls that have been terminated before completing successfully return HOST_E_INTERRUPTED. |
| NumberOfBytesTransferred | [in] The number of bytes that have been transferred during this I/O request. |
| pvOverlapped | [in] A pointer to the OVERLAPPED structure associated with this request when IHostIOCompletionManager::Bind was called. |

APPENDIX

Exemplary Runtime Hosting Interfaces

HResults
See Common HResults 1.9. Synchronization Abstraction Interfaces

The synchronization abstraction consists of a set of interfaces that allow the runtime 130 to create various synchronization primitives through the host 132 and "manager" interfaces on both the runtime 130 and host side:

IHostSyncManager. Implemented by the host 132 and discovered by the runtime 130 via IHostControl::GetHostManager. Allows the runtime 130 to create sync primitives through the host 132 instead of using standard OS API's.

IHostCriticalSection. A host-implemented critical section.

IHostAutoEvent. A host-implemented auto-reset event.

IHostManualEvent. A host-implemented manual-reset event.

IHostSemaphore. A host-implemented semaphore.

IRuntimeSyncManager. A runtime 130-implemented interface that allows the host 132 to implement deadlock detection on lazily created sync objects created by the runtime 130.

All of these interfaces, except IRuntimeSyncManager are implemented by the host 132.

1.9.1. IHostSyncManager

```
interface IHostSyncManager : IUnknown
{
    HRESULT SetRuntimeSyncManager([in] IRuntimeSyncManager
*pManager);
    HRESULT CreateCrst([out] IHostCriticalSection** ppCrst);
    HRESULT CreateCrstWithSpinCount ([in] DWORD dwSpinCount,
            [out] IHostCriticalSection** ppCrst);
    HRESULT CreateAutoEvent([out] IHostAutoEvent **ppEvent);
    HRESULT CreateManualEvent([in] BOOL bInitialState,
            [out] IHostManualEvent **ppEvent);
    HRESULT CreateMonitorEvent([in] SIZE_T Cookie,
            [out] IHostAutoEvent **ppEvent);
    HRESULT CreateRWLockWriterEvent([in] SIZE_T Cookie,
            [out] IHostAutoEvent **ppEvent);
    HRESULT CreateRWLockReaderEvent([in] BOOL bInitialState,
            [in] SIZE_T Cookie,
            [out] IHostManualEvent **ppEvent);
        HRESULT CreateSemaphore([in] DWORD dwInitial,
            [in] DWORD dwMax,
            [out] IHostSemaphore ** ppSemaphore);
}
```

APPENDIX

Exemplary Runtime Hosting Interfaces

1.9.1.1. SetRuntimeSyncManager

Called by the runtime 130 to sets the runtime 130-implemented manager that corresponds to this host manager.

| Parameter | Description |
| --- | --- |
| pManager | [in] A pointer to the IRuntimeSyncManager provided by the runtime 130. |

HResults
See Common HResults

APPENDIX

Exemplary Runtime Hosting Interfaces

1.9.1.2. CreateCrst

Creates a critical section, for example, such as the WIN32 InitializeCriticalSection interface.

| Parameter | Description |
| --- | --- |
| ppCrst | [out] A pointer to the host 132 implemented critical section or NULL if a critical section couldn't be created. |

HResults
See Common HResults
E_OUTOFMEMORY. Not enough resources were available to create the critical section.

1.9.1.3. CreateCrstWithSpinCount

Creates a critical section with a spin count, for example, such as the WIN32 InitializeCriticalSectionAndSpinCount.

| Parameter | Description |
| --- | --- |
| dwSpinCount | [in] Specifies the spin count for the critical section object. The semantics of this parameter are the same as the same-named parameter in Win32's InitializeCriticalSectionAndSpinCount. |
| ppCrst | [out] A pointer to the host 132 implemented critical section or NULL if a critical section couldn't be created. |

APPENDIX

Exemplary Runtime Hosting Interfaces

HResults
See Common HResults
E_OUTOFMEMORY. Not enough resources were available to create the critical section.

1.9.1.4. CreateAutoEvent

Creates an auto-reset event. This method mirrors the Win32 function CreateEvent with bManualReset set to false.

| Parameter | Description |
| --- | --- |
| ppEvent | [out] A pointer to the host 132 implemented auto reset event or NULL if an event couldn't be created. |

HResults
See Common HResults
E_OUTOFMEMORY. Not enough resources were available to create the event.

APPENDIX

Exemplary Runtime Hosting Interfaces

1.9.1.5. CreateManualEvent

Creates a manual-reset event.

| Parameter | Description |
| --- | --- |
| bInitialState | [in] The semantics of this parameter are the same as the same-named parameter in Win32's CreateEvent. True means the object is signaled, false means it is not signaled. |
| ppEvent | [out] A pointer to the host 132 implemented manual reset event or NULL if an event couldn't be created. |

HResults
See Common HResults
E_OUTOFMEMORY. Not enough resources were available to create the event.

1.9.1.6. CreateMonitorEvent

Creates an auto-reset event that the runtime 130 uses to implement the Base Class Library (BCL) Monitor class.

| Parameter | Description |
| --- | --- |
| cookie | [in] A cookie that the host 132 would like to associate with the monitor. The host 132 can use this cookie to determine which task is waiting on the monitor using IRuntimeSyncManager::GetMonitorOwner. |
| ppEvent | [out] A pointer to the host 132 implemented auto reset event or NULL if an event couldn't be created. |

APPENDIX

Exemplary Runtime Hosting Interfaces

HResults
See Common HResults
E_OUTOFMEMORY. Not enough resources were available to create the event.

1.9.1.7. CreateRWLockWriterEvent

Creates an auto-reset event that the runtime 130 uses to implement a writer lock in a Reader/Writer lock.

| Parameter | Description |
| --- | --- |
| cookie | [in] A cookie that the host 132 would like to associate with the writer lock. The host 132 can use this cookie to determine which tasks are waiting on the lock using the ReaderWriterLock iteration methods on IRuntimeSyncManager. |
| ppEvent | [out] A pointer to the host 132 implemented auto reset event or NULL if an event couldn't be created. |

APPENDIX

Exemplary Runtime Hosting Interfaces

HResults
See Common HResults
E_OUTOFMEMORY. Not enough resources were available to create the event.

1.9.1.8. CreateRWLockReaderEvent

Creates a manual-reset event that the runtime 130 uses to implement a reader lock in a Reader/Writer lock.

| Parameter | Description |
| --- | --- |
| bInitialState | [in] The semantics of this parameter are the same as the same-named parameter in Win32's CreateEvent. True means the object is signaled, false means it is not signaled. |
| cookie | [in] A cookie that the host 132 would like to associate with the reader lock. The host 132 can use this cookie to determine which tasks are waiting on the lock using the ReaderWriterLock iterations methods on IRuntimeSyncManager. |

| Parameter | Description |
| --- | --- |
| ppEvent | [out] A pointer to the host 132 implemented manual reset event or NULL if an event couldn't be created. |

APPENDIX

Exemplary Runtime Hosting Interfaces

HResults
See Common HResults
E_OUTOFMEMORY. Not enough resources were available to create the event.

1.9.1.9. CreateSemaphore

Creates a host-implemented semaphore. This method mirrors Win32's CreateSemaphore.

| Parameter | Description |
| --- | --- |
| dwInitial | [in] Specifies the initial count for the semaphore. This parameter has the same semantics as the lInitialCount parameter to Win32's CreateSemaphore. |
| dwMax | [in] Specifies the maximum count for the semaphore. This parameter has the same semantics as the lMaximumCount parameter to Win32's CreateSemaphore. |
| ppSemaphore | [out] A pointer to the host 132 implemented semaphore or NULL if a semaphore couldn't be created. |

APPENDIX

Exemplary Runtime Hosting Interfaces

HResults
See Common HResults
E_OUTOFMEMORY. Not enough resources were available to create the semaphore.

1.9.2. IHostCrst

```
interface IHostCrst : IUnknown
{
    HRESULT Enter([in] DWORD option);
    HRESULT Leave( );
    HRESULT TryEnter([in] DWORD option,
        [out] BOOL *pbSucceeded);
    HRESULT SetSpinCount([in] DWORD dwSpinCount);
}
```

1.9.2.1. Enter

Attempts to enter the critical section. Enter will not return until the critical section is entered (e.g., see Win32 EnterCriticalSection)

| Parameter | Description |
| --- | --- |
| Option | [in] Values from WAIT_OPTIONS indicating actions the host 132 should take if this operation blocks. See description for WAIT_ OPTIONS above. |

APPENDIX

Exemplary Runtime Hosting Interfaces

HResults
See Common HResults 1.9.2.2. Leave

Leaves the critical section (e.g., see Win32 LeaveCriticalSection).
HResults
See Common HResults 1.9.2.3. TryEnter Attempts to enter the critical section. TryEnter returns immediately and indicates whether the critical section was entered or not (e.g., see Win32 TryEnterCriticalSection).

| Parameter | Description |
| --- | --- |
| Option | [in] Values from WAIT_OPTIONS indicating actions the host 132 should take if this operation blocks. See description for WAIT_ OPTIONS above. |
| pbSucceeded | [out] Indicates whether the critical section could be entered. True if entered, false if not. |

APPENDIX

Exemplary Runtime Hosting Interfaces

HResults
See Common HResults 1.9.2.4. SetSpinCount

Sets a spin count for the critical section.

| Parameter | Description |
| --- | --- |
| dwSpinCount | [in] Specifies the spin count for the critical section object. The semantics of this parameter are the same as the dwSpinCount parameter in Win32's InitializeCriticalSectionAndSpinCount. |

HResults
See Common HResults 1.9.3. IHostAutoEvent

```
interface IHostAutoEvent : IUnknown
{
    HRESULT Wait([in] DWORD dwMilliseconds,
        [in] DWORD option);
    HRESULT Set( );
}
```

APPENDIX

Exemplary Runtime Hosting Interfaces 1.9.3.1. Wait

Waits until the event is owned or until the timeout expires.

| Parameter | Description |
| --- | --- |
| dwMilliseconds | [in] The number of milliseconds to wait until returning if the event doesn't become owned. |
| Option | [in] Values from WAIT_OPTIONS indicating actions the host 132 should take if this operation blocks. See description for WAIT_ OPTIONS above. |

HResults
See Common HResults
HOST_E_DEADLOCK. The host 132 detected a deadlock during the wait and chose this lock as a deadlock victim.
HOST_E_ABANDONED. The event handle was closed when another thread was still waiting for it to be signaled.

1.9.3.2. Set

The Set function sets the event to a signaled state.

APPENDIX

Exemplary Runtime Hosting Interfaces

HResults
See Common HResults 1.9.4. IHostManualEvent

```
interface IHostManualEvent : IUnknown
{
    HRESULT Wait([in] DWORD dwMilliseconds,
        [in] DWORD option);
    HRESULT Reset( );
    HRESULT Set( );
}
```

1.9.4.1. Wait

Waits until the event is owned or until the timeout expires.

| Parameter | Description |
| --- | --- |
| dwMilliseconds | [in] The number of milliseconds to wait until returning if the event doesn't become owned. |
| Option | [in] Values from WAIT_OPTIONS indicating actions the host 132 should take if this |

-continued

| Parameter | Description |
| --- | --- |
| | operation blocks. See description for WAIT_OPTIONS above. |

HResults

APPENDIX

Exemplary Runtime Hosting Interfaces

See Common HResults

HOST_E_DEADLOCK. The host 132 detected a deadlock during the wait and chose this lock as a deadlock victim.

HOST_E_ABANDONED. The event handle was closed when another thread was still waiting for it to be signaled.

1.9.4.2. Reset

The Reset function resets the event to a non-signaled state.

HResults

See Common HResults

1.9.4.3. Set

The Set function sets the event to a signaled state.

HResults

See Common HResults

1.9.5. IHostSemaphore

```
interface IHostSemaphore : IUnknown
{
    HRESULT Wait([in] DWORD dwMilliseconds,
            [in] DWORD option);
    HRESULT ReleaseSemaphore([in] LONG lReleaseCount,
            [out] LONG *lpPreviousCount);
}
```

APPENDIX

Exemplary Runtime Hosting Interfaces

1.9.5.1. Wait

Waits until the semaphore is owned or until the timeout expires. The semaphore becomes owned when its count in non-zero.

| Parameter | Description |
| --- | --- |
| dwMilliseconds | [in] The number of milliseconds to wait until returning if the semaphore doesn't become owned. |
| Option | [in] Values from WAIT_OPTIONS indicating actions the host 132 should take if this operation blocks. See description for WAIT_OPTIONS above. |

HResults

See Common HResults

HOST_E_DEADLOCK. The host 132 detected a deadlock during the wait and chose this lock as a deadlock victim.

1.9.5.2. ReleaseSemaphore

ReleaseSemahore increases the semaphore's count by the specified amount.

| Parameter | Description |
| --- | --- |
| lReleaseCount | [in] As defined in Win32's ReleaseSemaphore |
| lpPreviousCount | [in] As defined in Win32's ReleaseSemaphore |

APPENDIX

Exemplary Runtime Hosting Interfaces

HResults
See Common HResults

1.9.6. IRuntimeSyncManager

```
interface IRuntimeSyncManager : IUnknown
{
    HRESULT GetMonitorOwner ([in] SIZE_T Cookie,
            [out] IHostTask **ppOwnerHostTask);
    HRESULT CreateRWLockOwnerIterator([in]
        SIZE_T Cookie, [out]
SIZE_T *pIterator);
    HRESULT GetRWLockOwnerNext([in] SIZE_T Iterator,
            [out] IHostTask
**ppOwnerHostTask);
    HRESULT DeleteRWLockOwnerIterator([in] SIZE_T Iterator);
}
```

1.9.6.1. GetMonitorOwner

GetMonitorOwner returns the task which owns the monitor identified by the cookie. This is the task free to execute under this monitor. Other tasks may block when attempting to acquire this monitor. This method can be used by the host 132 as part of a deadlock detection scheme. The cookie is associated with the monitor when it is created using IHostSyncManager::CreateMonitorEvent.

GetMonitorOwner always returns immediately and may be called anytime after IHostSyncManager::CreateMonitorEvent—hosts do not have to wait until there is a task waiting on the event. A call to release the event underlying the

APPENDIX

Exemplary Runtime Hosting Interfaces monitor may block (but won't deadlock) if a call to GetMonitorOwner is in affect on the cookie associated with that monitor.

The IHostTask returned is AddRef'd to prevent this task from exiting while the pointer is held by the host 132. The host 132 should Release this pointer to decrement the reference count when finished.

| Parameter | Description |
| --- | --- |
| Cookie | [in] The cookie associated with the monitor. The host 132 is responsible for ensuring that this |

-continued

| Parameter | Description |
|---|---|
| ppOwnerHostTask | cookie maps to an active monitor. That is, the monitor has not been freed. [out] A pointer to the host 132 task that currently owns the monitor. NULL is returned if no task has ownership. |

HResults
See Common HResults
E_INVALIDARG. An invalid cookie was passed in.

APPENDIX

Exemplary Runtime Hosting Interfaces 1.9.6.2. CreateRWLockOwnerIterator

This method creates an iterator that hosts can use to determine the set of tasks that are waiting on a reader/writer lock. Hosts may call this method, and the equivalent "Next" and "Delete" methods during deadlock detection. A call to release the event underlying the reader/writer lock may block (but won't deadlock) if an iteration is in affect on the cookie associated with that lock.

| Parameter | Description |
|---|---|
| Cookie | [in] The cookie associated with the reader/writer lock. The host 132 is responsible for ensuring that this cookie maps to an active lock. That is, the lock has not been freed. |
| pIterator | [out] An iterator that can be passed to GetRWLockOwnerNext and DeleteRWLockOwnerIterator. |

HResults
See Common HResults
E_INVALIDARG. An invalid cookie was passed in.
HOST_E_INVALIDOPERATION. This call was made on a thread that is currently running managed code and therefore may interfere with the runtime 130's attempt to prepare for garbage collection. CreateRWLockOwnerIterator should only be called on threads that are not currently running managed code.

APPENDIX

Exemplary Runtime Hosting Interfaces 1.9.6.3. GetRWLockOwnerNext

Returns the next task that is blocked on this reader/writer lock. If no tasks are blocked, NULL is returned. At this point the iteration is over and the host 132 should delete it using DeleteRWOwnerIterator.

The IHostTask returned is AddRef'd to prevent this task from exiting while the pointer is held by the host 132. The host 132 should Release this pointer to decrement the reference count when finished.

| Parameter | Description |
|---|---|
| Iterator | [in] The iterator created with CreateRWLockOwnerIterator. |
| ppOwnerHostTask | [out] A pointer to the next host task that is currently waiting on the lock. NULL is returned when no more tasks are waiting. |

HResults
See Common HResults
E_INVALIDARG. An invalid interator was passed in.

1.9.6.4. DeleteRWLockOwnerIterator
Deletes an iterator created with CreateRWLockOwnerIterator.

| Parameter | Description |
|---|---|
| Iterator | [in] The iterator created with CreateRWLockOwnerIterator. |

APPENDIX

Exemplary Runtime Hosting Interfaces

HResults
See Common HResults
E_INVALIDARG. An invalid iterator was passed in.

1.10. Assembly Loading Abstraction

The assembly loading abstraction consists of interfaces that allow hosts to customize the assembly loading process. Specifically, hosts can supply a list of assemblies that should be loaded domain-neutral and customize the way assemblies are located and loaded. The interfaces in the Assembly Loading Abstraction are:

IHostAssemblyManager. The runtime 130 asks for this top level interface through IHostControl::GetHostManager when the runtime 130 is initialized. If an implementation of this interface is provided, it is assumed that the host 132 wishes to control some aspect of the assembly binding process. IHostAssemblyManager contains methods for the host 132 to provide the list of assemblies that should be loaded domain-neutral, the list of assemblies to which runtime 130 should bind, and to supply an implementation of IHostAssemblyStore through which the host 132 can implement their own custom assembly resolution process.

IHostAssemblyStore. To load an assembly from somewhere other than the file system, a host 132 typically catches an AssemblyResolve event on System.AppDomain and provides a byte array containing the assembly's

APPENDIX

Exemplary Runtime Hosting Interfaces bits. An implementation of IHostAssemblyStore provides additional host-specific stores from which it can bind. If an IHostAssemblyStore is provided, runtime 130 will call back to the host 132 through this interface when binding to an assembly. The host 132 is free to load the assembly from anywhere it chooses and with whatever rules it deems appropriate. In essence, hosts can use IHostAssemblyStore to completely "bypass" Runtime 130 if so desired.

A instance of the AssemblyBindInfo structure is passed to define each time a binding request occurs to the custom assembly store. This structure describes the identity of the assembly being requested along with information about whether there is any version policy present on the machine that might affect the bind.

IRuntimeAssemblyReferenceList.

1.10.1. IHostAssemblyManager

```
interface IHostAssemblyManager: IUnknown
{
    HRESULT GetDomainNeutralAssemblies([out]
IRuntime AssemblyReferenceList** ppReferenceList);
    HRESULT GetNonHostStoreAssemblies([out]
IRuntimeAssemblyReferenceList** ppReferenceList);
        HRESULT GetAssemblyStore([out] IHostAssemblyStore
**ppAssemblyStore);
        HRESULT GetHostApplicationPolicy([in] DWORD dwPolicy,
            [in] DWORD dwAppDomainId,
            [in, out] DWORD *pcbBufferSize,
            [out, size_is(*pcbBufferSize)] BYTE *pbBuffer
            );
}
```

APPENDIX

Exemplary Runtime Hosting Interfaces 1.10.1.1. GetDomainNeutralAssemblies

IHostAssemblyManager::GetDomainNeutralAssemblies is the implementation of the requirement to allow a host 132 to specify the set of assemblies to load domain-neutral at a finer granularity than we had in V1. This method returns an exact list of assemblies to be loaded domain neutral. Hosts can return a NULL interface pointer to indicate no list is specified. In this case, the STARTUP_LOADER_OPTIMIZATION_* settings passed to CorBindToRuntimeEx and/or the AppDomainSetup.LoaderOptimzation property passed to AppDomain.CreateDomain will determine which assemblies are loaded domain-neutral.

The runtime 130 calls GetDomainNeutralAssemblies when the runtime 130 is initialized—in this implementation, it is not called again. This list of assemblies should form a full closure—if an assembly is included in the list, all assemblies it references should also be in the list. If a full closure is not specified, the runtime 130 will throw a FileLoadException the first time it tries to resolve a reference from an assembly in the list to an assembly that is not in the list.

The assemblies returned from GetDomainNeutralAssemblies augment those selected by the loader optimization setting (STARTUP_LOADER_OPTIMIZATION_*) the host 132 may have passed to CorBindToRuntimeEx. For example:

If this method returns a null list, the STARTUP_LOADER_OPTIMIZATION_* flags define the set of assemblies that will be loaded domain neutral.

APPENDIX

Exemplary Runtime Hosting Interfaces

If the host 132 passes STARTUP_LOADER_OPTIMIZATION_SINGLE_DOMAIN (load no assemblies domain neutral), then only the assemblies returned from GetDomainNeutralAssembles will be loaded domain neutral.

If the host 132 passes STARTUP_LOADER_OPTIMIZATION_MULTI_DOMAIN (load all assemblies domain neutral), then all assemblies will be loaded domain neutral, regardless of what is returned from GetDomainNeutralAssembles.

If the host 132 passes STARTUP_LOADER_OPTIMIZATION_MULTI_DOMAIN_HOST (load only strong named assemblies domain neutral), then all strong named assemblies plus those returned from GetDomainNeutralAssemblies will be loaded domain neutral.

The same rules apply to the AppDomainSetup.LoaderOptimization option that can be passed to AppDomain.CreateDomain.

| Parameter | Description |
|---|---|
| ppReferenceList | [out] interface pointer to IRuntimeAssemblyReferenceList containing references to assemblies the host 132 wishes to load domain neutral |

HResults
See Common HResults

APPENDIX

Exemplary Runtime Hosting Interfaces 1.10.1.2. GetNonHostStoreAssemblies

GetNonHostStoreAssemblies returns a list of assemblies that the host 132 wants the runtime 130 to bind to. Assemblies not included in the list are meant to be loaded by the host 132 (see IHostAssemblyStore below). The runtime 130 calls GetNonHostStoreAssemblies when the runtime 130 is initialized.

If GetNonHostStoreAssemblies returns a NULL interface pointer, the runtime 130 will bind to all assemblies. The process generally works as follows:

Each time the runtime 130 is asked to resolve an assembly reference, it will consult the list of assemblies via the interface pointer returned in this method.

If the referenced assembly is in the list, the runtime 130 will bind as normal.

If the referenced assembly is NOT in the list AND the host 132 has provided an implementation of IHostAssemblyStore (returned through IHostAssemblyManager::GetAssemblyStore), the runtime 130 will call IHostAssemblyStore::ProvideAssembly to allow the host 132 to supply the assembly.

If the referenced assembly is NOT in the list and the host 132 has NOT provided an implementation of IHostAssemblyStore, the runtime 130 will fail the bind.

| Parameter | Description |
|---|---|
| ppReferenceList | [out] interface pointer to IRuntimeAssemblyReferenceList containing references to assemblies the host 132 wishes to be loaded by the runtime 130 from outside the host 132 provided store (most often the GAC) |

APPENDIX

Exemplary Runtime Hosting Interfaces

HResults
See Common HResults
E_OUTOFMEMORY. Not enough memory available to create the list of assemblies.

1.10.1.3. GetAssemblyStore

GetAssemblyStore returns an interface pointer of type IHostAssemblyStore to a host-implemented container of assemblies. IHostAssemblyStore provides methods that allow hosts to bind to assemblies and modules independent of runtime 130. Hosts typically provide assembly stores to allow assemblies to be loaded from formats other than the file system. For example, SQL Server will implement an assembly store to load assemblies from the database, while Avalon may provide an implementation that loads assemblies out of their application container files.

| Parameter | Description |
|---|---|
| ppAssemblyStore | [out] A pointer to a host's implementation of IHostAssemblyStore. Return NULL If the host 132 doesn't implement a custom assembly store. |

APPENDIX

Exemplary Runtime Hosting Interfaces

HResults
See Common HResults
E_NOINTERFACE. The host 132 does not provide an implementation of IHostAssemblyStore.

1.10.2. IHostAssemblyStore

As described, the IHostAssemblyStore interface gives the host 132 a way to efficiently load assemblies from a host-specific store based on assembly identity. Hosts load assemblies and modules by providing the runtime 130 with an IStream which points directly to the bytes. By providing an implementation of IHostAssemblyStore, the host 132 specifies its intent to resolve all assemblies not referenced by the IRuntimeAssemblyReferenceList returned from IHostAssemblyManager::GetNonHostStoreAssemblies. This allows hosts to control binding to user assemblies, but still have the runtime 130 bind to the other assemblies, if desired.

The runtime 130 determines if the host 132 has implemented IHostAssemblyStore by calling IHostAssemblyManager::GetAssemblyStore at startup.

FIG. 8 shows how IHostAssemblyStore fits into the assembly loading architecture.

```
typedef struct _AssemblyBindInfo
{
    DWORD      dwAppDomainId;
    LPCWSTR    lpReferencedIdentity;
    LPCWSTR    lpPostPolicyIdentity;
    DWORD      ePolicyLevel;
}AssemblyBindInfo;
typedef struct _ModuleBindInfo
{
    DWORD      dwAppDomainId;
    LPCWSTR    lpAssemblyIdentity;
    LPCWSTR    lpModuleName;
}ModuleBindInfo;
    interface IHostAssemblyStore: IUnknown
    {
        HRESULT ProvideAssembly
        (
            [in] AssemblyBindInfo *pBindInfo,
            [out] BYTE         *pbModuleId,
            [out] DWORD         *pcbModuleId,
            [out] IUnknown      **ppUnkEvidence,
            [out] IStream       **ppStmAssemblyImage,
            [out] IStream       **ppStmPDB);
        HRESULT ProvideModule
        (
            [in] ModuleBindInfo *pBindInfo,
            [out] BYTE         *pbModuleId,
            [out] DWORD         *pcbModuleId,
            [out] IStream       **ppStmModuleImage,
            [out] IStream       **ppStmPDB);
    }.
```

APPENDIX

Exemplary Runtime Hosting Interfaces

1.10.2.1. ProvideAssembly

This interface is called to resolve all assemblies NOT referenced by the IRuntimeAssemblyReferenceList returned from IHostAssemblyManager::GetNonHostStoreAssemblies. Information about the assembly including identity and pre and post policy references are supplied to the host 132 via an instance of AssemblyBindInfo (the pBindInfo parameter).

APPENDIX

Exemplary Runtime Hosting Interfaces

Assemblies are returned from the host 132 to Runtime 130 as an IStream*. In addition to the stream itself, the host 132 also returns an identifier that runtime 130 can use to uniquely identify that stream. The id is completely host-specified—The contents of the id itself have no meaning to the runtime 130. This id is used within the runtime 130 as the identity of the mapped stream. Each time the host 132 returns a stream with the same id, the runtime 130 consults a table to see if the contents of that stream have already been mapped. If so, the existing copy is used instead of remapping the stream. The id's should be unique within the lifetime of a given process.

| Parameter | Description |
|---|---|
| pBindInfo | [in] An instance of AssemblyBindInfo through which the host 132 determines various characteristics of the bind including which assembly to resolve and whether any version policy is present that would affect the original reference. |
| pbModuleID | [out] An identifier used to uniquely identify this stream. If the same id is returned from multiple calls to ProvideAssembly, the stream representing that id will only be mapped once. These module ids should be unique from those used in the ProvideModule API below because they occupy the same logical namespace. |

| Parameter | Description |
| --- | --- |
| pcbModuleID | [in, out] The size of the buffer (pbModuleID) used to hold the id. An initial value is passed in with the call. If this buffer is not big enough, the host 132 will return the required size back through pcbModuleID and return ERROR_INSUFFICIENT_BUFFER from ProvideAssembly. |
| ppUnkEvidence | [out] The evidence the host 132 wants associated with the loaded assembly. |
| ppStmAssemblyImage | [out] An IStream that contains the PE image to be loaded. NULL if the assembly couldn't be found. |
| ppStmPDB | [out] An IStream that contains the pdb (debug information). NULL if the pdb file cannot be loaded |

APPENDIX

Exemplary Runtime Hosting Interfaces

HResults
See Common HResults
ERROR_FILE_NOT_FOUND. The requested assembly could not be found.

APPENDIX

Exemplary Runtime Hosting Interfaces

ERROR_INSUFFICIENT_BUFFER. The size of the buffer passed in through pcbAssemblyID is not big enough to hold the id the host 132 wishes to return.

1.10.2.2. ProvideModule

Runtime 130 calls this method to resolve a module within an assembly.

| Parameter | Description |
| --- | --- |
| pBindInfo | [in] An instance of ModuleBindInfo describing the requested module's AppDomain, assembly and module name. |
| pbModuleId | [out] An identifier used to uniquely identify this stream. If the same id is returned from multiple calls to ProvideModule, the stream representing that id will only be mapped once. The module id used here should be unique from those used in ProvideAssembly above because these identifiers occupy the same logical namespace |
| pcbModuleID | [in, out] The size of the buffer (pbModuleID) used to hold the id. An initial value is passed in with the call. If this buffer is not big enough, the host 132 will return the required size back through pcbModuleID and return ERROR_INSUFFICIENT_BUFFER from ProvideModule. These id's should be unique process wide and should not collide with id's returned from ProvideAssembly. |
| ppStmModuleImage | [out] An IStream that contains the PE image to be loaded. NULL if the module couldn't be found. |
| ppstmModuleDebugInfo | [out] An IStream containing the pdb "file" for this module. NULL if the debug info couldn't be found or if debug info is not requested. |

APPENDIX

Exemplary Runtime Hosting Interfaces

HResults
See Common HResults
ERROR_FILE_NOT_FOUND. The requested assembly could not be found.

ERROR_INSUFFICIENT_BUFFER. The size of the buffer passed in through pcbModuleID is not big enough to hold the id the host 132 wishes to return.

APPENDIX

Exemplary Runtime Hosting Interfaces 1.10.3. IRuntimeAssemblyReferenceList

The host 132 communicates information about assemblies, such as the list to load domain-neutral or the list loaded by the runtime 130 (not from the host 132 store) by creating a list of these assembly references, accessed by an instance of IRuntimeAssemblyReferenceList. This instance is created via IRuntimeAssemblyIdentityManager::GetRuntimeAssemblyReferenceList.

```
interface IRuntimeAssemblyReferenceList : IUnknown
{
    HRESULT IsStringAssemblyReferenceInList(
        [in] LPCWSTR pwzAssemblyName
    );
    HRESULT IsAssemblyReferenceInList(
        // pName could be IAssemblyName or IReferenceIdentity
        [in] IUnknown *pName
    );
}
```

1.10.3.1. IsStringAssemblyReferenceInList

Given an assembly name, determine if the name is in the assembly reference list.

| Parameter | Description |
| --- | --- |
| pwszAssemblyName | [in] Name of the assembly to search for in list |

HResults
S_OK The string or reference is found in list.
S_FALSE The string or reference is not found in list.
E_FAIL Internal failure

APPENDIX

Exemplary Runtime Hosting Interfaces 1.10.3.2. Is AssemblyReferenceInList

| Parameter | Description |
| --- | --- |
| pName | [in] IUnknown pointer to either IAssemblyName or IReferenceIdentity for assembly to search for in list |

HResults
S_OK The string or reference is found in list.
S_FALSE The string or reference is not found in list.
E_FAIL Internal failure 1.10.4. IRuntimeHostBindingPolicyManager This interface allows the host 132 to communicate changes in policy information for a particular assembly and to evaluate the currently policy. The host 132 supplies the source and target assembly identities with current policy and the runtime 130 will return the new application of policy between them.

```
typedef enum
{
    ePolicyLevelNone = 0x0,
    ePolicyLevelRetargetable = 0x1,
    ePolicyUnifiedToRuntime = 0x2,
    ePolicyLevelApp = 0x4,
    ePolicyLevelPublisher = 0x8,
    ePolicyLevelHost = 0x10,
    ePolicyLevelAdmin = 0x20
} EBindPolicyLevels;
``` interface IRuntimeHostBindingPolicyManager:IUnknown

APPENDIX

Exemplary Runtime Hosting Interfaces

```
{
    HRESULT ModifyApplicationPolicy(
        [in] LPCWSTR      pwzSourceAssemblyIdentity,
        [in] LPCWSTR      pwzTargetAssemblyIdentity,
        [in] BYTE         *pbApplicationPolicy,
        [in] DWORD        cbAppPolicySize,
        [in] DWORD        dwPolicyModifyFlags,
        [out, size_is(*pcbNewAppPolicySize)]BYTE
*pbNewApplicationPolicy,
        [in, out] DWORD   *pcbNewAppPolicySize
    );
    HRESULT EvaluatePolicy(
        [in] LPCWSTR      pwzReferenceIdentity,
        [in] BYTE         *pbApplicationPolicy,
        [in] DWORD        cbAppPolicySize,
        [out, size_is(*pcchPostPolicyReferenceIdentity)] LPWSTR
pwzPostPolicyReferenceIdentity,
        [in, out] DWORD   *pcchPostPolicyReferenceIdentity,
        [out] DWORD       *pdwPoliciesApplied
    );
};
```

1.10.4.1. ModifyApplicationPolicy

Given a new binding redirect, modify the old binding policy, and return a new copy.

| Parameter | Description |
| --- | --- |
| pwzSourceAssemblyIdentity | [in] Old version of assembly |
| pwzTargetAssemblyIdentity | [in] New version of assembly |
| pbApplicationPolicy | [in] Old policy (opaque data) |
| cbAppPolicySize | [in] Size of the old policy |
| dwPolicyFlags | [in] EHostBindingPolicyFlags values, controlling redirection |
| pbNewApplicationPolicy | [out] New application policy (opaque data) |
| pcbNewAppPolicySize | [in, out] Size of new policy buffer |

APPENDIX

Exemplary Runtime Hosting Interfaces

In one implementation, this API is called twice: once to ascertain the necessary size of the new policy buffer, by passing NULL for the new policy buffer. The method will return the necessary buffer size value in pcbNewAppPolicySize. The second call should pass this same value, and pass a correctly allocated and sized buffer in pbNewApplicationPolicy.

HResults
S_OK SUCCESS
E_INVALIDARG if pwzSourceAssemblyIdentity or pwzTargetAssemblyIdentity is NULL.
HRESULT_FROM_WIN32(ERROR_INSUFFICIENT_BUFFE R) if input buffer is too small.

1.10.4.2. EvaluatePolicy

This method evaluates policy on behalf of the host 132. The intent of these API's is to allow the host 132 to influence policy to enforce host-specific versioning and in-place assembly updates, but to keep the policy engine itself within the runtime 130, maintaining long term policy consistency.

| Parameter | Description |
| --- | --- |
| pwszReferenceIdentity | [in] pre-policy assembly reference |
| pbApplicationPolicy | [in] policy data (opaque) |
| cbAppPolicySize | [in] size of policy data buffer |
| pwszPostPolicyReferenceIdentity | [out] post-policy assembly reference |
| pcchPostPolicyReferenceIdentity | [in, out] size of post-policy assembly reference buffer |
| pdwPoliciesApplied | [out] policies applied. Combination of values or'd from EBindPolicyLevels enum |

APPENDIX

Exemplary Runtime Hosting Interfaces 1.10.5. IRuntimeAssemblyIdentityManager

```
interface IRuntimeAssemblyIdentityManager : IUnknown
{
    HRESULT GetRuntimeAssemblyReferenceList(
        [in] LPCWSTR *ppwzAssemblyReferences,
        [in] DWORD dwNumOfReferences,
```

-continued

```
        [out] IRuntimeAssemblyReferenceList
             **ppReferenceList
    );
    HRESULT GetTextualIdentityFromFile(
        [in] LPCWSTR      pwzFilePath,
        [in] DWORD        dwFlags,
        [out, size_is(*pcchBufferSize)]
             LPWSTR pwzBuffer,
        [in, out] DWORD *pcchBufferSize
    );
    HRESULT GetTextualIdentityFromStream(
        [in]     IStream     *pStream,
        [in]     DWORD       dwFlags,
        [out, size_is(*pcchBufferSize)] LPWSTR
             pwzBuffer,
        [in, out] DWORD            *pcchBufferSize
    );
    HRESULT GetReferencedAssembliesFromFile(
        [in] LPCWSTR      pwzFilePath,
        [in] DWORD        dwFlags,
        [in] IRuntimeAssemblyReferenceList
             *pExcludeAssembliesList,
        [out] IRuntimeReferenceAssemblyEnum
             **ppReferenceEnum
    );
    HRESULT GetReferencedAssembliesFromStream(
        [in] IStream      *pStream,
        [in] DWORD        dwFlags,
        [in] IRuntimeAssemblyReferenceList
             *pExcludeAssembliesList,
        [out] IRuntimeReferenceAssemblyEnum
             **ppReferenceEnum
    );
    HRESULT GetProbingAssembliesFromReference(
        [in] DWORD        dwMachineType,
        [in] DWORD        dwFlags,
        [in] LPCWSTR      pwzReferenceIdentity,
        [out] IRuntimeProbingAssemblyEnum
             **ppProbingAssemblyEnum
    );
};
```

APPENDIX

Exemplary Runtime Hosting Interfaces

1.10.5.1. GetRuntimeAssemblyReferenceList

This API returns an instance of IRuntimeAssemblyReferenceList from a text list of partial assembly identities. This is the bridge between host/human readable partial identities and the unique opaque representation used internally for policy evaluation and application.

| Parameter | Description |
| --- | --- |
| ppwszAssemblyReferences | [in] Array of NULL terminated strings, in forms of "name, property = value, ..." |
| dwNumOfReferences | [in] number of strings in array above |
| ppReferenceList | [out] returned interface pointer to IRuntimeAssemblyReferenceList |

APPENDIX

Exemplary Runtime Hosting Interfaces

HResults
See Common HResults

1.10.5.2. GetTextualIdentityFromFile

This API returns the opaque canonical assembly identity, used internally for policy application and evaluation, from a given assembly file.

| Parameter | Description |
| --- | --- |
| pwszFilePath | [in] path to file to be evaluated |
| dwFlags | [in] |
| pwszBuffer | [out] assembly's identity (opaque data) |
| pcchBufferSize | [in, out] buffer size of pwszBuffer |

This API may be called twice, once to ascertain the necessary size of pwszBuffer, by passing NULL for that and receiving the necessary buffer size back in pcchBufferSize. The second call would pass a correctly allocated pwszBuffer, and supply that size in pcchBufferSize. Upon return pwszBuffer would be filled in with the opaque textual identity.

HResults

APPENDIX

Exemplary Runtime Hosting Interfaces

S_OK SUCCESS
E_INVALIDARG If pwzFilePath is NULL.
HRESULT_FROM_WIN32(ERROR_INSUFFICIENT_
    BUFFER) If the supplied buffer is too small
E_FAIL Other

1.10.5.3. GetTextualIdentityFromStream

This API returns the opaque canonical assembly identity, used internally for policy application and evaluation, from a given assembly IStream.

| Parameter | Description |
| --- | --- |
| pStream | [in] assembly stream to be evaluated |
| dwFlags | [in] |
| pwszBuffer | [out] assembly's identity (opaque data) |
| pcchBufferSize | [in, out] buffer size of pwszBuffer |

This API may be called twice, once to ascertain the necessary size of pwszBuffer, by passing NULL for that and receiving the necessary buffer size back in pcchBufferSize. The second call would pass a correctly allocated pwszBuffer, and supply that size in pcchBufferSize. Upon return pwszBuffer would be filled in with the opaque textual identity.

APPENDIX

Exemplary Runtime Hosting Interfaces

HResults
S_OK SUCCESS
E_INVALIDARG If pwzFilePath is NULL.
HRESULT_FROM_WIN32(ERROR_INSUFFICIENT_
    BUFFER) If the supplied buffer is too small
E_FAIL Other

1.10.5.4. GetReferencedAssembliesFromFile

This API returns post-policy references for the assemblies referenced from this file. The caller may choose to exclude a known set of assembly references from what is returned. This set is defined by an instance of IRuntimeAssemblyReferenceList.

| Parameter | Description |
| --- | --- |
| pwszFilePath | [in] path to assembly file to be evaluated |
| dwFlags | [in] |
| pExcludeAssembliesList | [in] interface pointer to list of assembly references to exclude |
| pwszBuffer | [out] assembly's identity (opaque data) |
| pcchBufferSize | [in, out] buffer size of pwszBuffer |

APPENDIX

Exemplary Runtime Hosting Interfaces

HResults
See Common HResults

1.10.5.5. GetReferencedAssembliesFromStream

This API returns post-policy references for the assemblies referenced from this file. The caller may choose to exclude a known set of assembly references from what is returned. This set is defined by an instance of IRuntimeAssemblyReferenceList.

| Parameter | Description |
| --- | --- |
| pStream | [in] IStream pointer to assembly to be evaluated |
| dwFlags | [in] |
| pExcludeAssembliesList | [in] interface pointer to list of assembly references to exclude |
| pwszBuffer | [out] assembly's identity (opaque data) |
| pcchBufferSize | [in, out] buffer size of pwszBuffer |

HResults
See Common HResults

APPENDIX

Exemplary Runtime Hosting Interfaces

1.10.5.6. GetProbingAssembliesFromReference

Based on the canonical textual identity of an assembly, returns an enum that may produce identities for processor architecture specific, MSIL only, or identity with no architecture information.

| Parameter | Description |
| --- | --- |
| dwMachineType | [in] valid processor architecture as defined in winnt.h |
| dwFlags | [in] |
| pwszReferenceIdentity | [in] opaque textual assembly identity (possibly returned from GetTextualIdentityFromStream or GetTextualIdentityFromFile) |
| ppProbingAssemblyEnum | [out] instance of enumerator interface containing all runtime 130 probing assemblies |

1.10.6. IRuntimeProbingAssemblyEnum

An instance of this interface is returned from method such as IRuntimeAssemblyIdentityManager::GetProbingAssembliesFromReference. It allows the host 132 to acquire the probing identities of an assembly using the canonical identity (internal representation of the runtime 130) without being required to understand or form that identity.

```
interface IRuntimeProbingAssemblyEnum:IUnknown
{
    HRESULT Get(
        [in]            DWORD dwIndex,
        [out, size_is(*pcchBufferSize)] LPWSTR pwzBuffer,
        [in, out] DWORD *pcchBufferSize
    );
};
```

APPENDIX

Exemplary Runtime Hosting Interfaces

1.10.6.1. Get

| Parameter | Description |
| --- | --- |
| dwIndex | [in] index of assembly identity to return |
| pwszBuffer | [in] |
| pcchBufferSize | [in, out] opaque textual assembly identity |

The identity at index 0 will be the processor architecture specific identity. The identity at index 1 is the MSIL architecture-neutral identity, The identity at index 2 will not contain architecture information.

This API may be called twice, once supplying NULL for pwszBuffer and upon return pcchBufferSize contains the necessary size of pwszBuffer. On the second call, pass this value for pcchBufferSize and a correctly allocated pwszBuffer. Upon return from this second call, pwszBuffer will be correctly filled with the canonical assembly identity.

HResults
S_OK SUCCESS

APPENDIX

Exemplary Runtime Hosting Interfaces

HRESULT_FROM_WIN32(ERROR_INSUFFICIENT_BUFFE R) If the supplied buffer is too small HRESULT_FROM_WIN32(ERROR_NORE_MOR-E_ITEMS) If end of enum

1.10.7. IRuntimeReferenceAssemblyEnum

An instance of this interface is returned from method such as IRuntimeAssemblyIdentityManager::GetReferencedAssembliesFromFile. It allows the host 132 to manipulate the set of assemblies referenced by a file or stream using the canonical identities (internal representation of the runtime 130) without being required to understand or form those identities.

```
interface IRuntimeReferenceAssemblyEnum : IUnknown
{
    HRESULT Get(
        [in]           DWORD dwIndex,
        [out, size_is(*pcchBufferSize)] LPWSTR pwzBuffer,
        [in, out] DWORD *pcchBufferSize
    );
};
```

1.10.7.1. Get

| Parameter | Description |
|---|---|
| dwIndex | [in] index of assembly identity to return |
| pwszBuffer | [in] |
| pcchBufferSize | [in, out] opaque textual assembly identity |

APPENDIX

Exemplary Runtime Hosting Interfaces

This API may be called twice, once supplying NULL for pwszBuffer and upon return pcchBufferSize contains the necessary size of pwszBuffer. On the second call, pass this value for pcchBufferSize and a correctly allocated pwszBuffer. Upon return from this second call, pwszBuffer will be correctly filled with the canonical assembly identity, without processor architecture.

HResults
S_OK SUCCESS
HRESULT_FROM_WIN32(ERROR_INSUFFICIENT_BUFFER) If the supplied buffer is too small
HRESULT_FROM_WIN32(ERROR_NORE_MOR-E_ITEMS) If end of enum.

1.11. Security Context and Impersonation

Hosts 132 may choose to control all framework and user code access to thread tokens and to ensure complete security context information is passed across async points or points of restricted context execution.

The actual context information unique to the host 132 is encapsulated in an instance of an interface IHostSecurityContext. This is opaque to the runtime 130 and will be captured and moved across threadpool worker item dispatch, finalizer execution, and both module and class constructor execution.

Interface Definitions

APPENDIX

Exemplary Runtime Hosting Interfaces

```
typedef enum
{
    eCurrentContext=0x00,
    eRestrictedContext=0x01
} EContextType;
```

1.11.1. IHostSecurityContext

```
interface IHostSecurityContext : IUnknown
{
    HRESULT Capture([out] IHostSecurityContext** ppClonedContext);
}
```

1.11.2. IHostSecurityManager

```
interface IHostSecurityManager : IUnknown
{
    HRESULT ImpersonateLoggedOnUser([in] HANDLE hToken);
    HRESULT RevertToSelf( );
    HRESULT OpenThreadToken([in] DWORD dwDesiredAccess,
        [in] BOOL bOpenAsSelf, [out] HANDLE *phThreadToken);
    HRESULT SetThreadToken([in] HANDLE hToken);
    HRESULT GetSecurityContext([in] EContextType eContextType,
        [out] IHostSecurityContext** ppSecurityContext);
    HRESULT SetSecurityContext([in] EContextType eContextType,
        [in] IHostSecurityContext* pSecurityContext);
}
```

1.11.3. Impersonation

Note, only API's actually affecting a thread are covered here. There are a number of other API's such as CreateRestrictedToken and LogonUser which produce tokens but do not affect a thread. Those tokens may then be passed to one of the API's above.

The first 4 methods of IHostSecurityManager mirror those of the Win32 API, with the difference that the Win32 API versions allow passing of an arbitrary

APPENDIX

Exemplary Runtime Hosting Interfaces thread
handle, but the host 132 SecurityManager API's all
act on the current thread of execution.

In the case of OpenThreadToken, an actual OS token is returned and the desired access level is achieved. User code may then call other API's including, for example, the WIN32 API (e.g., DuplicateToken or GetTokenInformation) passing this token. The other API's will expect real OS tokens to be passed in as well, because these tokens may be coming from other API's such as Win32 LogonUser.

1.11.3.1. ImpersonateLoggedOnUser

| Parameter | Description |
| --- | --- |
| hToken | [in] token representing the credentials of the user to impersonate. This may have been retrieved using LogonUser or via a Win32 API. |

1.11.3.2. RevertToSelf

This function terminates the client impersonation and returns the original thread token.

APPENDIX

Exemplary Runtime Hosting Interfaces

11.11.3.3. OpenThreadToken

| Parameter | Description |
| --- | --- |
| dwDesiredAccess | [in] Specifies an access mask that specifies the requested types of access to the access token. These requested access types are reconciled against the token's discretionary access control list (DACL) to determine which accesses are granted or denied. See Win32 documentation for OpenThreadToken API. |
| bOpenAsSelf | [in] Indicates whether the access check is to be made against the calling thread token or against the process token. See Win32 documentation for OpenThreadToken API. |
| phThreadToken | [out] Pointer to the newly acquired thread token |

1.11.3.4. SetThreadToken

| Parameter | Description |
| --- | --- |
| pAssemblyInfo | [in] pointer to AssemblyBindInfo instance containing Assembly information |
| pAssemblyId | [out] 64 bit process unique host 132 identifier for this assembly |

APPENDIX

Exemplary Runtime Hosting Interfaces

1.11.4. Security Context Flow

Managed thread context will be handled internally to the runtime 130 and passed across async points.

See ExecutionContext for internal details. These will include the compressed stack for CAS evaluation. Information unique to the host 132 is exposed by via IHostSecurityContext, captured by the runtime 130 at each point below and propagated to the receiving side. The runtime 130 will query the process-wide IHostSecurityManager to retrieve the IHostSecurityContext appropriate to the current thread of execution in the following cases:

Finalizer Execution (on finalizer thread)
Class and module constructor execution (.cctors and .mtors)
Worker Thread Async Points (ThreadPool QueueUserWorkItem)
Async I/O (I/O completion port servicing)

1.11.5. Enum: EContextType

The runtime 130 currently supports two context types, the current thread context, which is the context on the thread at the time the runtime 130 calls

APPENDIX

Exemplary Runtime Hosting Interfaces

GetSecurityContext on the host 132, and restricted context which is a lower privilege context. The runtime does not allow a host 132 to differentiate restricted contexts, i.e. it asks for eRestrictedContext to run finalizers, class and module constructors.

| Parameter | Description |
| --- | --- |
| eCurrentContext | Context on thread at the time runtime 130 calls GetSecurityContext |
| eRestrictedContext | Lower privilege context placed on thread to run finalizers, class and module constructors |

1.11.5.1. GetSecurityContext

| Parameter | Description |
| --- | --- |
| eContextType | [in] value from EContextType denoting what type of context to return |
| ppSecurityContext | [out] interface pointer to IHostSecurityContext |

APPENDIX

Exemplary Runtime Hosting Interfaces

1.11.5.2. SetSecurityContext

| Parameter | Description |
| --- | --- |
| eContextType | [in] value from EContextType denoting what type of context runtime 130 is placing on host |
| pSecurityContext | [in] interface pointer to IHostSecurityContext of eContextType. |

1.11.5.3. Capture

| Parameter | Description |
| --- | --- |
| ppClonedContext | [out] interface pointer to IHostSecurityContext. This is a clone of the context to capture. When this information is moved across an async point, it's lifetime is separated from the original queried context pointer, which may then be released. |

1.11.6. Execution of Finalizers, Class, and Module Constructors

Hosts 132 may disallow user code finalizers, but even if only fully trusted .NET Framework code finalizers run, they may call back into arbitrary user code.

APPENDIX

Exemplary Runtime Hosting Interfaces In addition, the runtime 130 may choose to run class or module constructors in the host 132's restricted context. (NOTE: we do not provide multiple notions of restricted contexts. The same restricted context used for finalizers is used for these constructors.)

The runtime 130 protects the host 132 by doing the following:

Capture the current thread context by calling IHostSecurityManager::GetSecurityContext(eCurrentContext, &pCurrentContext)

Capture the restricted context by calling IHostSecurityManager::GetSecurityContext(eRestrictedContext, &pRestrictedContext)

Apply the restricted context by calling
  pRestrictedContext->Capture(&pClonedRestrictedContext)
  IHostSecurityManager::SetSecurityContext(eRestrictedContext, pClonedRestrictedContext)

Run the finalizer, class or module constructor

Replace the original current context by calling IHostSecurityManager::SetSecurityContext(eCurrentContext, pCurrentContext)

APPENDIX

Exemplary Runtime Hosting Interfaces

The failure modes are similar to the finalizer thread, with one exception. The runtime 130 are able to re-apply the original (defined as current) context to the thread after class constructor execution. If not, subsequent code may fail when running under the restricted context.

1.11.7. Worker Thread Async Point

When hosted, the runtime 130 will call IHostSecurityManager::GetSecurityContext within Threadpool.QueueUserWorkItem at the same point it collects compressed stack and other thread security context There are two cases to consider. Either the runtime 130 or the host 132 can supply the threadpool implementation.

Runtime Supplied Threadpool

1. Within QueueUserWorkItem, delegate info (including the delegate itself and additional security info) is gathered and used as the state information supplied to the internal QueueUserWorkItem.
2. The runtime 130 calls IHostSecurityManager:: GetSecurityContext(eCurrentContext, &pCurrentContext)
   a. to retrieve a host 132 security context interface pointer.
   b. Calls pCurrentContext->Capture(&pCapturedContext)
   c. Places the captured (cloned) information in the delegate info.

APPENDIX

Exemplary Runtime Hosting Interfaces

3. When the actual worker thread dequeues and executes the work request, this info is retrieved and the runtime 130 calls IHostSecurityManager::SetSecurityContext(eCurrentContext, pCapturedContext) prior to the function execution Host 132 Supplied Threadpool 1. Within ThreadPoolMgr::QueueUserWorkItem we query the host 132 for IHostThreadPoolManager
2. The runtime 130 calls
   Calls IHSM::GetSecurityContext(eCurrentContext, &pCurrentContext) to retrieve a host 132 security context interface pointer.
   Calls pCurrentContext->Capture(&pCapturedContext)
   Places the captured (cloned) information in the delegate info.
3. The runtime 130 calls IHTPM::QueueUserWorkItem, passing the QueueUserWorkItemCallback function pointer and delegate info as function parameter. This delegate info contains runtime 130 security information including compressed stack and includes the context garnered from the host 132 in item #2.
4. When the host 132 dequeues the work request, it calls into the runtime 130 on QueueUserWorkItemCallback, passing the delegate info. The runtime 130 uses information to apply the compressed stack to the new thread and

APPENDIX

Exemplary Runtime Hosting Interfaces calls IHostSecurityManager::SetSecurityContext(eCurrentContext, pCapturedContext) using the context unbundled from the delegate info.

Async I/O

The execution context is captured in runtime 130 internal class which is wrapped and passed within the native overlapped structure.

For the host 132 ing case, the runtime 130 will capture both the additional managed security context information, and the host 132-specific context, using IHostSecurityContext, within this internal managed instance.

1. The runtime 130 captures managed and host 132 context
   a. Calls IHSM::GetSecurityContext(eCurrentContext, &pCurrentContext) to retrieve a host 132 security context interface pointer.
   b. Calls pCurrentContext->Capture(&pCapturedContext),
   c. Places the captured (cloned) COM interface into the managed instance within the native overlapped structure.
2. If the host 132 implements IHostIOCompletionManager, the runtime 130 calls its implementation of Bind, else it calls the runtime internal 10 completion routines.
3. In the non-hosted case, upon OS signaling async I/O completion, control returns to an internal runtime 130 routine. In the hosted case, the host 132 alerts the runtime of I/O completion by firing the

APPENDIX

Exemplary Runtime Hosting Interfaces
IRuntimeIoCompletionManager::OnComplete.
Control then returns to the same internal runtime 130 routine.

4. Within this routine, the managed security context is reapplied. The runtime 130 will then call IHSM::SetSecurityContext(eCurrentContext, pCurrentContext) to replace host 132 security context before further managed code executes.

1.12. Runtime Configuration Interfaces

Interfaces 133 (FIG. 1) provide various abstractions that hosts 132 can implement to provide and monitor resources used by the runtime 130. In this implementation, runtime 130 queries for these interfaces at startup to determine whether a host 132 supports a given abstraction. This is done because whether a particular abstraction is supported is central to how the runtime 130 executes.

Additionally, there are a set of configuration parameters (program data 138) that a host 132 can set that are not required up front or that can change over time. Examples include a host's policy for escalation resource failures, or to group a set of related tasks for display in the debugger. These parameters are set through interfaces 134 that the host 132 obtains from the runtime 130. These interfaces include, for example:
    IRuntimeControl
    IRuntimePolicyManager
    IRuntimeDebugManager
    IRuntimeHostProtectionManager
    IRuntimeGCManager

APPENDIX

Exemplary Runtime Hosting Interfaces

IRuntimeOnEventManager

This section of the spec describes the runtime 130 configuration interfaces 134.

1.12.1. IRuntimeControl

IRuntimeControl is the "starting point" for the remainder of the configuration interfaces. Hosts 132 obtain a pointer to an IRuntimeControl by calling IRuntimeRuntimeHost::GetRuntimeControl. From this interface hosts 132 can get pointers to other interfaces that allow various aspects of the runtime 130 to be configured.

```
interface IRuntimeControl : IUnknown
{
    HRESULT GetRuntimeManager([in] REFIID riid, [out]
        void **ppObject);
}
```

1.12.1.1. GetRuntimeManager

Returns an interface pointer to one of the runtime 130 "managers" used to configure the runtime 130. The following interfaces can be returned from GetRuntimeManager:
    IRuntimeDebugManager (IID_IRuntimeDebugManager)
    IRuntimePolicyManager (IID_RuntimePolicyManager)
    IRuntimeHostProtectionManager (IID_IRuntimeHostProtectionManager)
    IRuntimeOnEventManager (IID_IRuntimeOnEventManager)

APPENDIX

Exemplary Runtime Hosting Interfaces

IRuntimeGCManager (IID_RuntimeGCManager)
    IRuntimeAssemblyIdentityManager (IID_RuntimeAssemblyIdentityManager)
    IRuntimeHostPolicyManager (IID_IRuntimeHostPolicyManager)

| Parameter | Description |
| --- | --- |
| Riid | [in] The IID for the manager to return. Current valid values are listed above. |
| ppObject | [out] An interface pointer to the requested manager, or NULL if an invalid manager was requested. |

HResults

See Common HResults

E_NOINTERFACE. The requested interface is not supported.

1.12.2. IRuntimeDebugManager

For debugging purposes, hosts 132 may want to group tasks by some host-specific logical construct like a connection, session or request. In this way, a developer who is debugging a particular session (for example) only sees the tasks involved in processing that session—it does not see every task running in the process. This interface provides methods that allow hosts 132 to associate a list of

APPENDIX

Exemplary Runtime Hosting Interfaces runtime tasks with a given id and friendly name. In this implementation, the id, the name, and the list of associated tasks have meaning independent of the runtime 130 (for purposes of this call). That is, the runtime 130 blindly passes the parameters on to the debugger.

The Get and SetDacl methods allow the host 132 to either set or retrieve the ACL's on events and shared memory used by the debugger. If the events or shared memory are already in use, setting new ACL's will fail. Likewise, upon creation, restrictive ACL's can be set which disallow debugging (access-denied ACE's in the ACL). If the caller wants to preserve the semantic of the default ACL values when calling SetDacl, the Administrators group and the current process owner may be added to the ACL, in addition to other required users. If GetDacl is called before SetDacl, the returned ACL is the default ACL placed on the debug memory block by the runtime 130.

```
interface IRuntimeDebugManager: IUnknown
{
    HRESULT BeginConnection(
            [in] CONNID dwConnectionId,
            [in, string] wchar_t * szConnectionName);
    HRESULT SetConnectionTasks(
            [in] CONNID dwConnectionId,
            [in] DWORD dwCount,
            [in, size_is(dwCount)] IRuntimeTask **ppRuntimeTask);
```

-continued

```
    HRESULT EndConnection([in] CONNID dwConnectionId);
    HRESULT SetDacl([in] PACL pacl);
    HRESULT GetDacl([out] PACL* ppacl);
    HRESULT IsDebuggerAttached([out] BOOL *pbAttached);
    HRESULT AllowFileLineInfo([in] BOOL fAllowInfo);
    HRESULT LoadPdb([in] UINT64 id,[in] IStream *pStmPdb);
}
```

APPENDIX

Exemplary Runtime Hosting Interfaces 1.12.2.1. BeginConnection

IRuntimeDebugManager has three methods for associating tasks with id's and a name. These methods are called in a specific order: BeginConnection are called first to establish a new connection with which to associate tasks. Next, SetConnectionTasks is called to provide the array of runtime tasks for a given connection. Finally, EndConnection is called when the association between the id, name and tasks is no longer needed. Note that although the methods for a given connection are called in order, calls for different connections could be nested. For example, the following call sequence is valid:
BeginConnection(1, "C1");
SetConnectionTasks(1, . . . );
BeginConnection(2, "C2");
EndConnection(1);
SetConnectionTasks(2, . . . );
EndConnection(2);

APPENDIX

Exemplary Runtime Hosting Interfaces

| Parameter | Description |
|---|---|
| dwConnectionId | [in] An identifier to associate with the list of runtime tasks. This id is completely defined by the host 132 - it is opaque to the runtime. Id's cannot be 0. |
| szConnectionName | [in] A friendly name to associate with the list of runtime tasks. Debuggers may choose to use this name in the user interface to identify the logical grouping of tasks. szConnectionName may not be the NULL string. |

HResults
See Common HResults
E_INVALIDARG. dwConnectionId was 0 or BeginConnection was already called with this id, or szConnectionName was null.
E_OUTOFMEMORY. Memory could not be allocated to hold the list of tasks associated with this connection.

1.12.2.2. SetConnectionTasks

After BeginConnection is called, SetConnectionTasks is used to associate a list of runtime tasks with an id and a name. SetConnectionTasks can be called multiple times with the same connection id. However, each subsequent call will overwrite the list made by the previous call. For example, if SetConnectionTasks is called with "T1, T2, T3", then called again with "T2, T3, T4", the list of tasks associated with the id will be "T2, T3", T4".

APPENDIX

Exemplary Runtime Hosting Interfaces

| Parameter | Description |
|---|---|
| dwConnectionId | [in] An id that was previously passed to BeginConnection. |
| dwCount | [in] The number of assemblies in the ppRuntimeTasks array. dwCount cannot be 0. |
| ppRuntimeTasks | [in] An array of IRuntimeTask pointers associated with this id. The array of tasks will contain at least one element. |

HResults
See Common HResults
E_INVALIDARG. BeginConnection was not called with dwConnectionId, dwCount or dwConnectionId was 0, the array of runtime tasks didn't contain any elements, or one of the elements was NULL.

1.12.2.3. EndConnection

Disassociates a list of tasks with the given connection id.

| Parameter | Description |
|---|---|
| dwConnectionId | [in] An id that was previously passed to BeginConnection. |

APPENDIX

Exemplary Runtime Hosting Interfaces

HResults
See Common HResults
E_INVALIDARG. BeginConnection was not called with dwConnectionId or dwConnectionId was 0.

1.12.2.4. SetDacl

| Parameter | Description |
|---|---|
| pacl | [in] pointer to DACL to be set on events and shared memory |

1.12.2.5. GetDacl

| Parameter | Description |
|---|---|
| pattrs | [out] returns pointer to DACL enforced on events and shared memory. The memory is allocated using CoTaskMemAlloc by the runtime and freed by the host 132 using CoTaskMemFree. If SetDacl has not been called, GetDacl returns the default ACL placed on the debug memory block by the runtime 130. |

APPENDIX

Exemplary Runtime Hosting Interfaces

1.12.2.6. IsDebuggerAttached

This method allows hosts 132 to determine if a debugger is attached to the process.

| Parameter | Description |
|---|---|
| pbAttached | [out] returns Boolean true if debugger attached, false if not. |

1.12.2.7. AllowFileLineInfo

This method allows hosts 132 to control whether file and line info is included in call stacks.

| Parameter | Description |
|---|---|
| fAllowInfo | [in] Host 132 tells runtime 130 whether file and line info may be included in call stacks |

1.12.2.8. LoadPdb

Used by host 132 to pass module pdb information to runtime for debugging. All modules have substantially unique ids.

APPENDIX

Exemplary Runtime Hosting Interfaces

| Parameter | Description |
|---|---|
| id | [in] unique id of the module for which to load the pdb |
| pStmPdb | [in] open stream pointing at PDB to be loaded |

1.12.3. IRuntimePolicyManager

Reliability Escalation Policy

The runtime 130 Hosting layer is built to accommodate a variety of hosts, many of which will have different tolerances for handling errors that occur while running managed code in the process. For example, hosts 132 with largely stateless programming models, for example, such as ASP.NET can use a process recycling model to reclaim processes deemed unstable. In contrast, hosts 132 such as SQL Server and WINDOWS shell rely on the process being stable ideally for an infinite amount of time.

The runtime 130 supports these different reliability needs through an infrastructure that can keep a single AppDomain or an entire process consistent in the face of various situations that would typically compromise stability. Examples of these situations include a thread that gets "stuck" while being aborted (looping finalizer, for example), or the inability to allocate a resource such as memory.

APPENDIX

Exemplary Runtime Hosting Interfaces

In general, the runtime may throw an exception on resource failures and thread aborts. However, there are cases where a host 132 may want to override these defaults. For example, consider the case where a failure to allocate memory occurs in a region of code that may be sharing state across threads. Because such a failure may leave the domain in an inconsistent state, the host 132 may choose to unload the entire domain. While this action clearly affects all code running in the domain, it guarantees that the rest of the domains remain consistent and the process remains stable. In contrast, a different host 132 may be willing to allow the "questionable" domain to keep running and instead will stop sending new requests into it and kill the domain itself later.

Hosts 132 specify which actions to take in these scenarios by calling methods on IRuntimePolicyManager. This interface allows the host 132 to set timeout values for actions like aborting a thread or unloading an AppDomain, and to provide policy statements that govern the behavior when a request for a resource cannot be granted, or when a given timeout expires. All policy statements set through this interface apply to all threads and AppDomains in a process. Policy can not be different for individual threads or domains. The types of operations for which policy can be applied, and the policies themselves are represented by the ERuntimeOperation and EPolicyAction enumerations.

When setting these policies, it's important to understand exactly what guarantees the runtime 130 makes in terms of cleanup when a thread is aborted, an AppDomain unloaded or the process shut down. These guarantees will be

APPENDIX

Exemplary Runtime Hosting Interfaces different depending on whether the runtime 130 is terminating managed code gracefully or forcefully.

Timeouts specified as part of reliability policy are not guaranteed. That is, the runtime 130 cannot guarantee the timeout will occur exactly when specified. Also, when the timer fires, there is no guarantee that the runtime 130 will return immediately.

```
typedef enum
{
    OPR_ThreadAbort,
    OPR_ThreadRudeAbortInNonCriticalRegion,
    OPR_ThreadRudeAbortInCriticalRegion,
    OPR_AppDomainUnload,
    OPR_AppDomainRudeUnload,
    OPR_ProcessExit,
    OPR_FinalizerRun,
    MaxClrOperation
} EClrOperation;
typedef enum
{
    FAIL_NonCriticalResource,
    FAIL_CriticalResource,
    FAIL_FatalRuntime,
    FAIL_OrphanedLock,
    MaxClrFailure
} EClrFailure;
typedef enum
{
    eNoAction,
    eThrowException,
    eAbortThread,
    eRudeAbortThread,
```

-continued

```
        eUnloadAppDomain,
        eRudeUnloadAppDomain
        eExitProcess,
        eFastExitProcess,
        eRudeExitProcess,
        eDisableRuntime,
        MaxPolicyAction
} EPolicyAction;
interface IRuntimePolicyManager: IUnknown
{
        HRESULT SetDefaultAction(
            [in] EClrOperation operation,
            [in] EPolicyAction action);
        HRESULT SetTimeout(
            [in] EClrOperation operation,
            [in] DWORD dwMilliseconds);
        HRESULT SetActionOnTimeout(
            [in] EClrOperation operation,
            [in] EPolicyAction action);
        HRESULT SetTimeoutAndAction(
            [in] EClrOperation operation,
            [in] DWORD dwMilliseconds,
            [in] EPolicyAction action);
        HRESULT SetActionOnFailure(
            [in] EClrFailure failure,
            [in] EPolicyAction action);
}
```

APPENDIX

Exemplary Runtime Hosting Interfaces 1.12.3.1. Enum: EClrOperation

The EClrOperation enumeration describes the set of operations for which a host 132 can supply policy actions. A host 132 can associate timeouts with many of these operations as well. Most of the operations are described by their names, but the terms "critical", "non-critical" and "rude" are worth explaining further.

APPENDIX

Exemplary Runtime Hosting Interfaces

The runtime 130 reliability infrastructure distinguishes between aborts or resources failures that occur in "critical" regions of code vs. "non-critical" regions of code. This distinction is made so that hosts 132 can set different policies depending on where in the code the failure occurred. A critical region of code is defined as any place in which the runtime 130 cannot guarantee that the effects of failing a resource request or aborting a thread will affect only the current task. For example, consider the case where a given task is holding a lock and receives a failure when trying to allocate memory. In this scenario, aborting just the current task is not sufficient to ensure stability of the AppDomain because there may be other tasks in the domain waiting on the same lock. If the current task is abandoned, other tasks could be hung forever waiting on the lock. As a result, the host 132 may decide it is better to unload the entire AppDomain instead of running the risk of instability. In contrast, a non-critical region of code is any code in which the runtime 130 can guarantee that an abort or failure will affect only the task on which the error occurs.

Abort operations of EClrOperation include a notion of a "rude" abort. Generally speaking, a rude abort differs from a "graceful" abort in that a lesser attempt is made to run user backout or cleanup code such as catch blocks, finally blocks, finalizers, and/or the like.

1.12.3.2. Enum: EClrFailure

EClrFailure describes the set of failures a host 132 can set policy actions for. Enum values are:

APPENDIX

Exemplary Runtime Hosting Interfaces

FAIL_NonCriticalResource. A failure occurred while trying to allocate a resource in a non-critical region of code (see EClrOperation above for the definition of non-critical region of code). Resources include memory, threads, and locks.

FAIL_CriticalResource. A failure occurred while trying to allocate a resource in a critical region of code (see EClrOperation above for the definition of critical region of code). Resources include memory, threads, and locks.

FAIL_FatalRuntime. The runtime 130 is no longer capable of running managed code in the process. All further calls into the host 132 ing api will return HOST_E_RuntimeNOTAVAILABLE.

1.12.3.3. Enum: EPolicyAction

This enumeration describes the reliability policies a host 132 can set for the operations defined by EClrOperation and the failures described by EClrFailure. eDefaultAction indicates that the default action for a given operation is acceptable (see SetDefaultAction below). eDisableRuntime disables the runtime 130 in the sense that no more managed code will be run in the process. Once the runtime 130 is disabled there is no way to re-enable it. The meanings of the other values in the enumeration follow from their names—abort the thread, rudely abort the thread, gracefully exit the process, and so on.

| Value from EPolicy Action | Action taken when condition occurs |
|---|---|
| eNoAction | No Action is taken |
| eThrowException | Exception is thrown (based on the condition. I.e. stack overflow, out of memory) |
| eAbortThread | Runtime attempts a graceful thread abort. Attempts to run all finally blocks. Catch blocks specific to thread abort, Exception (base class) or catch( . . . ) will also run. |
| eRudeAbortThread | Runtime rudely aborts thread. Catch and finally blocks attributed as 'WillRun' are run. |
| eUnloadAppDomain | Runtime attempts graceful AppDomain unload. Attempt to run finalizers. |
| eRudeUnloadAppDomain | Only 'WillRun' attributed finalizers will be run. All threads with this AppDomain in their stack will receive thread abort exceptions, but only 'WillRun' attributed code can catch the exception. |
| eExitProcess | Runtime attempts graceful process exit. Finalizers will run and runtime cleanup and logging will occur. |
| eFastExitProcess | Finalizers will not run. Internal logging is flushed. Notification sent to debugger/profiler. |
| eRudeExitProcess | Finalizers will not run. Some internal runtime logging will not occur. |

-continued

| Value from EPolicy Action | Action taken when condition occurs |
|---|---|
| eDisableRuntime | Runtime enters disabled state. No further managed code can be run in this process. Threads will be blocked from entering runtime. |

APPENDIX

Exemplary Runtime Hosting Interfaces

APPENDIX

Exemplary Runtime Hosting Interfaces

APPENDIX

Exemplary Runtime Hosting Interfaces 1.12.3.4. SetDefaultAction

Hosts 132 can use SetDefaultAction to change how the runtime 130 behaves for the operations defined in EClrOperations. For example, a host 132 could use this to always rudely abort threads instead of waiting for them to gracefully stop. Not all policy actions can be specified as the default behavior for all runtime 130 operations. Typically, SetDefaultAction can only be used to "escalate" behavior. For example, a host 132 can not specify that all rude thread aborts be turned into thread aborts instead. The following table lists the valid policy actions for each operation.

| Value from EClrOperation | Valid values from EPolicyAction |
|---|---|
| OPR_ThreadAbort | eAbortThread, eRudeAbortThread, eUnloadAppDomain, eRudeUnloadAppDomain, eExitProcess, eFastExitProcess, eRudeExitProcess, eDisableRuntime |
| OPR_ThreadRudeAbortIn-NonCriticalRegion OPR_ThreadRudeAbortIn-CriticalRegion | eRudeAbortThread, eUnloadAppDomain, eRudeUnloadAppDomain, eExitProcess, eFastExitProcess, eRudeExitProcess, eDisableRuntime |
| OPR_AppDomainUnload | eUnloadAppDomain, eRudeUnloadAppDomain, eExitProcess, eFastExitProcess, eRudeExitProcess, eDisableRuntime |
| OPR_AppDomainRudeUnload | eRudeUnloadAppDomain, eExitProcess, eFastExitProcess, eRudeExitProcess, eDisableRuntime |
| OPR_ProcessExit | eExitProcess, eFastExitProcess, eRudeExitProcess, eDisableRuntime |
| OPR_FinalizerRun | eNoAction, eAbortThread, eRudeAbortThread, |

-continued

| Value from EClrOperation | Valid values from EPolicyAction |
|---|---|
| | eUnloadAppDomain, eRudeUnloadAppDomain, eExitProcess, eFastExitProcess, eRudeExitProcess, eDisableRuntime |

APPENDIX

Exemplary Runtime Hosting Interfaces

APPENDIX

Exemplary Runtime Hosting Interfaces

APPENDIX

Exemplary Runtime Hosting Interfaces

The parameters for SetDefaultAction are:

| Parameter | Description |
|---|---|
| operation | [in] A value from EClrOperation indicating the operation for which you'd like to customize the default behavior. |
| action | [in] A value from EPolicyActions that specifies the action to take when the specified operation occurs. |

HResults

See Common HResults

E_INVALIDARG. An invalid action was passed in for the specified operation.

1.12.3.5. SetTimeout

SetTimeout allows hosts 132 to specify timeout values for thread abort, AppDomain unload and process exit. By default, the runtime 130 has no timeout value for thread abort and AppDomain unload. Attempts to abort a thread will continue infinitely until a call to Thread.RudeAbort[1] is called. Similarly, the

APPENDIX

Exemplary Runtime Hosting Interfaces runtime 130 will continue trying to unload an AppDomain until a call to AppDomain.RudeUnload is received. The default timeout value for process exit is 40 seconds, after which the process is rudely shut down.

If a timeout is specified using SetTimeout, the host 132 will likely also want to specify an action to take on that timeout by calling either SetActionOnTimeout or SetTimeoutAndAction, both of which are documented below.

| Parameter | Description |
| --- | --- |
| operation | [in] A value from EClrOperation indicating the operation for which you'd like to set a timeout. Valid values are: OPR_ThreadAbortInNonCriticalRegion OPR_ThreadAbortInCriticalRegion OPR_AppDomainUnload OPR_ProcessExit OPR_FinalizerRun (maybe?!) |
| dwMilliseconds | [in] The new timeout value in milliseconds. Passing INFINITE will cause the operation to not time out. |

HResults

APPENDIX

Exemplary Runtime Hosting Interfaces

See Common HResults
E_INVALIDARG. A timeout cannot be set for the specified operation.

1.12.3.6. SetActionOnTimeout

Hosts 132 can specify actions to take when timeout values occur for certain operations. These timeout values may either be the runtime 130 defaults or a host-specified timeout set by calling SetTimeout.

In this implementation, not all operations, nor all policy actions, are valid when calling SetActionOnTimeout, wherein operations for which timeouts may be supplied are described in the SetTimeout documentation. The policy actions that apply to the operations are those described in table above under SetDefaultAction. For example, the valid actions to perform when an AppDomain unload times out are eRudeUnloadAppDomain, eExitProcess, eRudeExitProcess, eDisableRuntime.

| Parameter | Description |
| --- | --- |
| operation | [in] A value from EClrOperation indicating the operation for which you'd like to set a timeout. See description of SetTimeout for valid values. |
| action | [in] A value from EPolicyAction specifying the policy action to apply to the operation. See the table under SetDefaultAction for a description of the valid actions for a given operation. |

APPENDIX

Exemplary Runtime Hosting Interfaces

HResults
See Common HResults
E_INVALIDARG. A timeout cannot be set for the specified operation.

1.12.3.7. SetTimeoutAndAction

SetTimeoutAndAction is a convenience routine that combines the functionality of SetTimeout and SetActionOnTimeout. The default timeouts and valid combinations of operations and policy actions are those described above for these two methods.

| Parameter | Description |
| --- | --- |
| operation | [in] As desribed for SetTimeout |
| dwMilliseconds | [in] As described for SetTimeout |
| action | [in] As described for SetActionOnTimeout |

HResults
See Common HResults

APPENDIX

Exemplary Runtime Hosting Interfaces

E_INVALIDARG. A timeout cannot be set for the specified operation, or an invalid policy action was specified for the operation.

1.12.3.8. SetActionOnFailure

By default, the runtime 130 throws an exception when it fails to allocate a resource such as memory. SetActionOnFailure allows the host 132 to override this default and provide a policy action that describes how the runtime 130 behaves when a resource cannot be allocated or when a fatal error occurs.

| Parameter | Description |
| --- | --- |
| failure | [in] A value from EClrFailure indicating which type of failure you'd like to set a policy action for. |
| action | [in] A value from EPolicyAction specifying the policy action to apply to the operation. The valid actions depend on the particular failure. Valid actions for FAIL_NonCriticalResource and FAIL_CriticalResource are: eNoAction, eThrowException, eAbortThread, eRudeAbortThread, eUnloadAppDomain, eRudeUnloadAppDomain, eExitProcess, eRudeExitProcess, eDisableRuntime. The only valid action for FAIL_FatalRuntime is eRudeExitProcess (when a fatal error occurs the runtime 130 is by default disabled). |

APPENDIX

Exemplary Runtime Hosting Interfaces

HResults
See Common HResults
E_INVALIDARG. A timeout cannot be set for the specified operation, or an invalid policy action was specified for the operation.

1.12.4. IRuntimeHostProtectionManager

The .Net Framework class library provides an extensive set of built in functionality to hosted user code. In addition, numerous third party class libraries exist that provide everything from statistical and math libraries to libraries of new

APPENDIX

Exemplary Runtime Hosting Interfaces

UI controls. Yet, the full extent of functionality provided by a set of class libraries may not be appropriate in particular hosting scenarios. For example, displaying user interface in server programs or services is not useful, or allowing user code to exit the process cannot be allowed in hosts 132 that require long process lifetimes.

IRuntimeHostProtectionManager provides the host 132 with a means to block classes, methods, properties and fields that offer a particular category of functionality from being loaded in the process. A host 132 may choose to prevent the loading of a class or the calling of a method for a number of reasons including reliability and scalability concerns, or because the functionality doesn't make sense in that host's environment as in the examples described above.

A host's designation of which categories of functionality to restrict can be thought of as falling into three general buckets:

- Categories of functionality that may cause the hosted user code to be instable, but do not affect the overall host 132 stability. These categories may not be callable by partially-trusted code, but are ok to be called from fully-trusted code.
- Categories of functionality that do cause host 132 instability (i.e process exit. In this implementation, members in these categories are not be called in the host 132 process, regardless of the amount of trust the code has been granted.
- Categories of API's currently covered by Code Access permissions that a host 132 chooses to deny even in full-trust context. Hosts 132 restrict use of these API's via the RefusedSet property of the AppDomainManager

APPENDIX

Exemplary Runtime Hosting Interfaces class, which effectively injects a CAS deny at the tip of the thread's security evaluation.

```
typedef enum
{
    eNoCategory = 0,
    eSynchronization = 0x1,
    eSharedState = 0x2,
    eExternalProcessMgmt = 0x4,
        eSelfAffectingProcessMgmt = 0x8,
        eExternalThreading = 0x10,
    eSelfAffectingThreading = 0x20,
        eSecurityInfrastructure = 0x40,
    eUI = 0x80 ,
    eAll = 0xff
} EHostProtectionCategories
interface IRuntimeHostProtectionManager: IUnknown
{
    HRESULT SetProtectedCategories([in] EApiCategories categories);
    HRESULT SetInaccessibleCategories([in] EApiCategories
    categories);
}
```

1.12.4.1. Enum: EApiCategories

The categories of functionality that a host 132 can choose to "turn off" are described by the EApiCategories enumeration. The categories are:

- eSynchronization. User code that does its own synchronization can cause scalability issues for server hosts 132 that are turned for high throughput. Methods that allow users code to hold locks (i.e Monitor.Enter( )) are good examples of the functionality in the eSychronization category.
- eSharedState. Sharing state is related to synchronization in the sense that locking primitives are necessary to be sure shared state is kept consistent. Particular hosts 132 may choose to unload the entire AppDomain when a

APPENDIX

Exemplary Runtime Hosting Interfaces resource failure occurs and a lock is held (see Reliability Escalation Policy). In these scenarios, it is useful for the host 132 to block members that expose shared state.

- eExternalProcessMgmt. There are two process management categories. External process management refers to those members that allow new processes to be created, manipulated and destroyed. Although these actions may affect the scalability of some host 132 environments, they will not affect the stability of the host 132 process itself.
- eSelfAffectingProcessMgmt. Self-affecting process management refers to those actions that do affect the stability of the host 132 process. Allow user code to exit the host 132 process is a common example of a member in this category.
- eExternalThreading. There are also two categories of threading related functionality. User code that creates or destroys threads can also have an impact on the scalability of a host. Server hosts 132 may want to have full control over thread lifetime so it can be tracked and tuned for high throughput.
- eSelfAffectingThreading. Self-affecting threading refers to those actions that do affect the stability of the host 132 process. Allow user code to abort the current thread is a common example of a member in this category.
- eUI. An indication that user code that requires human interaction may not be appropriate for server hosts 132 such as web, application or database servers.
- eSecurityInfrastructure. This category refers to functionality provided by the security system itself. Hosts 132 would block this category of

APPENDIX

Exemplary Runtime Hosting Interfaces functionality if they want to prevent user code from doing role based security, impersonation and so on.

- eMayLeakOnAbort. This category refers to methods which may leak memory or resources upon abort.

1.12.4.2. SetProtectedCategories

Hosts 132 use SetProtectedCategories to specify which categories of functionality may NOT be available to partially trusted code. The default (i.e., the behavior if this method is not called) is that all members are allowed.

| Parameter | Description |
|---|---|
| Categories | [in] Values from EHostProtectionCategories indicating which categories to block. |

HResults
See Common HResults

1.12.4.3. SetInaccessibleCategories

Hosts 132 use SetInaccessibleCategories to specify which categories of functionality may NOT be called in the host 132 process—not even by fully trusted code. The default (i.e the behavior if this method is not called) is that all members are allowed.

APPENDIX

Exemplary Runtime Hosting Interfaces

| Parameter | Description |
|---|---|
| Categories | [in] Values from EHostProtectionCategories indicating which categories to block. |

HResults
See Common HResults

1.12.4.4. SetEagerSerializeGrantSets

This method may be called once before starting the runtime to sacrifice a little assembly-loading-performance for a guarantee that a certain rare race condition that can result in a FatalEE error won't occur.

1.12.4.5. Enum EClrEvent

These values enumerate the events for which hosts 132 can register callbacks. Registering for runtime events is described below in the section on IRuntimeOnEventManager.

```
typedef enum
{
    Event_DomainUnload,
    Event_ClrDisabled,
    MaxClrEvent
} EClrEvent;
```

APPENDIX

Exemplary Runtime Hosting Interfaces

1.12.5. IRuntimeOnEventManager

Hosts 132 may register callbacks with the runtime to be informed of important internal events. Currently there are two defined events, 'appdomain unload' and 'clr disabled' which indicates a fatal error. Hosts 132 register for these events by first retrieving the IRuntimeOnEventManager interface from the IRuntimeControl.

NOTE: These events may be fired more than once and from different threads to signal an appdomain unload or the disabling of the runtime 130.

interface IRuntimeOnEventManager: IUnknown

```
{
    HRESULT RegisterActionOnEvent(
        [in] EClrEvent        event,
        [in] IActionOnRuntimeEvent *pAction
    );
```

-continued

```
    HRESULT UnregisterActionOnEvent(
        [in] EClrEvent        event,
        [in] IActionOnRuntimeEvent *pAction
    );
}
```

1.12.5.1. RegisterActionOnEvent

| Parameter | Description |
|---|---|
| event | [in] Values from EClrEvent indicating for which event this callback is registered. |
| pAction | [in] pointer to host 132 callback. The runtime will call this when the registered action occurs. |

APPENDIX

Exemplary Runtime Hosting Interfaces

1.12.5.2. UnregisterActionOnEvent

| Parameter | Description |
|---|---|
| event | [in] Values from EClrEvent indicating for which event this callback is registered. |
| pAction | [in] pointer to host 132 callback. The runtime will call this when the registered action occurs. |

1.12.6. IActionOnRuntimeEvent

```
interface IActionOnRuntimeEvent: IUnknown
{
    HRESULT OnEvent(
        [in] EClrEvent event,
        [in] IUnknown   *data
    );
}
```

APPENDIX

Exemplary Runtime Hosting Interfaces

1.12.6.1. OnEvent

| Parameter | Description |
|---|---|
| Event | [in] Values from EClrEvent indicating for which event this callback is registered. |
| Data | [in] If the event is Event_DomainUnload, data is a pointer to that AppDomain. In other cases, data is NULL. |

1.12.7. IRuntimeGCManager

```
interface IRuntimeGCManager : IUnknown
{
    HRESULT Collect([in] LONG Generation);
    HRESULT GetStats([in][out] COR_GC_STATS *pStats);
    HRESULT SetGCStartupLimits([in] DWORD SegmentSize, [in] DWORD
      MaxGen0Size);
}
```

1.12.7.1. Collect

Forces a collection to occur for the given generation, regardless of current GC statistics.

| Parameter | Description |
|---|---|
| Generation | [in] Generation to collect. In this implementation, a value of –1 means collect all generations. |

APPENDIX

Exemplary Runtime Hosting Interfaces

1.12.7.2. GetStats

GetStats returns a set of current statistics about the state of the GC system. These values can then be used by a smart allocation system to help the GC by adding more memory or forcing a collection.

| Parameter | Description |
|---|---|
| pStats | [in][out] returns current statistics in COR_GC_STATS structure (described below) |

This structure is used to return statics for the GC system. Set the Flags value to a bitmask of values that may be returned. Only those values which are requested are calculated and returned to the caller.

```
typedef struct _COR_GC_STATS
{
    ULONG       Flags;                          // The values to get.
    // Value when COR_GC_COUNTS is specified.
    SIZE_T      ExplicitGCCount;                // How many times was GC
    forced to run by external request.
    SIZE_T      GenCollectionsTaken[3];         //Number of collections
    done for each generation
    // Memory sizes, valid for COR_GC_MEMORYUSAGE.
    SIZE_T      CommittedKBytes;                // Total committed bytes from
    all heaps.
    SIZE_T      ReservedKBytes;                 // Total reserved bytes from all
    heaps.
    SIZE_T      Gen0HeapSizeKBytes;             // Size of gen 0 heap.
    SIZE_T      Gen1HeapSizeKBytes;             // Size of gen 1 heap.
    SIZE_T      Gen2HeapSizeKBytes;             // Size of gen 2 heap.
    SIZE_T      LargeObjectHeapSizeKBytes;      // Size of large object
    heap.
    SIZE_T      KBytesPromotedFromGen0;         // How many bytes
    promoted to next generation.
    SIZE_T      KBytesPromotedFromGen1;
} COR_GC_STATS.
```

APPENDIX

Exemplary Runtime Hosting Interfaces

1.12.7.3. SetGCStartupLimits

Sets the segment size and gen 0 maximum size. In this implementation, this value is specified once, and will not change if called later.

| Parameter | Description |
|---|---|
| SegmentSize | [in] Sets segment size. |
| MaxGen0Size | [in] Sets size of Gen 0 |

The invention claimed is:

1. A computer readable storage medium comprising stored computer-program instructions executed by a processor for implementing:
   a hosting application implementing a common language runtime (CLR), wherein the host application supplies threading, memory, or synchronization support used by the CLR;

wherein the host application exposes a runtime hosting interface to abstract, customize, and integrate process execution between the host application and the CLR;

the runtime hosting interface comprising a host abstraction interface (HAI), the HAI corresponding to execution environment abstraction(s) supported by the host application, at least one specific interface or object corresponding to a specific HAI accessible by the CLR during execution of runtime managed code and responsive to an action or event associated with an identified HAI, the HAI providing an interface for the CLR to configure host execution environment parameters or to notify the host application of a CLR event;

the host application or the CLR negotiating, which will perform certain functions;

the CLR allocating memory via at least one specific interface or object implemented by the host application;

the CLR notifying when a task has been moved to or from a runnable state; and the CLR obtaining additional information during process execution.

2. A computer-readable storage medium as recited in claim 1, wherein the one or more execution environment abstractions correspond to management services for memory, threads/tasks, I/O completion, synchronization, runtime entry/exit notification, security context, impersonation, runtime configuration, customized assembly loading, host protection, garbage collection (GC), debugging, or executable code service abstractions.

3. A computer-readable storage medium as recited in claim 1, wherein the runtime hosting interface further comprises a runtime interface (RI) for use by the host application to configure operations of the CLR, notify the CLR of an event, or to obtain additional information during host application process execution.

4. A computer-readable storage medium as recited in claim 1, wherein the HAI comprises an interface for the CLR to identify host application implemented ones of the HAI or associated object(s) for subsequent calling responsive to an action or event associated with an identified one of the respective execution environment abstractions.

5. A computer-readable storage medium as recited in claim 1, wherein the HAI comprises an interface for the CLR to request the host application to perform a memory allocation.

6. A computer-readable storage medium as recited in claim 1, wherein the HAI comprises an interface for the CLR to communicate a low memory notification from an operating system (OS) to the host application, or inform the host application of consequences of failing a particular memory allocation via an HAI.

7. A computer-readable storage medium as recited in claim 1, wherein the HAI comprises an interface for the CLR to create a new thread/task via the HAI 8. A computer-readable storage medium as recited in claim 1, wherein the HAI comprises an interface for the CLR to reuse or pool a runtime-implemented portion of a task via the HAI.

9. A computer-readable storage medium as recited in claim 1, wherein the HAI comprises an interface for the CLR to notify the host application that a task cannot be moved to a different physical OS thread and cannot have execution of the task blocked for a specified window of time.

10. A computer-readable storage medium as recited in claim 1, wherein the HAI comprises:

an interface for the CLR to indicate a callback to the host application, the callback for notifying the CLR when a task has been moved to a runnable or non-runnable state; and if the task has been moved to a non-runnable state, an interface to specify that the task is to be rescheduled as soon as possible by the host application.

11. A computer-readable storage medium as recited in claim 1, wherein the HAI comprises an interface for the CLR to:

provide a callback to the host application for notifying the CLR that a task has been moved to a different locale or a locale has changed for the task; or notify the host application, that a task has been moved to a different locale or a locale has changed for the task.

12. A computer-readable storage medium as recited in claim 1, wherein the HAI comprises an interface for the CLR to delay the host application abort of a task.

13. A computer-readable storage medium as recited in claim 1, wherein the HAI comprises an interface for the CLR to modify an object identified by an interface of the HAI.

14. A computing device as recited in claim 13, wherein the object is a task priority.

15. A computer-readable storage medium as recited in claim 1, wherein the HAI comprises an interface for the CLR to notify the host application that a task/thread is to leave the CLR into unmanaged code.

16. A computer-readable storage medium as recited in claim 1, wherein the HAI comprises an interface for the CLR to notify the host application that a task/thread is to reverse-leave the CLR into unmanaged code.

17. A computer-readable storage medium as recited in claim 1, wherein the HAI comprises an interface for the CLR to notify the host application that a task/thread is to enter the CLR from unmanaged code.

18. A computer-readable storage medium as recited in claim 1, wherein the HAI comprises an interface for the CLR to notify the host application that a task/thread is to reverse-enter the CLR from unmanaged code.

19. A computer-readable storage medium as recited in claim 1, wherein the HAI comprises an interface for the CLR to specify a maximum number of threads/tasks that will be available to service requests on one or more I/O completion ports.

20. A computer-readable storage medium as recited in claim 1, wherein the HAI comprises an interface for the CLR to binding a handle to an I/O completion port of the host application.

21. A computer-readable storage medium as recited in claim 1, wherein the HAI comprises an interface for the CLR to supply the host application with a runtime implemented callback, the runtime implemented callback for invoking by the host application when an asynchronous I/O operation completes.

22. A computer-readable storage medium as recited in claim 1, wherein the HAI comprises an interface for the CLR to supply a runtime implemented callback to the host application, the runtime implemented callback to be invoked by the host application when an asynchronous I/O operation completes, the runtime implemented callback being used by the CLR to provide custom state information to the host application.

23. A computer-readable storage medium as recited in claim 1, wherein the HAI comprises an interface for the CLR to:
  generate a task; and
  specify one or more synchronization objects for the task to substantially ensure host application knowledge of a lock on the task, the one or more synchronization objects comprising a critical section, a manual or auto-reset event, a semaphore, a reader/writer lock, and/or a task monitor.

24. A computer-readable storage medium as recited in claim 1, wherein the HAI comprises an interface for the CLR to notify the host application of one or more runtime interfaces allowing the host application to notify the runtime of events or to obtain additional information during host application process execution.

25. A computing device for enhanced runtime hosting, the computing device comprising:
  memory;
  a processor coupled to the memory;
  means for identifying, by a common language runtime (CLR) one or more execution environment abstractions implemented by a host application, the host application for hosting the CLR;
  during execution of runtime managed code and responsive to an action or event associated with an identified one of the respective execution environment abstractions, means for the CLR to interface with specific ones of the execution environment abstractions;
  means for a host abstraction interface (HAI) providing an interface for the CLR to configure host execution environment parameters or to notify the host application of a runtime event;
  means for the hosting application to implement the CLR, wherein the host application supplies threading, memory, or synchronization support used by the CLR;
  wherein the host application exposes a runtime hosting interface to abstract, customize, and integrate process execution between the host application and the CLR;
  means for the HAI providing a pointer interface for the runtime with a pointer to an object associated with the pointer interface, the object for calling by the CLR responsive to a specified event or criteria;
  means for the host application or the CLR negotiating, which will perform certain functions;
  means for the CLR allocating memory via at least one specific interface or object implemented by the host application;
  means for the CLR notifying when a task has been moved to or from a runnable state;
  means for the runtime obtaining additional information during process execution; and
  wherein the execution environment abstractions correspond to memory management, threads/tasks, I/O completion, synchronization, runtime entry/exit notification, security context, impersonation, runtime configuration, executable service code abstractions, or garbage collection (GC).

26. A computing device as recited in claim 25, wherein the execution environment abstractions comprise means for interfacing with an object associated with the host application, the runtime interfacing with the object responsive to a specified event or criteria that occurs during host application execution.

27. A computing device as recited in claim 25, wherein the execution environment abstractions comprise means for the host application to configure operations of the CLR, notify the runtime of an event, or to obtain additional information during host application process execution.

28. A computing device as recited in claim 25, wherein the execution environment abstractions further comprise means for the CLR to request a memory allocation.

29. A computing device as recited in claim 25, wherein the execution environment abstractions comprise means for the CLR to:
  communicate a low memory notification from the OS to the host application; or
  inform the host application of consequences of failing a particular memory allocation.

30. A computing device as recited in claim 25, wherein the execution environment abstractions comprise means for the CLR to create a new thread/task.

31. A computing device as recited in claim 25, wherein the execution environment abstractions comprise means for the CLR to reuse or pool a runtime-implemented portion of a task.

32. A computing device as recited in claim 25, wherein the execution environment abstractions further comprise means for the CLR to notify the host application that a task cannot be moved to a different physical OS thread and cannot have execution of the task blocked for a specified window of time.

33. A computing device as recited in claim 25, wherein the execution environment abstractions further comprise means for the CLR to:
  identify a runtime interface for the host application to invoke when a task has been moved to a runnable or non-runnable state; and
  if the task has been moved to a non-runnable state, specify that the task is to be rescheduled by the host application.

34. A computing device as recited in claim 25, wherein the execution environment abstractions further comprise means for the CLR to:
  provide a callback to the host application for notifying the CLR that a task has been moved to a different locale or a locale has changed for the task; or
  notifying, by the runtime via the at least one specific interface or object, the host application, that a task has been moved to a different locale or a locale has changed for the task.

35. A computing device as recited in claim 25, wherein the execution environment abstractions further comprise means for the CLR to delay host application abort of a task.

36. A computing device as recited in claim 25, wherein the execution environment abstractions further comprise means for the CLR to adjust priority of a task associated with the host application.

37. A computing device as recited in claim 25, wherein the execution environment abstractions further comprise means for the CLR to notify the host application that a task/thread is to leave the CLR into unmanaged code.

38. A computing device as recited in claim 25, wherein the execution environment abstractions further comprise means for the CLR to notify the host application that a task/thread is to reverse-leave the CRL into unmanaged code.

39. A computing device as recited in claim 25, wherein the execution environment abstractions further comprise means for the CLR to notify the host application that a task/thread is to enter the CLR from unmanaged code.

40. A computing device as recited in claim 25, wherein the execution environment abstractions further comprise means for the CLR to notify the host application that a task/thread is to reverse-enter the CLR from unmanaged code.

41. A computing device as recited in claim 25, wherein the execution environment abstractions further comprise means for the CLR to indicate to the host application a maximum number of threads/tasks that will be available to service requests on one or more I/O completion ports.

42. A computing device as recited in claim 25, wherein the execution environment abstractions further comprise means for the CLR to bind a handle to an I/O completion port of the host application.

43. A computing device as recited in claim 25, wherein the execution environment abstractions further comprise means for the CLR to indicate a runtime implemented callback to the host application, the runtime implemented callback for calling by the host application when an asynchronous I/O operation completes.

44. A computing device as recited in claim 25, wherein the execution environment abstractions further comprise means for the CLR to supply a runtime implemented callback to the host application, the CLR implemented callback for invoking by the host application when an asynchronous I/O operation completes, the CLR implemented callback giving the host application an opportunity to communicate custom state information to the CLR implemented callback.

45. A computing device as recited in claim 25, wherein the execution environment abstractions further comprise means for the CLR to:
   generate a task; and
   create one or more synchronization objects for the task to substantially ensure host application knowledge of a lock on the task, the one or more synchronization objects comprising a critical section, a manual and/or auto-reset event, a semaphore, a reader/writer lock, or a task monitor.

46. A computing device as recited in claim 25, wherein the execution environment abstractions further comprise means for the CLR to notify the host application of one or more interfaces exposed by the CLR, the runtime interfaces for the host application to notify the runtime of an event or to obtain additional information during process execution.

47. A computer-readable medium as recited in claim 1, wherein an interface of the HAI provides the CLR with a pointer to an object associated with the interface, the object for calling by the CLR responsive to a specified event or criteria.

48. A computer-readable storage medium as recited in claim 1, wherein the HAI comprises an interface for the CLR to:
   queue a thread/task to a host application implemented thread pool;
   set a size of the host application implemented thread pool; or
   query the host application implemented thread pool.

49. A computing device as recited in claim 25, wherein the execution environment abstractions further comprise means for the CLR to:
   queue a thread/task to a host application implemented thread pool;
   set a size of the host application implemented thread pool; or
   query the host application implemented thread pool.

* * * * *